US006972304B2

(12) United States Patent
Smith et al.

(10) Patent No.: US 6,972,304 B2
(45) Date of Patent: Dec. 6, 2005

(54) AQUEOUS INK COMPOSITIONS

(75) Inventors: Thomas W. Smith, Penfield, NY (US); David J. Luca, Rochester, NY (US); Kathleen M. McGrane, Webster, NY (US)

(73) Assignee: Xerox Corporation, Stamford, CT (US)

( * ) Notice: Subject to any disclaimer, the term of this patent is extended or adjusted under 35 U.S.C. 154(b) by 457 days.

(21) Appl. No.: 09/949,315

(22) Filed: Sep. 7, 2001

(65) Prior Publication Data

US 2003/0079644 A1 May 1, 2003

(51) Int. Cl.[7] ......................... C09D 11/00; C09D 11/02; C09D 11/10

(52) U.S. Cl. ................. 523/160; 106/31.43; 106/31.47; 106/31.49; 106/31.75; 106/31.77; 106/31.78

(58) Field of Search ................................ 523/160, 161; 106/31.43, 31.46, 31.47, 31.49, 31.75, 31.76, 31.77, 31.78; 524/99, 100, 105, 87, 94, 96, 97

(56) References Cited

U.S. PATENT DOCUMENTS

| | | | | | |
|---|---|---|---|---|---|
| 4,455,168 A | * | 6/1984 | Shimada et al. | ......... | 106/31.43 |
| 5,180,425 A | | 1/1993 | Matrick et al. | ........... | 106/22 R |
| 5,266,700 A | * | 11/1993 | Langhals et al. | ........... | 546/140 |
| 5,902,387 A | * | 5/1999 | Suzuki et al. | ............ | 106/31.47 |
| 6,001,899 A | * | 12/1999 | Gundlach et al. | ........... | 523/160 |
| 6,319,309 B1 | * | 11/2001 | Lavery et al. | ........... | 106/31.27 |
| 6,320,018 B1 | | 11/2001 | Sijbesma et al. | ........... | 528/310 |
| 6,572,690 B2 | * | 6/2003 | Rehman et al. | .......... | 106/31.58 |
| 6,656,228 B1 | * | 12/2003 | Sherwin et al. | ................ | 8/188 |
| 2002/0045679 A1 | * | 4/2002 | Takao et al. | ................ | 523/161 |

OTHER PUBLICATIONS

R.P. Sijbesma et al., "Reversible Polymers Formed from Self–Complementary Monomers Using Quadruple Hydrogen Bonding," *Science*, vol. 278, (1977), p. 1601.

R. Dagani, "Supramolecular Polymers," *Chemical and Engineering News*, (Dec. 1997), p. 4.

J.H.K. Ky Hirschberg et al., "Supramolecular Polymers from Linear Telechelic Siloxanes with Quadruple–Hydrogen–Bonded Units," *Macromolecules*, vol. 32, (1999), p. 2696.

A.C. Griffin et al., "Design and Synthesis of 'Smart' Supramolecular Liquid Crystalline Polymers via Hydrogen–Bond Associations," *PMSE Proceedings*, vol. 72, (1995), p. 172.

Andrew J. Carr et al., "The Design of Organic Gelators: Solution and Solid State Properties of a Family of Bis–Ureas," *Tetrahedron Letters*, vol. 39, (1998), p. 7447.

Ronald F.M. Lange et al. "Hydrogen–Bonded Supramolecular Polymer Networks," *Journal of Polymer Science, Part A: Polymer Chemistry*, vol. 37, (1999), p. 3657.

Arno Kraft et al., "Combining Self–Assembly and Self–Association—Towards Columnar Supramolecular Structures in Solution and in Liquid–Crystalline Mesophase," *Polym. Mater. Sci. Eng.*, vol. 80, (1999), p. 18.

Y. Yuasa et al., "Facile Synthesis of β–Keto Esters from Methyl Acetoacetate and Acid Chloride: The Barium Oxide/Methanol System," *Organic Process Research and Development*, vol. 2, (1998), p. 412.

F. Hoogesteger et al., "Self–Complementary Hydrogen Bonding of 1,1'–Bicyclohexylidene–4,4–'–dione Dioxime. Formation of a Non–Covalent Polymer," *Tetrahedron*, vol. 52, (1996), p. 1773.

X. Wang et al., "Molecular Tectonics. Three–Dimensional Organic Networks with Zeolite Properties," *J. Am. Chem. Soc.*, vol. 116, (1994), p. 12119.

J.H.K. Ky Hirschberg et al., "Helical Self–Assembled Polymers from Cooperative Stacking of Hydrogen–Bonding Pairs," *Nature*, vol. 407, (2000), p. 167.

Abdullah Zafar et al., "New Supramolecular Arrays based on Interactions between Carboxylate and Urea Groups: Solid–State and Solution Behavior," *New J. Chem.*, 1998, p. 137–141.

Marion Lescanne et al., "Flow–Induced Alignment of Fiber-like Supramolecular Self–Assemblies During Organogel Formation with Various Low Molecular Mass Organogelator—Solvent Systems," *Am. Chem. Soc.*, vol. 18, (2002), pp. 7151–7153.

G.M. Clavier et al., "Organogelators for Making Porous Sol–Gel Derived Silica at Two Different Length Scales," *J. Mater. Chem.*, (2000), 10, pp. 1725–1730.

Saleh A. Ahmed et al., "Multiaddressable Self–Assembling Organogelators Based on 2H–Chromene and N–Acyl–1, ω–amino Acid Units," *Am. Chem. Soc.*, (2002), 18, pp. 7096–7101.

Franz Alfred Neugebauer et al., "Tetrakis [4–(3–tert–butyl–5–phenylverdazyl–1–yl)phenyl]methan, in Tetraradikal," *Chem. Ber.*, (1976) 109, pp. 2389–2394(not translated).

English abstract by SciFinder for Franz Alfred Neugebauer et al., "Tetrakis [4–(3–tert–butyl–5–phenylverdazyl–1–yl)phenyl]methan, in Tetraradikal," *Chem. Ber.*, (1976), 109 (7), pp. 2389–2394.

English translation of 221. R. Nietzki and Gustav Hasterlik: The Influence of Dioxyquinone on Orthodiamines (Received Apr. 28).

* cited by examiner

*Primary Examiner*—Callie Shosho
(74) *Attorney, Agent, or Firm*—Judith L. Byorick

(57) ABSTRACT

Disclosed is an aqueous ink composition comprising an aqueous liquid vehicle, a colorant, and an additive wherein, when the ink has been applied to a recording substrate in an image pattern and a substantial amount of the aqueous liquid vehicle has either evaporated from the ink image, hydrogen bonds of sufficient strength exist between the additive molecules so that the additive forms hydrogen-bonded oligomers or polymers.

55 Claims, No Drawings

AQUEOUS INK COMPOSITIONS

Copending Application U.S. Ser. No. 09/948,958, filed concurrently herewith, entitled "Phase Change Ink Compositions," with the named inventors H. Bruce Goodbrand, Thomas W. Smith, Dina Popovic, Daniel A. Foucher, and Kathleen M. McGrane, the disclosure of which is totally incorporated herein by reference, discloses a phase change ink composition comprising a colorant and an ink vehicle, the ink being a solid at temperatures less than about 50° C. and exhibiting a viscosity of no more than about 20 centipoise at a jetting temperature of no more than about 160° C., wherein at a first temperature hydrogen bonds of sufficient strength exist either between the "A" groups and the "B" groups or between the "C" groups so that the ink vehicle forms hydrogen-bonded oligomers or polymers, and wherein at a second temperature which is higher than the first temperature the hydrogen bonds either between the "A" groups and the "B" groups or between the "C" groups are sufficiently broken that fewer hydrogen-bonded oligomers or polymers are present in the ink at the second temperature than are present in the ink at the first temperature, so that the viscosity of the ink at the second temperature is lower than the viscosity of the ink at the first temperature.

BACKGROUND OF THE INVENTION

The present invention is directed to ink compositions suitable for use in, among other applications, ink jet printing. More specifically, the present invention is directed to ink compositions containing additive materials that form hydrogen bonded oligomers or polymers when the ink is placed on a recording substrate. One embodiment of the present invention is directed to an aqueous ink composition comprising an aqueous liquid vehicle, a colorant, and an additive which is either (1) a material selected from (a) those of the formula $$C_1—X—C_2$$

(b) those of the formula

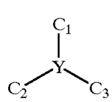

(c) those of the formula

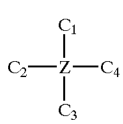

or (d) mixtures of two or more of (a), (b), and/or (c); or (2) a material selected from mixtures of (a) at least one member selected from (i) those of the formula $$A_1\text{-}X_1\text{-}A_2$$

(ii) those of the formula

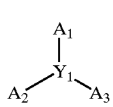

(iii) those of the formula

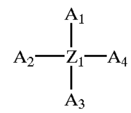

(iv) those of the formula $$A_1\text{-}X_1—B_1$$

(v) those of the formula

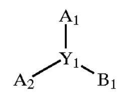

(vi) those of the formula

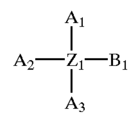

(vii) those of the formula

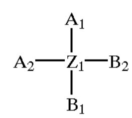

or (viii) mixtures of two or more of (i), (ii), (iii), (iv), (v), (vi), and/or (vii), and (b) at least one member selected from (i) those of the formula $$B_1—X_2—B_2$$

(ii) those of the formula

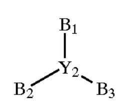

(iii) those of the formula

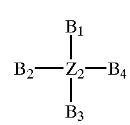

(iv) those of the formula $$A_2\text{-}X_2—B_2$$

(v) those of the formula

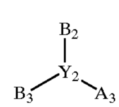

(vi) those of the formula

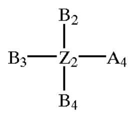

(vii) those of the formula

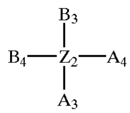

or (viii) mixtures of two or more of (i), (ii), (iii), (iv), (v), (vi), and/or (vii), wherein each "A" is an acidic moiety and each "B" is a basic moiety, wherein each "A" is capable of forming at least one hydrogen bond with at least one "B" and each "B" is capable of forming at least one hydrogen bond with at least one "A", each "C" is a moiety either capable of forming at least one hydrogen bond with a moiety identical to itself or capable of forming at least one hydrogen bond with another "C" moiety, each "X" is a divalent moiety, each "Y" is a trivalent moiety, and each "Z" is a tetravalent moiety, wherein, when the ink has been applied to a recording substrate in an image pattern and a substantial amount of the aqueous liquid vehicle has evaporated from the ink image, hydrogen bonds of sufficient strength exist either between the "A" groups and the "B" groups or between the "C" groups so that the additive forms hydrogen-bonded oligomers or polymers.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

Another type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described in, for example, U.S. Pat. No. 4,601,777, U.S. Pat. No. 4,251,824, U.S. Pat. No. 4,410,899, U.S. Pat. No. 4,412,224, and U.S. Pat. No. 4,532,530, the disclosures of each of which are totally incorporated herein by reference.

Acoustic ink jet printing processes are also known. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. These principles have been applied to prior ink jet and acoustic printing proposals. For example, K. A. Krause, "Focusing Ink Jet Head," *IBM Technical Disclosure Bulletin*, Vol. 16, No. 4, September 1973, pp. 1168–1170, the disclosure of which is totally incorporated herein by reference, describes an ink jet in which an acoustic beam emanating from a concave surface and confined by a conical aperture was used to propel ink droplets out through a small ejection orifice. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure which each of the beams exerts against the free ink surface to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop-on-demand and continuous stream ink jet printers have suffered. The size of the ejection orifice is a critical design parameter of an ink jet because it determines the size of the droplets of ink that the jet ejects. As a result, the size of the ejection orifice cannot be increased, without sacrificing resolution. Acoustic printing has increased intrinsic reliability because there are no nozzles to clog. As will be appreciated, the elimination of the clogged nozzle failure mode is especially relevant to the reliability of large arrays of ink ejectors, such as page width arrays comprising several thousand separate ejectors. Furthermore, small ejection orifices are avoided, so acoustic printing can be performed with a greater variety of inks than conventional ink jet printing, including inks having higher viscosities and inks containing pigments and other particulate components. It has been found that acoustic ink printers embodying printheads comprising acoustically illuminated spherical focusing lenses can print precisely positioned pixels (i.e., picture elements) at resolutions which are sufficient for high quality printing of relatively complex images. It has also been discovered that the size of the individual pixels printed by such a printer can be varied over a significant range during operation, thereby accommodating, for example, the printing of variably shaded images. Furthermore, the known droplet ejector technology can be adapted to a variety of printhead configurations, including (1) single ejector embodiments for raster scan printing, (2) matrix configured ejector arrays for matrix printing, and (3) several different types of pagewidth ejector arrays, ranging from single row, sparse arrays for hybrid forms of parallel/serial printing to multiple row staggered arrays with individual ejectors for each of the pixel positions or addresses within a pagewidth image field (i.e., single ejector/pixel/line) for ordinary line printing. Inks suitable for acoustic ink jet printing typically are liquid at ambient temperatures (i.e., about 25° C.), but in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. No. 4,308,547, U.S. Pat. No. 4,697,195, U.S. Pat. No. 5,028,937, U.S. Pat. No. 5,041,849, U.S. Pat. No. 4,751,529, U.S. Pat. No. 4,751,530, U.S. Pat. No. 4,751,534, U.S. Pat. No. 4,801,953, and U.S. Pat. No. 4,797,693, the disclosures of each of which are totally incorporated herein by reference. The use of focused acoustic beams to eject droplets of controlled diameter and velocity from a free-liquid surface is also described in *J. Appl. Phys.*, vol. 65, no. 9 (1, May 1989) and references therein, the disclosure of which is totally incorporated herein by reference.

"Reversible Polymers Formed from Self-Complementary Monomers Using Quadruple Hydrogen Bonding," R. P. Sijbesma et al., *Science*, Vol. 278, p. 1601 (1997), the disclosure of which is totally incorporated herein by reference, discloses the use of units of 2-ureido-4-pyrimidone that dimerize strongly in a self-complementary array of four cooperative hydrogen bonds as the associating end group in reversible self-assembling polymer systems. The unidirectional design of the binding sites prevented uncontrolled multidirectional association or gelation. Linear polymers and reversible networks were formed from monomers with two and three binding sites, respectively. The thermal and environmental control over lifetime and bond strength made many properties, such as viscosity, chain length, and composition, tunable in a way not accessible to traditional polymers. Hence, polymer networks with thermodynamically controlled architectures could be formed for use in, for example, coatings and hot melts, where a reversible, strongly temperature-dependent rheology is highly advantageous.

"Supramolecular Polymers," R. Dagani, *Chemical and Engineering News*, p. 4 (December 1997), the disclosure of which is totally incorporated herein by reference, discloses self-assembling polymers containing the 2-ureido-4-pyrimidone group.

"Supramolecular Polymers from Linear Telechelic Siloxanes with Quadruple-Hydrogen-Bonded Units," J. H. K. Ky Hirschberg et al., *Macromolecules*, Vol. 32, p. 2696 (1999), the disclosure of which is totally incorporated herein by reference, discloses the preparation of telechelic oligo- and poly(dimethylsiloxanes) with two ureidopyrimidone functional groups by a hydrosilylation reaction. The compounds were characterized in solution by $^{1}$H NMR and viscometry and in the solid state by $^{1}$H NMR and $^{13}$C NMR, FTIR, and rheology measurements. The measurements showed that the ureidopyrimidone groups were associated via quadruple hydrogen bonds in a donor-donor-acceptor-acceptor array. In many aspects, the materials behaved like entangled, high molecular weight polymers.

"Design and Synthesis of 'Smart' Supramolecular Liquid Crystalline Polymers via Hydrogen-Bond Associations," A. C. Griffin et al., *PMSE Proceedings*, Vol. 72, p. 172 (1995), the disclosure of which is totally incorporated herein by reference, discloses the creation of novel liquid crystalline materials by associating two complementary components through hydrogen bonding.

"The Design of Organic Gelators: Solution and Solid State Properties of a Family of Bis-Ureas," Andrew J. Carr et al., *Tetrahedron Letters*, Vol. 39, p. 7447 (1998), the disclosure of which is totally incorporated herein by reference, discloses the synthesis of a family of bis-ureas that were shown to function as effective gelators in certain organic solvents. The X-ray structure of one bis-urea showed a cylindrical hydrogen bonding network with extensive interdigitation of the alkyl esters which project from the central rod.

"Hydrogen-Bonded Supramolecular Polymer Networks," Ronald F. M. Lange et al., *Journal of Polymer Science, Part*

*A: Polymer Chemistry*, Vol. 37, p. 3657 (1999), the disclosure of which is totally incorporated herein by reference, discloses reversible polymer networks obtained by the strong dimerizing, quadruple hydrogen-bonding ureido-pyrimidone unit. A new synthetic route from commercially available starting materials is also described. The hydrogen-bonding ureido-pyrimidone network is prepared using 3(4)-isocyanatomethyl-1-methylcyclohexyl-isocyanate (IMCI) in the regioselective coupling reaction of multi-hydroxy functionalized polymers with isocytosines. $^{1}$H- and $^{13}$C-NMR, IR, MS, and ES-MS analysis, performed on a model reaction using butanol, demonstrated the formation of the hydrogen-bonding ureido-pyrimidone unit in a yield of more than 95 percent. The well-defined, strong hydrogen-bonding ureido-pyrimidone network was compared with a traditional covalently bonded polymer network, a multi-directional hydrogen-bonded polymer network based on urea units, and a reference compound. The advantage of the reversible, hydrogen-bonded polymer networks was the formation of the thermodynamically most favorable products, which showed a higher "virtual" molecular weight and shear modulus, compared to the irreversible, covalently bonded polymer network. The properties of the ureido-pyrimidone network were unique, the well-defined and strong dimerization of the ureido-pyrimidone unit did not require any additional stabilization such as crystallization or other kinds of phase separation, and displayed a well-defined viscoelastic transition. The ureido-pyrimidone dimerization was strong enough to construct supramolecular materials possessing acceptable mechanical properties.

"Combining Self-Assembly and Self-Association—Towards Columnar Supramolecular Structures in Solution and in Liquid-Crystalline Mesophase," Arno Kraft et al., *Polym. Mater. Sci. Eng.*, Vol. 80, p. 18 (1999), the disclosure of which is totally incorporated herein by reference, discloses the investigation of acid-base complexes that associate through hydrogen-bonding.

"Facile Synthesis of β-Keto Esters from Methyl Acetoacetate and Acid Chloride: The Barium Oxide/Methanol System," Y. Yuasa et al., *Organic Process Research and Development*, Vol. 2, p. 412 (1998), the disclosure of which is totally incorporated herein by reference, discloses the synthesis of β-keto esters in good yield by reacting methyl acetoacetate with barium oxide, acylating the resulting barium complex with acid chloride, and then cleaving the α-acyl β-keto ester with methanol at a mild temperature. Using this procedure, various β-keto esters were prepared, such as methyl 4-phenyl-3-oxobutanoate, methyl 3-phenyl-3-oxopropionate, methyl 4-cyclohexyl-3-oxobutanoate, and methyl 3-oxooctadecanoate.

"Self-Complementary Hydrogen Bonding of 1,1'-Bicyclohexylidene-4,4'-dione Dioxime. Formation of a Non-Covalent Polymer," F. Hoogesteger et al., *Tetrahedron*, Vol. 52, No. 5, p. 1773 (1996), the disclosure of which is totally incorporated herein by reference, discloses that 1,1'-bicyclohexylidene-4,4'-dione dioxime self-assembles into a non-covalent polymer structure in the solid state due to intermolecular directional hydrogen bonding between the oxime functionalities.

"Molecular Tectonics. Three-Dimensional Organic Networks with Zeolite Properties," X. Wang et al., *J. Am. Chem. Soc.*, Vol. 116, p. 12119 (1994), the disclosure of which is totally incorporated herein by reference, discloses molecules whose interactions are dominated by specific attractive forces that induce the assembly of aggregates with controlled geometries.

"Helical Self-Assembled Polymers from Cooperative Stacking of Hydrogen-Bonded Pairs," J. H. K. Ky Hirschberg et al., *Nature*, Vol. 407, p. 167 (2000), the disclosure of which is totally incorporated herein by reference, discloses a general strategy for the design of functionalized monomer units and their association in either water or alkanes into non-covalently linked polymeric structures with controlled helicity and chain length. The monomers consist of bifunctionalized ureidotriazine units connected by a spacer and carrying solubilizing chains at the periphery. This design allows for dimerization through self-complementary quadruple hydrogen bonding between the units and solvophobically induced stacking of the dimers into columnar polymeric architectures, whose structure and helicity can be adjusted by tuning the nature of the solubilizing side chains.

"New Supramolecular Arrays based on Interactions between Carboxylate and Urea Groups: Solid-State and Solution Behavior," Abdullah Zafar et al., *New J. Chem.*, 1998, 137–141, the disclosure of which is totally incorporated herein by reference, discloses interaction between urea and carboxylate groups which can give extended hydrogen bonded aggregates.

U.S. Pat. No. 5,180,425 (Matrick et al.), the disclosure of which is totally incorporated herein by reference, discloses an ink for ink jet printers which comprises an aqueous carrier medium, pigment dispersion or dye, and a polyol/alkylene oxide condensate cosolvent which eliminates film formation on thermal ink jet resistor surfaces thereby eliminating non-uniformity in optical density. The cosolvent present at least 5 percent has a solubility in water of at least 4.5 parts in 100 parts of water at 25° C. and a general formula:

$$\begin{array}{l} CH_2O(CH_2CHXO)_aH \\ \;| \\ [RC(CH_2)_bO(CH_2CHXO)_cH]_f \\ \;| \\ CH_2O(CH_2CHXO)_dH \end{array}$$

wherein X=—H or —$CH_3$; R=—H, —$CH_3$, —$C_2H_5$, —$C_3H_7$, —$C_4H_9$, or —$CH_2O(CH_2CH_2O)_eH$; b=0 or 1, a+d+f(c+e)=2 to 100; and f=1 to 6, the cosolvent being present in the amount of at least 4.5 percent based on the total weight of the ink jet ink composition. These inks exhibit freedom from thermal resistor film formation, have excellent decap performance, are storage stable and give images having excellent print quality.

While known compositions and processes are suitable for their intended purposes, a need remains for improved aqueous inks. In addition, a need remains for aqueous ink compositions with improved dry smear resistance. Further, a need remains for aqueous ink compositions with improved wet smear resistance. Additionally, a need remains for aqueous ink compositions with good waterfastness characteristics. There is also a need for aqueous ink compositions that exhibit reduced intercolor bleed when printed adjacent to or on top of or underneath other aqueous inks of different colors. In addition, there is a need for aqueous ink compositions with desirable viscosity values at thermal ink jet jetting temperatures. Further, there is a need for aqueous ink compositions that exhibit desirable latency characteristics in thermal ink jet printers. Additionally, there is a need for aqueous ink compositions that exhibit acceptable kogation characteristics when used in thermal ink jet printers. A need also remains for ink compositions that exhibit reduced penetration and spreading when applied to paper recording substrates. In addition, a need remains for ink compositions that generate images with good permanence characteristics.

SUMMARY OF THE INVENTION

The present invention is directed to an aqueous ink composition comprising an aqueous liquid vehicle, a colorant, and an additive which is either (1) a material selected from (a) those of the formula $$C_1—X—C_2$$

(b) those of the formula

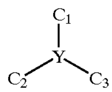

(c) those of the formula

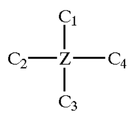

or (d) mixtures of two or more of (a), (b), and/or (c); or (2) a material selected from mixtures of (a) at least one member selected from (i) those of the formula $$A_1\text{-}X_1\text{-}A_2$$

(ii) those of the formula

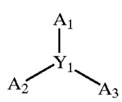

(iii) those of the formula

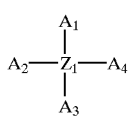

(iv) those of the formula $$A_1\text{-}X_1—B_1$$

(v) those of the formula

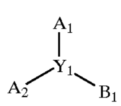

(vi) those of the formula

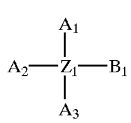

(vii) those of the formula

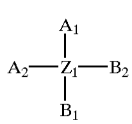

or (viii) mixtures of two or more of (i), (ii), (iii), (iv), (v), (vi), and/or (vii), and (b) at least one member selected from (i) those of the formula $$B_1—X_2—B_2$$

(ii) those of the formula

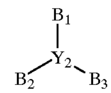

(iii) those of the formula

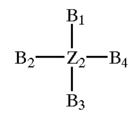

(iv) those of the formula $$A_2\text{-}X_2—B_2$$

(v) those of the formula

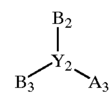

(vi) those of the formula

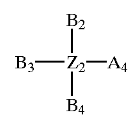

(vii) those of the formula

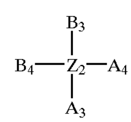

or (viii) mixtures of two or more of (i), (ii), (iii), (iv), (v), (vi), and/or (vii), wherein each "A" is an acidic moiety and each "B" is a basic moiety, wherein each "A" is capable of forming at least one hydrogen bond with at least one "B" and each "B" is capable of forming at least one hydrogen bond with at least one "A", each "C" is a moiety either capable of forming at least one hydrogen bond with a moiety identical to itself or capable of forming at least one hydrogen bond with another "C" moiety, each "X" is a divalent moiety, each "Y" is a trivalent moiety, and each "Z" is a tetravalent moiety, wherein, when the ink has been applied to a recording substrate in an image pattern and a substantial amount of the aqueous liquid vehicle has evaporated from the ink image, hydrogen bonds of sufficient strength exist either between the "A" groups and the "B" groups or between the "C" groups so that the additive forms hydrogen-bonded oligomers or polymers.

DETAILED DESCRIPTION OF THE INVENTION

The present invention is directed to an aqueous ink composition comprising an aqueous liquid vehicle, a colorant, and an additive which is either (1) a material selected from (a) those of the formula $$C_1—X—C_2$$

(b) those of the formula

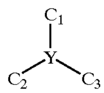

(c) those of the formula

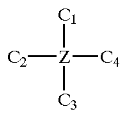

or (d) mixtures of two or more of (a), (b), and/or (c); or (2) a material selected from mixtures of (a) at least one member selected from (i) those of the formula $$A_1\text{-}X_1\text{-}A_2$$

(ii) those of the formula

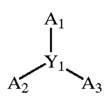

(iii) those of the formula

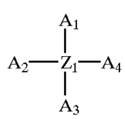

(iv) those of the formula $$A_1\text{-}X_1\text{—}B_1$$

(v) those of the formula

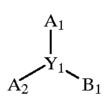

(vi) those of the formula

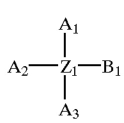

(vii) those of the formula

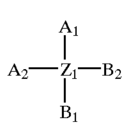

or (viii) mixtures of two or more of (i), (ii), (iii), (iv), (v), (vi), and/or (vii), and (b) at least one member selected from (i) those of the formula $$B_1\text{—}X_2\text{—}B_2$$

(ii) those of the formula

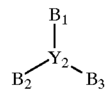

(iii) those of the formula

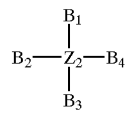

(iv) those of the formula $$A_2\text{-}X_2\text{—}B_2$$

(v) those of the formula

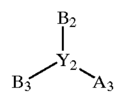

(vi) those of the formula

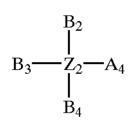

(vii) those of the formula

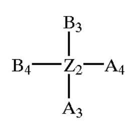

or (viii) mixtures of two or more of (i), (ii), (iii), (iv), (v), (vi), and/or (vii), wherein each "A" is an acidic moiety and each "B" is a basic moiety, wherein each "A" is capable of forming at least one hydrogen bond with at least one "B" and each "B" is capable of forming at least one hydrogen bond with at least one "A", each "C" is a moiety either capable of forming at least one hydrogen bond with a moiety identical to itself or capable of forming at least one hydrogen bond with another "C" moiety, each "X" is a divalent moiety, each "Y" is a trivalent moiety, and each "Z" is a tetravalent moiety, wherein, when the ink has been applied to a recording substrate in an image pattern and a substantial amount of the aqueous liquid vehicle has evaporated from the ink image, hydrogen bonds of sufficient strength exist either between the "A" groups and the "B" groups or between the "C" groups so that the additive forms hydrogen-bonded oligomers or polymers.

In a specific embodiment, "A" is a moiety containing a carboxylic acid group, "B" is either (i) a moiety containing a pyridine group, (ii) a moiety containing a urea group, (iii) a moiety containing an imidazole group, or (iv) combinations or mixtures thereof, and "C" is either (i) a moiety containing a carboxylic acid group, (ii) a moiety containing a urea group, (iii) a moiety containing a pyridone group, (iv) a moiety containing a ureido-pyrimidone group, (v) a moiety containing an imidazole group, (vi) a moiety containing an oxime group, or (vii) combinations or mixtures thereof.

Examples of suitable "A" groups include carboxylic acids, including those of the general formulae

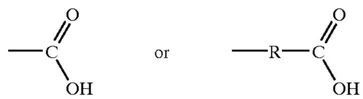

wherein R is an alkylene group (including linear, branched, cyclic, saturated, unsaturated, and substituted alkylene groups, and wherein hetero atoms, such as oxygen, sulfur, nitrogen, silicon, or the like, can be placed between the carbon atoms in the alkylene group), typically with from 1 to about 12 carbon atoms and preferably with from 1 to about 6 carbon atoms, although the number of carbon atoms can be outside of these ranges, an arylene group (including substituted arylene groups), typically with from 6 to about 10 carbon atoms, although the number of carbon atoms can be outside of this range, an arylalkylene group (including substituted arylalkylene groups), typically with from 7 to about 12 carbon atoms and preferably with from 7 to about 9 carbon atoms, although the number of carbon atoms can be outside of these ranges, an alkylarylene group (including substituted alkylarylene groups), typically with from 7 to about 12 carbon atoms and preferably with from 7 to about 9 carbon atoms, although the number of carbon atoms can be outside of these ranges, an alkyleneoxy group (including substituted alkyleneoxy groups), typically with from 1 to about 12 carbon atoms and preferably with from 1 to about 6 carbon atoms, although the number of carbon atoms can be outside of these ranges, a polyalkyleneoxy group (including substituted polyalkyleneoxy groups), typically a polyethyleneoxy group or a polypropyleneoxy group, typically with from 2 to about 20 repeat alkyleneoxy units, and preferably with from 2 to about 10 repeat alkyleneoxy units, although the number of repeat alkyleneoxy units can be outside of these ranges, a heterocyclic group (including substituted heterocyclic groups), typically with from 0 to about 10 carbon atoms, and typically with from about 5 to about 10 ring atoms, although the number of carbon atoms and the number of ring atoms can be outside of these ranges, wherein the heteroatoms in the heterocyclic groups can be (but are not limited to) nitrogen, oxygen, sulfur, silicon, and the like, as well as mixtures thereof, a silylene group (including substituted silylene groups), a siloxane group (including substituted siloxane groups), a polysiloxane group (including substituted polysiloxane groups) typically with from 2 to about 12 repeat siloxane units, although the number of repeat siloxane units can be outside of this range, and wherein the substituents on the substituted alkylene, arylene, alkylarylene, arylalkylene, alkyleneoxy, polyalkyleneoxy, heterocyclic, silylene, siloxane, and polysiloxane groups can be (but are not limited to) hydroxy groups, amine groups, imine groups, ammonium groups, cyano groups, pyridine groups, pyridinium groups, ether groups, aldehyde groups, ketone groups, carboxylic acid groups, ester groups, amide groups, carbonyl groups, thiocarbonyl groups, sulfonate groups, sulfoxide groups, nitrile groups, sulfone groups, acyl groups, acid anhydride groups, azide groups, mixtures thereof, and the like, wherein two or more substituents can be joined together to form a ring, and the like.

Specific examples of suitable "A" groups include

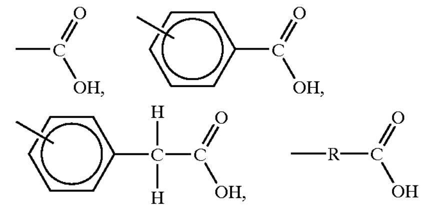

wherein R is an alkyl group typically with from 1 to about 12 carbon atoms,

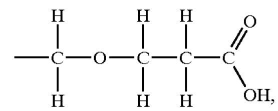

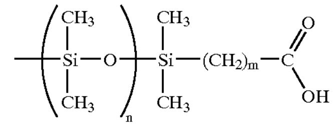

wherein n is an integer typically of from 1 to about 12 and m is an integer typically of from about 3 to about 12,

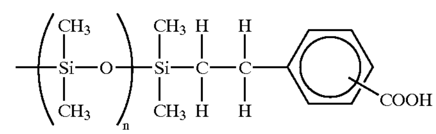

wherein n is an integer typically of from 1 to about 12,

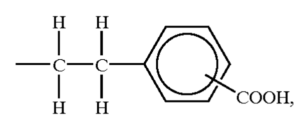

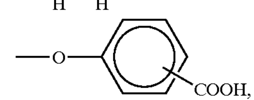

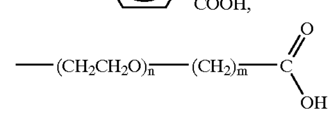

wherein n is an integer typically of from 1 to about 20 and m is an integer typically of from about 3 to about 12,

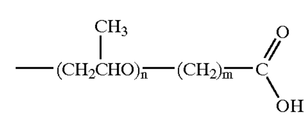

wherein n is an integer typically of from 1 to about 20 and m is an integer typically of from about 3 to about 12, and the like.

Examples of suitable "B" groups include pyridine groups, of the general formulae

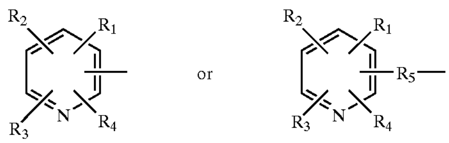

wherein $R_1$, $R_2$, $R_3$, and $R_4$ each, independently of the others, is a hydrogen atom, an alkyl group (including linear, branched, cyclic, saturated, unsaturated, and substituted alkyl groups, and wherein hetero atoms, such as oxygen, sulfur, nitrogen, silicon, or the like, can be placed between the carbon atoms in the alkylene group), typically with from 1 to about 2 carbon atoms, although the number of carbon atoms can be outside of this range, an alkoxy group (including substituted alkoxy groups), typically with from 1 to about 2 carbon atoms, although the number of carbon atoms can be outside of this range, a polyalkyleneoxy group (including substituted polyalkyleneoxy groups), typically a polyethyleneoxy group or a polypropyleneoxy group, typically with from 2 to about 20 repeat alkyleneoxy units, and preferably with from 2 to about 10 repeat alkyleneoxy units, although the number of repeat alkyleneoxy units can be outside of these ranges, a hydroxy group, an amine group, an imine group, an ammonium group, a cyano group, a pyridine group, a pyridinium group, an ether group, an aldehyde group, a ketone group, a carboxylic acid group, an ester group, an amide group, a carbonyl group, a thiocarbonyl group, a sulfonate group, a sulfoxide group, a nitrile group, a sulfone group, an acyl group, an acid anhydride group, or an azide group, and $R_5$ is an alkylene group (including linear, branched, cyclic, saturated, unsaturated, and substituted alkylene groups, and wherein hetero atoms, such as oxygen, sulfur, nitrogen, silicon, or the like, can be placed between the carbon atoms in the alkylene group), typically with from 1 to about 12 carbon atoms and preferably with from 1 to about 6 carbon atoms, although the number of carbon atoms can be outside of these ranges, an arylene group (including substituted arylene groups), typically with from 6 to about 10 carbon atoms, although the number of carbon atoms can be outside of this range, an arylalkylene group (including substituted arylalkylene groups), typically with from 7 to about 12 carbon atoms and preferably with from 7 to about 9 carbon atoms, although the number of carbon atoms can be outside of these ranges, an alkylarylene group (including substituted alkylarylene groups), typically with from 7 to about 12 carbon atoms and preferably with from 7 to about 9 carbon atoms, although the number of carbon atoms can be outside of these ranges, an alkyleneoxy group (including substituted alkyleneoxy groups), typically with from 1 to about 12 carbon atoms and preferably with from 1 to about 6 carbon atoms, although the number of carbon atoms can be outside of these ranges, a polyalkyleneoxy group (including substituted polyalkyleneoxy groups), typically a polyethyleneoxy group or a polypropyleneoxy group, typically with from 2 to about 20 repeat alkyleneoxy units, and preferably with from 2 to about 10 repeat alkyleneoxy units, although the number of repeat alkyleneoxy units can be outside of these ranges, a heterocyclic group (including substituted heterocyclic groups), typically with from 0 to about 10 carbon atoms, and typically with from about 5 to about 10 ring atoms, although the number of carbon atoms and the number of ring atoms can be outside of these ranges, wherein the heteroatoms in the heterocyclic groups can be (but are not limited to) nitrogen, oxygen, sulfur, silicon, and the like, as well as mixtures thereof, a silylene group (including substituted silylene groups), a siloxane group (including substituted siloxane groups), a polysiloxane group (including substituted polysiloxane groups) typically with from 2 to about 12 repeat siloxane units, although the number of repeat siloxane units can be outside of this range, and wherein the substituents on the substituted alkyl, alkylene, arylene, alkylarylene, arylalkylene, alkoxy, alkyleneoxy, polyalkyleneoxy, heterocyclic, silylene, siloxane, and polysiloxane groups can be (but are not limited to) hydroxy groups, amine groups, imine groups, ammonium groups, cyano groups, pyridine groups, pyridinium groups, ether groups, aldehyde groups, ketone groups, carboxylic acid groups, ester groups, amide groups, carbonyl groups, thiocarbonyl groups, sulfonate groups, sulfoxide groups, nitrile groups, sulfone groups, acyl groups, acid anhydride groups, azide groups, mixtures thereof, and the like, wherein two or more substituents can be joined together to form a ring, and the like, and, in the instance wherein the "B" group is a pyridine group, it should be noted that the "X" central moiety can be a direct bond, resulting in a compound of the formula

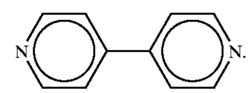

Within the class of pyridines, acylaminopyridines are particularly suitable "B" groups, including those of the general formula

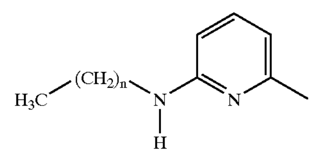

wherein n is an integer representing the number of repeat —$CH_2$— groups, and typically being from 0 to about 3, although the value of n can be outside of this range.

Also suitable as "B" groups are urea groups, including those of the general formulae

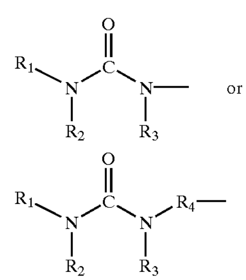

wherein, provided that at least one of $R_1$, $R_2$, and $R_3$ is a hydrogen atom, $R_1$, $R_2$, and $R_3$ each can be a hydrogen atom, an alkyl group (including linear, branched, cyclic, saturated, unsaturated, and substituted alkyl groups, and wherein hetero atoms, such as oxygen, sulfur, nitrogen, silicon, or the like, can be placed between the carbon atoms in the alkylene group), typically with from 1 to about 12 carbon atoms and preferably with from 1 to about 6 carbon atoms, although the number of carbon atoms can be outside of these ranges, an aryl group (including substituted aryl groups), typically with about 6 carbon atoms, and $R_4$ is an alkylene group (including linear, branched, cyclic, saturated, unsaturated, and substituted alkylene groups, and wherein hetero atoms, such as oxygen, sulfur, nitrogen, silicon, or the like, can be placed between the carbon atoms in the alkylene group), typically with from 1 to about 12 carbon atoms and preferably with from 1 to about 6 carbon atoms, although the number of carbon atoms can be outside of these ranges, an arylene group (including substituted arylene groups), typically with from 6 to about 10 carbon atoms, although the number of carbon atoms can be outside of this range, an arylalkylene group (including substituted arylalkylene groups), typically with from 7 to about 12 carbon atoms and preferably with from 7 to about 9 carbon atoms, although the number of carbon atoms can be outside of these ranges, an alkylarylene group (including substituted alkylarylene groups), typically with from 7 to about 12 carbon atoms and preferably with from 7 to about 9 carbon atoms, although the number of carbon atoms can be outside of these ranges, a heterocyclic group (including substituted heterocyclic groups), typically with from 0 to about 10 carbon atoms, and typically with from about 5 to about 10 ring atoms, although the number of carbon atoms and the number of ring atoms can be outside of these ranges, wherein the heteroatoms in the heterocyclic groups can be (but are not limited to) nitrogen, oxygen, sulfur, silicon, and the like, as well as mixtures thereof, a silylene group (including substituted silylene groups), a siloxane group (including substituted siloxane groups), a polysiloxane group (including substituted polysiloxane groups) typically with from 2 to about 12 repeat siloxane units, although the number of repeat siloxane units can be outside of this range, and wherein the substituents on the substituted alkyl, alkylene, aryl, arylene, alkylarylene, arylalkylene, alkyleneoxy, polyalkyleneoxy, heterocyclic, silylene, siloxane, and polysiloxane groups can be (but are not limited to) hydroxy groups, amine groups, imine groups, ammonium groups, cyano groups, pyridine groups, pyridinium groups, ether groups, aldehyde groups, ketone groups, carboxylic acid groups, ester groups, amide groups, carbonyl groups, thiocarbonyl groups, sulfonate groups, sulfoxide groups, nitrile groups, sulfone groups, acyl groups, acid anhydride groups, azide groups, mixtures thereof, and the like, wherein two or more substituents can be joined together to form a ring, and the like.

Also suitable as "B" groups are imidazole groups, including those of the general formulae

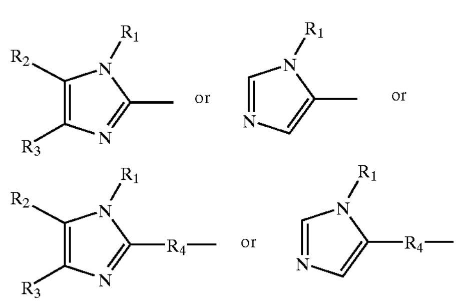

wherein $R_1$ is a hydrogen atom or an alkyl group (including linear, branched, cyclic, saturated, unsaturated, and substituted alkyl groups, and wherein hetero atoms, such as oxygen, sulfur, nitrogen, silicon, or the like, can be placed between the carbon atoms in the alkylene group), typically with from 1 to about 4 carbon atoms, although the number of carbon atoms can be outside of this range, $R_2$ and $R_3$ each, independently of the other, is a hydrogen atom, an alkyl group (including linear, branched, cyclic, saturated, unsaturated, and substituted alkyl groups, and wherein hetero atoms, such as oxygen, sulfur, nitrogen, silicon, or the like, can be placed between the carbon atoms in the alkylene group), typically with from 1 to about 2 carbon atoms, although the number of carbon atoms can be outside of this range, an alkoxy group (including substituted alkoxy groups), typically with from 1 to about 2 carbon atoms, although the number of carbon atoms can be outside of this range, a polyalkyleneoxy group (including substituted polyalkyleneoxy groups), typically a polyethyleneoxy group or a polypropyleneoxy group, typically with from 2 to about 20 repeat alkyleneoxy units, and preferably with from 2 to about 10 repeat alkyleneoxy units, although the number of repeat alkyleneoxy units can be outside of these ranges, a hydroxy group, an amine group, an imine group, an ammonium group, a cyano group, a pyridine group, a pyridinium group, an ether group, an aldehyde group, a ketone group, a carboxylic acid group, an ester group, an amide group, a carbonyl group, a thiocarbonyl group, a sulfonate group, a sulfoxide group, a nitrile group, a sulfone group, an acyl group, an acid anhydride group, or an azide group, and $R_4$ is an alkylene group (including linear, branched, cyclic, saturated, unsaturated, and substituted alkylene groups, and wherein hetero atoms, such as oxygen, sulfur, nitrogen, silicon, or the like, can be placed between the carbon atoms in the alkylene group), typically with from 1 to about 12 carbon atoms and preferably with from 1 to about 6 carbon atoms, although the number of carbon atoms can be outside of these ranges, an arylene group (including substituted arylene groups), typically with from 6 to about 10 carbon atoms, although the number of carbon atoms can be outside of this range, an arylalkylene group (including substituted arylalkylene groups), typically with from 7 to about 12 carbon atoms and preferably with from 7 to about 9 carbon atoms, although the number of carbon atoms can be outside of these ranges, an alkylarylene group (including substituted alkylarylene groups), typically with from 7 to about 12 carbon atoms and preferably with from 7 to about 9 carbon atoms, although the number of carbon atoms can be outside of these ranges, an alkyleneoxy group (including substituted alkyleneoxy groups), typically with from 1 to about 12 carbon atoms and preferably with from 1 to about 6 carbon atoms, although the number of carbon atoms can be outside of these ranges, a polyalkyleneoxy group (including substituted polyalkyleneoxy groups), typically a polyethyleneoxy group or a polypropyleneoxy group, typically with from 2 to about 20 repeat alkyleneoxy units, and preferably with from 2 to about 10 repeat alkyleneoxy units, although the number of repeat alkyleneoxy units can be outside of these ranges, a heterocyclic group (including substituted heterocyclic groups), typically with from 0 to about 10 carbon atoms, and typically with from about 5 to about 10 ring atoms, although the number of carbon atoms and the number of ring atoms can be outside of these ranges, wherein the heteroatoms in the heterocyclic groups can be (but are not limited to) nitrogen, oxygen, sulfur, silicon, and the like, as well as mixtures thereof, a silylene group (including substituted silylene groups), a siloxane group (including substituted siloxane groups), a polysiloxane group (including substituted polysiloxane groups) typically with from 2 to about 12 repeat siloxane units, although the number of repeat siloxane units can be outside of this range, and wherein the substituents on the substituted alkyl, alkylene, arylene, alkylarylene, arylalkylene, alkoxy, alkyleneoxy, polyalkyleneoxy, heterocyclic, silylene, siloxane, and polysiloxane groups can be (but are not limited to) hydroxy groups, amine groups, imine groups, ammonium groups, cyano groups, pyridine groups, pyridinium groups, ether groups, aldehyde groups, ketone groups, carboxylic acid groups, ester groups, amide groups, carbonyl groups, thiocarbonyl groups, sulfonate groups, sulfoxide groups, nitrite groups, sulfone groups, acyl groups, acid anhydride groups, azide groups, mixtures thereof, and the like, wherein two or more substituents can be joined together to form a ring, and the like.

Specific examples of suitable “B” groups include

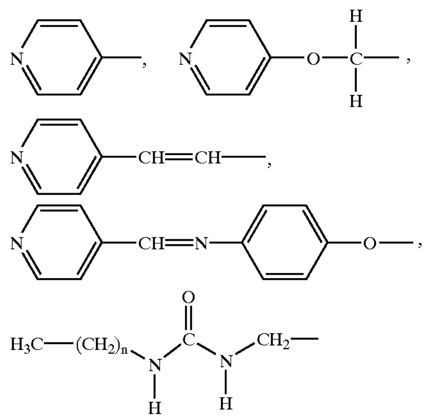

wherein n is an integer typically of from 0 to about 3,

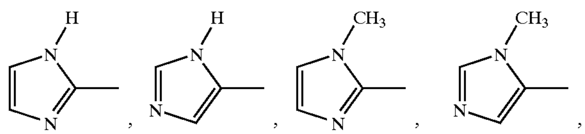

and the like.

Examples of suitable “C” groups include carboxylic acid groups, including those of the general formulae

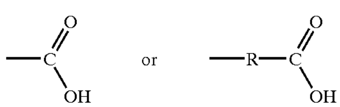

wherein R is an alkylene group (including linear, branched, cyclic, saturated, unsaturated, and substituted alkylene groups, and wherein hetero atoms, such as oxygen, sulfur, nitrogen, silicon, or the like, can be placed between the carbon atoms in the alkylene group), typically with from 1 to about 12 carbon atoms and preferably with from 1 to about 6 carbon atoms, although the number of carbon atoms can be outside of these ranges, an arylene group (including substituted arylene groups), typically with from 6 to about 10 carbon atoms, although the number of carbon atoms can be outside of this range, an arylalkylene group (including substituted arylalkylene groups), typically with from 7 to about 12 carbon atoms and preferably with from 7 to about 9 carbon atoms, although the number of carbon atoms can be outside of these ranges, an alkylarylene group (including substituted alkylarylene groups), typically with from 7 to about 12 carbon atoms and preferably with from 7 to about 9 carbon atoms, although the number of carbon atoms can be outside of these ranges, an alkyleneoxy group (including substituted alkyleneoxy groups), typically with from 1 to about 12 carbon atoms and preferably with from 1 to about 6 carbon atoms, although the number of carbon atoms can be outside of these ranges, a polyalkyleneoxy group (including substituted polyalkyleneoxy groups), typically a polyethyleneoxy group or a polypropyleneoxy group, typically with from 2 to about 20 repeat alkyleneoxy units, and preferably with from 2 to about 10 repeat alkyleneoxy units, although the number of repeat alkyleneoxy units can be outside of these ranges, a heterocyclic group (including substituted heterocyclic groups), typically with from 0 to about 10 carbon atoms, and typically with from about 5 to about 10 ring atoms, although the number of carbon atoms and the number of ring atoms can be outside of these ranges, wherein the heteroatoms in the heterocyclic groups can be (but are not limited to) nitrogen, oxygen, sulfur, silicon, and the like, as well as mixtures thereof, a silylene group (including substituted silylene groups), a siloxane group (including substituted siloxane groups), a polysiloxane group (including substituted polysiloxane groups) typically with from 2 to about 12 repeat siloxane units, although the number of repeat siloxane units can be outside of this range, and wherein the substituents on the substituted alkylene, arylene, alkylarylene, arylalkylene, alkyleneoxy, polyalkyleneoxy, heterocyclic, silylene, siloxane, and polysiloxane groups can be (but are not limited to) hydroxy groups, amine groups, imine groups, ammonium groups, cyano groups, pyridine groups, pyridinium groups, ether groups, aldehyde groups, ketone groups, carboxylic acid groups, ester groups, amide groups, carbonyl groups, thiocarbonyl groups, sulfonate groups, sulfoxide groups, nitrile groups, sulfone groups, acyl groups, acid anhydride groups, azide groups, mixtures thereof, and the like, wherein two or more substituents can be joined together to form a ring, and the like.

Also suitable as “C” groups are urea groups, including those of the general formulae

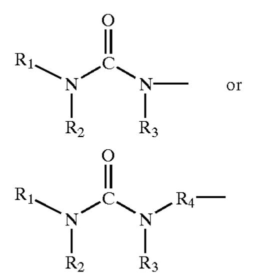

wherein, provided that at least one of $R_1$, $R_2$, and $R_3$ is a hydrogen atom, $R_1$, $R_2$, and $R_3$ each can be a hydrogen atom, an alkyl group (including linear, branched, cyclic, saturated, unsaturated, and substituted alkyl groups, and wherein hetero atoms, such as oxygen, sulfur, nitrogen, silicon, or the like, can be placed between the carbon atoms in the alkylene group), typically with from 1 to about 12 carbon atoms and preferably with from 1 to about 6 carbon atoms, although the number of carbon atoms can be outside of these ranges, an aryl group (including substituted aryl groups), typically with about 6 carbon atoms, and $R_4$ is an alkylene group (including linear, branched, cyclic, saturated, unsaturated, and substituted alkylene groups, and wherein hetero atoms, such as oxygen, sulfur, nitrogen, silicon, or the like, can be placed between the carbon atoms in the alkylene group), typically with from 1 to about 12 carbon atoms and preferably with from 1 to about 6 carbon atoms, although the number of carbon atoms can be outside of these ranges, an arylene group (including substituted arylene groups), typically with from 6 to about 10 carbon atoms, although the number of carbon atoms can be outside of this range, an arylalkylene group (including substituted arylalkylene groups), typically with from 7 to about 12 carbon atoms and preferably with from 7 to about 9 carbon atoms, although the number of carbon atoms can be outside of these ranges, an alkylarylene group (including substituted alkylarylene groups), typically with from 7 to about 12 carbon atoms and preferably with from 7 to about 9 carbon atoms, although the number of carbon atoms can be outside of these ranges, a heterocyclic group (including substituted heterocyclic groups), typically with from 0 to about 10 carbon atoms, and typically with from about 5 to about 10 ring atoms, although the number of carbon atoms and the number of ring atoms can be outside of these ranges, wherein the heteroatoms in the heterocyclic groups can be (but are not limited to) nitrogen, oxygen, sulfur, silicon, and the like, as well as mixtures thereof, a silylene group (including substituted silylene groups), a siloxane group (including substituted siloxane groups), a polysiloxane group (including substituted polysiloxane groups) typically with from 2 to about 12 repeat siloxane units, although the number of repeat siloxane units can be outside of this range, and wherein the substituents on the substituted alkyl, alkylene, aryl, arylene, alkylarylene, arylalkylene, alkyleneoxy, polyalkyleneoxy, heterocyclic, silylene, siloxane, and polysiloxane groups can be (but are not limited to) hydroxy groups, amine groups, imine groups, ammonium groups, cyano groups, pyridine groups, pyridinium groups, ether groups, aldehyde groups, ketone groups, carboxylic acid groups, ester groups, amide groups, carbonyl groups, thiocarbonyl groups, sulfonate groups, sulfoxide groups, nitrile groups, sulfone groups, acyl groups, acid anhydride groups, azide groups, mixtures thereof, and the like, wherein two or more substituents can be joined together to form a ring, and the like, Also suitable as "C" groups are pyridone groups, including those of the general formulae

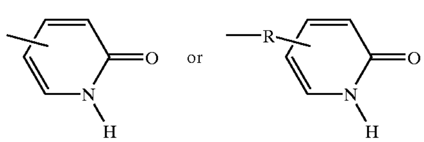

wherein R is an alkylene group (including linear, branched, cyclic, saturated, unsaturated, and substituted alkylene groups, and wherein hetero atoms, such as oxygen, sulfur, nitrogen, silicon, or the like, can be placed between the carbon atoms in the alkylene group), typically with from 1 to about 12 carbon atoms and preferably with from 1 to about 6 carbon atoms, although the number of carbon atoms can be outside of these ranges, an arylene group (including substituted arylene groups), typically with from 6 to about 10 carbon atoms, although the number of carbon atoms can be outside of this range, an arylalkylene group (including substituted arylalkylene groups), typically with from 7 to about 12 carbon atoms and preferably with from 7 to about 9 carbon atoms, although the number of carbon atoms can be outside of these ranges, an alkylarylene group (including substituted alkylarylene groups), typically with from 7 to about 12 carbon atoms and preferably with from 7 to about 9 carbon atoms, although the number of carbon atoms can be outside of these ranges, an alkyleneoxy group (including substituted alkyleneoxy groups), typically with from 1 to about 12 carbon atoms and preferably with from 1 to about 6 carbon atoms, although the number of carbon atoms can be outside of these ranges, a polyalkyleneoxy group (including substituted polyalkyleneoxy groups), typically a polyethyleneoxy group or a polypropyleneoxy group, typically with from 2 to about 20 repeat alkyleneoxy units, and preferably with from 2 to about 10 repeat alkyleneoxy units, although the number of repeat alkyleneoxy units can be outside of these ranges, a heterocyclic group (including substituted heterocyclic groups), typically with from 0 to about 10 carbon atoms, and typically with from about 5 to about 10 ring atoms, although the number of carbon atoms and the number of ring atoms can be outside of these ranges, wherein the heteroatoms in the heterocyclic groups can be (but are not limited to) nitrogen, oxygen, sulfur, silicon, and the like, as well as mixtures thereof, a silylene group (including substituted silylene groups), a siloxane group (including substituted siloxane groups), a polysiloxane group (including substituted polysiloxane groups) typically with from 2 to about 12 repeat siloxane units, although the number of repeat siloxane units can be outside of this range, and wherein the substituents on the substituted alkylene, arylene, alkylarylene, arylalkylene, alkyleneoxy, polyalkyleneoxy, heterocyclic, silylene, siloxane, and polysiloxane groups can be (but are not limited to) hydroxy groups, amine groups, imine groups, ammonium groups, cyano groups, pyridine groups, pyridinium groups, ether groups, aldehyde groups, ketone groups, carboxylic acid groups, ester groups, amide groups, carbonyl groups, thiocarbonyl groups, sulfonate groups, sulfoxide groups, nitrile groups, sulfone groups, acyl groups, acid anhydride groups, azide groups, mixtures thereof, and the like, wherein two or more substituents can be joined together to form a ring, and the like.

Also suitable as "C" groups are ureidopyrimidone groups, including those of the general formulae

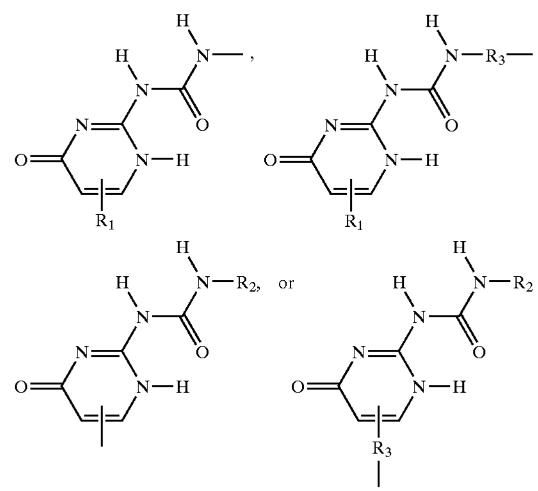

wherein $R_1$ and $R_2$ each, independently of the other, is a hydrogen atom, an alkyl group (including linear, branched, cyclic, saturated, unsaturated, and substituted alkyl groups, and wherein hetero atoms, such as oxygen, sulfur, nitrogen, silicon, or the like, can be placed between the carbon atoms in the alkyl group), typically with from 1 to about 6 carbon atoms and preferably with from 1 to about 4 carbon atoms, although the number of carbon atoms can be outside of these ranges, an aryl group (including substituted aryl groups), typically with from 6 to about 10 carbon atoms, although the number of carbon atoms can be outside of this range, and $R_3$ is an alkylene group (including linear, branched, cyclic, saturated, unsaturated, and substituted alkylene groups, and wherein hetero atoms, such as oxygen, sulfur, nitrogen, silicon, or the like, can be placed between the carbon atoms in the alkylene group), typically with from 1 to about 12 carbon atoms and preferably with from 1 to about 6 carbon atoms, although the number of carbon atoms can be outside of these ranges, an arylene group (including substituted arylene groups), typically with from 6 to about 10 carbon atoms, although the number of carbon atoms can be outside of this range, an arylalkylene group (including substituted arylalkylene groups), typically with from 7 to about 12 carbon atoms and preferably with from 7 to about 9 carbon atoms, although the number of carbon atoms can be outside of these ranges, an alkylarylene group (including substituted alkylarylene groups), typically with from 7 to about 12 carbon atoms and preferably with from 7 to about 9 carbon atoms, although the number of carbon atoms can be outside of these ranges, an alkyleneoxy group (including substituted alkyleneoxy groups), typically with from 1 to about 12 carbon atoms and preferably with from 1 to about 6 carbon atoms, although the number of carbon atoms can be outside of these ranges, a polyalkyleneoxy group (including substituted polyalkyleneoxy groups), typically a polyethyleneoxy group or a polypropyleneoxy group, typically with from 2 to about 20 repeat alkyleneoxy units, and preferably with from 2 to about 10 repeat alkyleneoxy units, although the number of repeat alkyleneoxy units can be outside of these ranges, a heterocyclic group (including substituted heterocyclic groups), typically with from 0 to about 10 carbon atoms, and typically with from about 5 to about 10 ring atoms, although the number of carbon atoms and the number of ring atoms can be outside of these ranges, wherein the heteroatoms in the heterocyclic groups can be (but are not limited to) nitrogen, oxygen, sulfur, silicon, and the like, as well as mixtures thereof, a silylene group (including substituted silylene groups), a siloxane group (including substituted siloxane groups), a polysiloxane group (including substituted polysiloxane groups) typically with from 2 to about 12 repeat siloxane units, although the number of repeat siloxane units can be outside of this range, and wherein the substituents on the substituted alkyl, alkylene, aryl, arylene, alkylarylene, arylalkylene, alkyleneoxy, polyalkyleneoxy, heterocyclic, silylene, siloxane, and polysiloxane groups can be (but are not limited to) hydroxy groups, amine groups, imine groups, ammonium groups, cyano groups, pyridine groups, pyridinium groups, ether groups, aldehyde groups, ketone groups, carboxylic acid groups, ester groups, amide groups, carbonyl groups, thiocarbonyl groups, sulfonate groups, sulfoxide groups, nitrile groups, sulfone groups, acyl groups, acid anhydride groups, azide groups, mixtures thereof, and the like, wherein two or more substituents can be joined together to form a ring, and the like.

Also suitable as "C" groups are oxime groups, including those of the general formulae

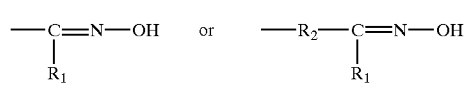

wherein $R_1$ is an alkyl group (including linear, branched, cyclic, saturated, unsaturated, and substituted alkyl groups, and wherein hetero atoms, such as oxygen, sulfur, nitrogen, silicon, or the like, can be placed between the carbon atoms in the alkyl group), typically with from 1 to about 12 carbon atoms and preferably with from 1 to about 6 carbon atoms, although the number of carbon atoms can be outside of these ranges, an aryl group (including substituted aryl groups), typically with from 6 to about 10 carbon atoms, although the number of carbon atoms can be outside of this range, an arylalkyl group (including substituted arylalkyl groups), typically with from 7 to about 12 carbon atoms and preferably with from 7 to about 9 carbon atoms, although the number of carbon atoms can be outside of these ranges, or an alkylaryl group (including substituted alkylaryl groups), typically with from 7 to about 12 carbon atoms and preferably with from 7 to about 9 carbon atoms, although the number of carbon atoms can be outside of these ranges, and $R_2$ is an alkylene group (including linear, branched, cyclic, saturated, unsaturated, and substituted alkylene groups, and wherein hetero atoms, such as oxygen, sulfur, nitrogen, silicon, or the like, can be placed between the carbon atoms in the alkylene group), typically with from 1 to about 12 carbon atoms and preferably with from 1 to about 6 carbon atoms, although the number of carbon atoms can be outside of these ranges, an arylene group (including substituted arylene groups), typically with from 6 to about 10 carbon atoms, although the number of carbon atoms can be outside of this range, an arylalkylene group (including substituted arylalkylene groups), typically with from 7 to about 12 carbon atoms and preferably with from 7 to about 9 carbon atoms, although the number of carbon atoms can be outside of these ranges, an alkylarylene group (including substituted alkylarylene groups), typically with from 7 to about 12 carbon atoms and preferably with from 7 to about 9 carbon atoms, although the number of carbon atoms can be outside of these ranges, and wherein the substituents on the substituted alkyl, alkylene, aryl, arylene, alkylaryl, alkylarylene, arylalkyl, and arylalkylene groups can be (but are not limited to) hydroxy groups, amine groups, imine groups, ammonium groups, cyano groups, pyridine groups, pyridinium groups, ether groups, aldehyde groups, ketone groups, carboxylic acid groups, ester groups, amide groups, carbonyl groups, thiocarbonyl groups, sulfonate groups, sulfoxide groups, nitrile groups, sulfone groups, acyl groups, acid anhydride groups, azide groups, mixtures thereof, and the like, wherein two or more substituents can be joined together to form a ring, and the like, Also suitable as "C" groups are imidazole groups, including those of the general formulae

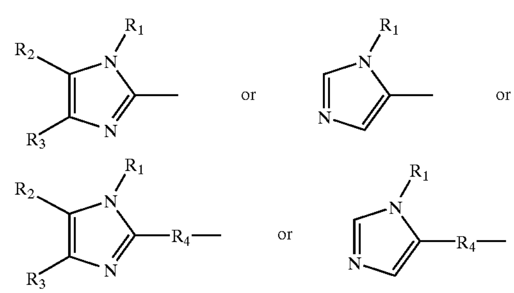

wherein $R_1$ is a hydrogen atom or an alkyl group (including linear, branched, cyclic, saturated, unsaturated, and substituted alkyl groups, and wherein hetero atoms, such as oxygen, sulfur, nitrogen, silicon, or the like, can be placed between the carbon atoms in the alkylene group), typically with from 1 to about 4 carbon atoms, although the number of carbon atoms can be outside of this range, $R_2$ and $R_3$ each, independently of the other, is a hydrogen atom, an alkyl group (including linear, branched, cyclic, saturated, unsaturated, and substituted alkyl groups, and wherein hetero atoms, such as oxygen, sulfur, nitrogen, silicon, or the like, can be placed between the carbon atoms in the alkylene group), typically with from 1 to about 2 carbon atoms, although the number of carbon atoms can be outside of this range, an alkoxy group (including substituted alkoxy groups), typically with from 1 to about 2 carbon atoms, although the number of carbon atoms can be outside of this range, a polyalkyleneoxy group (including substituted polyalkyleneoxy groups), typically a polyethyleneoxy group or a polypropyleneoxy group, typically with from 2 to about 20 repeat alkyleneoxy units, and preferably with from 2 to about 10 repeat alkyleneoxy units, although the number of repeat alkyleneoxy units can be outside of these ranges, a hydroxy group, an amine group, an imine group, an ammonium group, a cyano group, a pyridine group, a pyridinium group, an ether group, an aldehyde group, a ketone group, a carboxylic acid group, an ester group, an amide group, a carbonyl group, a thiocarbonyl group, a sulfonate group, a sulfoxide group, a nitrile group, a sulfone group, an acyl group, an acid anhydride group, or an azide group, and $R_4$ is an alkylene group (including linear, branched, cyclic, saturated, unsaturated, and substituted alkylene groups, and wherein hetero atoms, such as oxygen, sulfur, nitrogen, silicon, or the like, can be placed between the carbon atoms in the alkylene group), typically with from 1 to about 12 carbon atoms and preferably with from 1 to about 6 carbon atoms, although the number of carbon atoms can be outside of these ranges, an arylene group (including substituted arylene groups), typically with from 6 to about 10 carbon atoms, although the number of carbon atoms can be outside of this range, an arylalkylene group (including substituted arylalkylene groups), typically with from 7 to about 12 carbon atoms and preferably with from 7 to about 9 carbon atoms, although the number of carbon atoms can be outside of these ranges, an alkylarylene group (including substituted alkylarylene groups), typically with from 7 to about 12 carbon atoms and preferably with from 7 to about 9 carbon atoms, although the number of carbon atoms can be outside of these ranges, an alkyleneoxy group (including substituted alkyleneoxy groups), typically with from 1 to about 12 carbon atoms and preferably with from 1 to about 6 carbon atoms, although the number of carbon atoms can be outside of these ranges, a polyalkyleneoxy group (including substituted polyalkyleneoxy groups), typically a polyethyleneoxy group or a polypropyleneoxy group, typically with from 2 to about 20 repeat alkyleneoxy units, and preferably with from 2 to about 10 repeat alkyleneoxy units, although the number of repeat alkyleneoxy units can be outside of these ranges, a heterocyclic group (including substituted heterocyclic groups), typically with from 0 to about 10 carbon atoms, and typically with from about 5 to about 10 ring atoms, although the number of carbon atoms and the number of ring atoms can be outside of these ranges, wherein the heteroatoms in the heterocyclic groups can be (but are not limited to) nitrogen, oxygen, sulfur, silicon, and the like, as well as mixtures thereof, a silylene group (including substituted silylene groups), a siloxane group (including substituted siloxane groups), a polysiloxane group (including substituted polysiloxane groups) typically with from 2 to about 12 repeat siloxane units, although the number of repeat siloxane units can be outside of this range, and wherein the substituents on the substituted alkyl, alkylene, arylene, alkylarylene, arylalkylene, alkoxy, alkyleneoxy, polyalkyleneoxy, heterocyclic, silylene, siloxane, and polysiloxane groups can be (but are not limited to) hydroxy groups, amine groups, imine groups, ammonium groups, cyano groups, pyridine groups, pyridinium groups, ether groups, aldehyde groups, ketone groups, carboxylic acid groups, ester groups, amide groups, carbonyl groups, thiocarbonyl groups, sulfonate groups, sulfoxide groups, nitrile groups, sulfone groups, acyl groups, acid anhydride groups, azide groups, mixtures thereof, and the like, wherein two or more substituents can be joined together to form a ring, and the like.

Specific examples of suitable "C" groups include

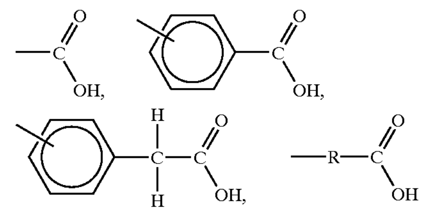

wherein R is an alkyl group typically with from 1 to about 12 carbon atoms,

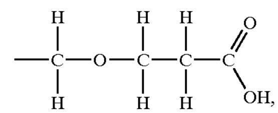

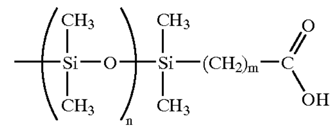

wherein n is an integer typically of from 1 to about 12 and m is an integer typically of from about 3 to about 12,

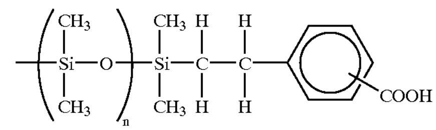

wherein n is an integer typically of from 1 to about 12,

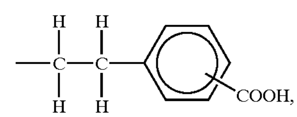

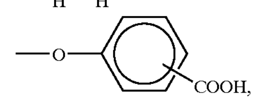

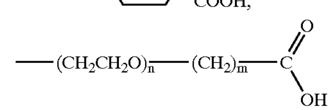

wherein n is an integer typically of from 1 to about 20 and m is an integer typically of from about 3 to about 12,

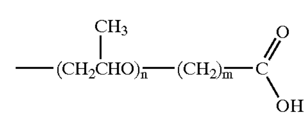

wherein n is an integer typically of from 1 to about 20 and m is an integer typically of from about 3 to about 12,

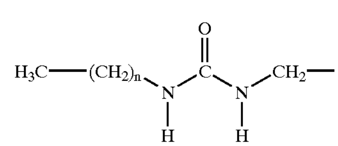

wherein n is an integer typically of from 0 to about 3,
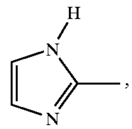
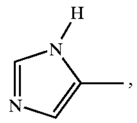
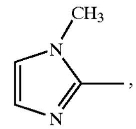
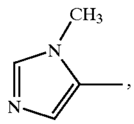
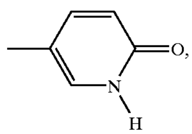
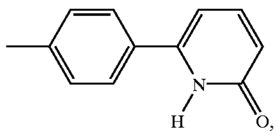
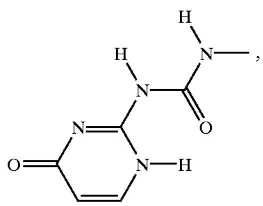
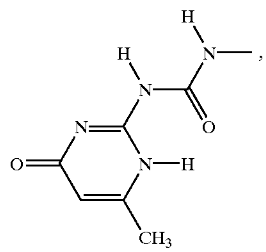
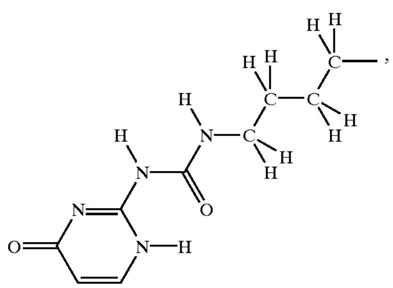
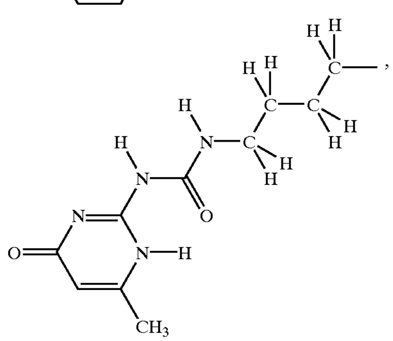
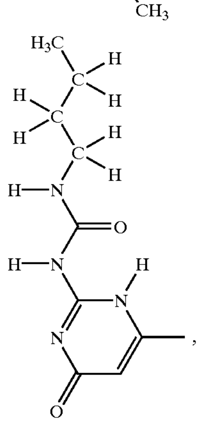
-continued
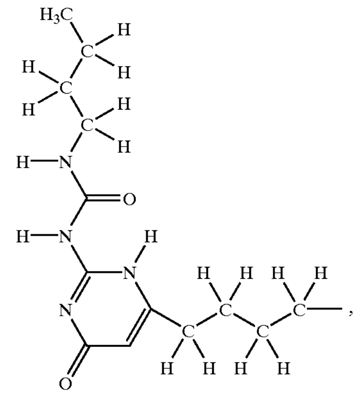
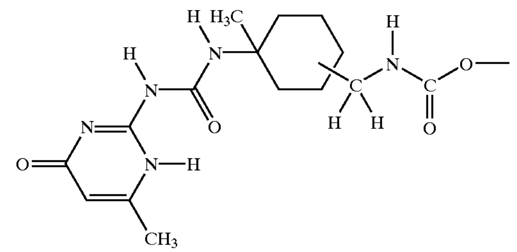
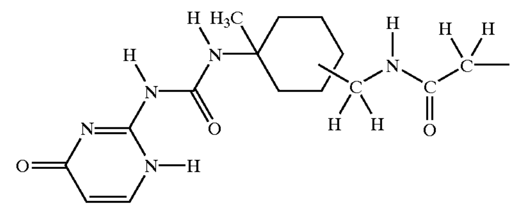
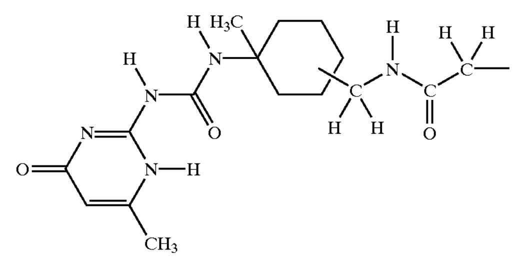
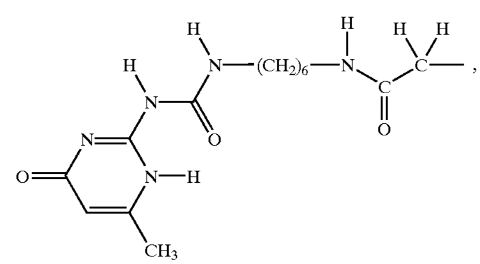
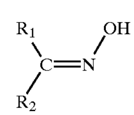
wherein $R_1$ and $R_2$ are alkyl groups, typically with from 1 to about 10 carbon atoms, although the number of carbon atoms can be outside of this range, and wherein $R_1$ and $R_2$ can be joined together to form a ring,

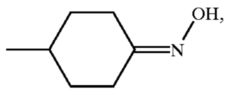

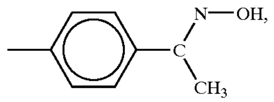

and the like.

The "X", "Y", and "Z" groups are central moieties to which the "A", "B", and "C" groups are attached. Any desired or effective divalent moiety can be selected as "X". Any desired or effective trivalent moiety can be selected as "Y". Any desired or effective tetravalent moiety can be selected as "Z".

Examples of suitable "X", "Y", and "Z" moieties include (but are not limited to) alkylene groups (including linear, branched cyclic, saturated, unsaturated, and substituted alkylene groups, and wherein hetero atoms, such as oxygen, sulfur, nitrogen, silicon, or the like, can be placed between the carbon atoms in the alkylene group), typically with from 1 to about 12 carbon atoms, and preferably with from 1 to about 10 carbon atoms, although the number of carbon atoms can be outside of these ranges, arylene groups (including substituted arylene groups), typically with from 6 to about 12 carbon atoms, and preferably with from 6 to about 10 carbon atoms, although the number of carbon atoms can be outside of these ranges, arylalkylene groups (including substituted arylalkylene groups), typically with from 7 to about 15 carbon atoms, and preferably with from 7 to about 12 carbon atoms, although the number of carbon atoms can be outside of these ranges, alkylarylene groups (including substituted alkylarylene groups), typically with from 7 to about 15 carbon atoms, and preferably with from 7 to about 12 carbon atoms, although the number of carbon atoms can be outside of these ranges, alkyleneoxy groups (including substituted alkyleneoxy groups), typically with from 1 to about 12 carbon atoms and preferably with from 1 to about 10 carbon atoms, although the number of carbon atoms can be outside of these ranges, polyalkyleneoxy groups (including substituted polyalkyleneoxy groups), (including substituted polyalkyleneoxy groups), typically polyethyleneoxy groups or polypropyleneoxy groups, typically with from 2 to about 20 repeat alkyleneoxy units, and preferably with from 2 to about 10 repeat alkyleneoxy units, although the number of repeat alkyleneoxy units can be outside of these ranges, aryleneoxy groups (including substituted aryleneoxy groups), typically with from 6 to about 20 carbon atoms and preferably with from 6 to about 12 carbon atoms, although the number of carbon atoms can be outside of these ranges, arylalkyleneoxy groups (including substituted arylalkyleneoxy groups), typically with from 7 to about 22 carbon atoms and preferably with from 7 to about 14 carbon atoms, although the number of carbon atoms can be outside of these ranges, alkylaryleneoxy groups (including substituted alkylaryleneoxy groups), typically with from 7 to about 22 carbon atoms and preferably with from 7 to about 14 carbon atoms, although the number of carbon atoms can be outside of these ranges, heterocyclic groups (including substituted heterocyclic groups), typically with from 0 to about 10 carbon atoms, typically with from about 5 to about 10 ring atoms, although the number of carbon atoms and the number of ring atoms can be outside of these ranges, wherein the heteroatoms in the heterocyclic groups can be (but are not limited to) nitrogen, oxygen, sulfur, silicon, and the like, as well as mixtures thereof, silylene groups (including substituted silylene groups), siloxane groups (including substituted siloxane groups), polysiloxane groups (including substituted polysiloxane groups), typically with from 2 to about 12 repeat siloxane units, although the number of repeat siloxane units can be outside of this range, hetero atoms, such as nitrogen, oxygen, sulfur, and silicon, or direct bonds, wherein the substituents on the substituted alkylene, arylene, arylalkylene, alkylarylene, alkyleneoxy, polyalkyleneoxy, aryleneoxy, arylalkyleneoxy, alkylaryleneoxy, heterocyclic, silylene, siloxane, and polysiloxane groups can be (but are not limited to) hydroxy groups, amine groups, imine groups, ammonium groups, cyano groups, pyridine groups, pyridinium groups, ether groups, aldehyde groups, ketone groups, carboxylic acid groups, ester groups, amide groups, carbonyl groups, thiocarbonyl groups, sulfonate groups, sulfoxide groups, nitrile groups, sulfone groups, acyl groups, acid anhydride groups, azide groups, mixtures thereof, and the like, wherein two or more substituents can be joined together to form a ring. The "X", "Y", and "Z" moieties can also be combinations of two or more of these groups. For example, an "X", "Y", or "Z" group can be an aryl or arylene group having attached thereto one or more alkyleneoxy groups, to which the "A", "B", and/or "C" groups are attached, an alkyl or alkylene group having attached thereto one or more siloxane groups, to which the "A", "B", and/or "C" groups are attached, or the like.

Specific examples of suitable "X", "Y", and "Z" groups include (but are not limited to) hetero atoms, such as

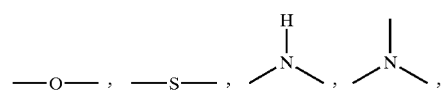

and the like, direct bonds, such as and the like, alkylene groups, including those of the general formulae

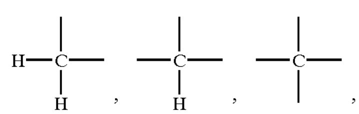

and the like, those of the general formulae

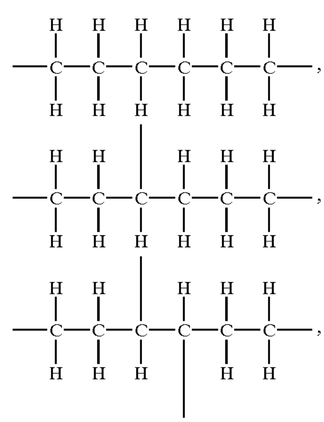

and the like; those of the general formulae
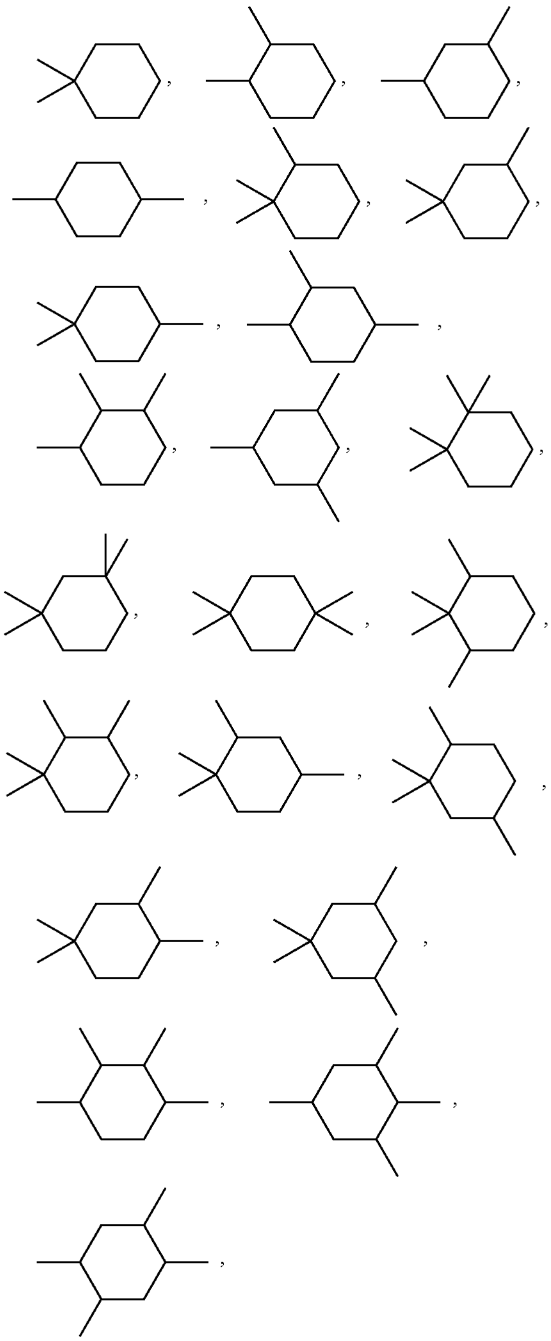
those of the general formulae
—HC=CH—
and the like; arylene groups, including those of the general formulae
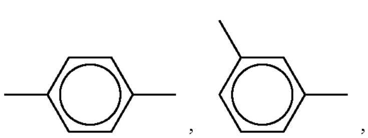
-continued
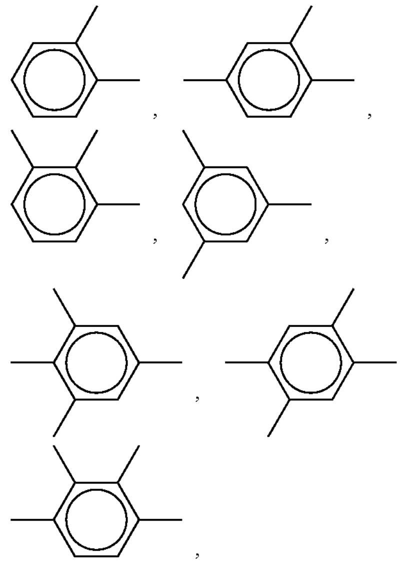
and the like; arylalkylene groups, including those of the general formulae
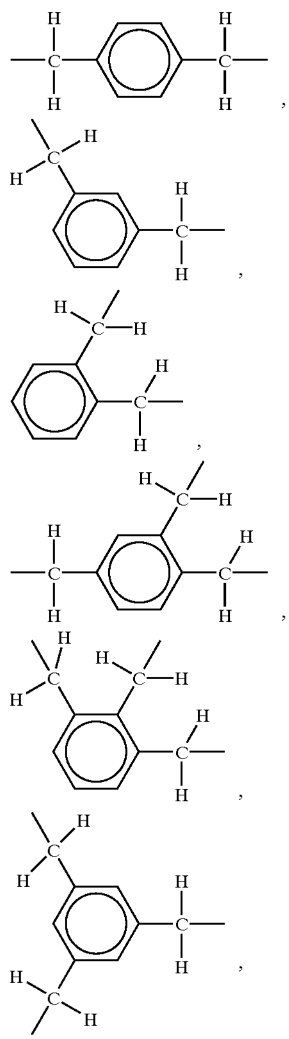

-continued

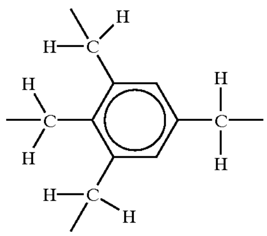

,

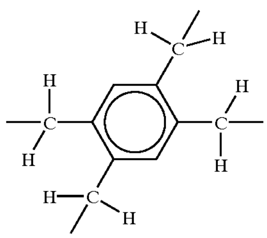

,

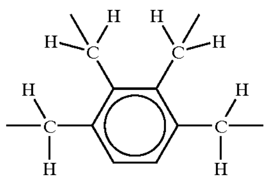

, and the like; alkyleneoxy and polyalkyleneoxy groups, including those of the general formulae $$-O-(CH_2-CH_2-O)_x-\ ,$$

$$-(CH_2-CH_2-O)_x-CH_2-\ ,$$

$$-O-(CH_2-CH(CH_3)-O)_x-\ , \text{and}$$

$$-(CH_2-CH(CH_3)-O)_x-CH_2-\ ,$$

wherein in each case x is an integer typically of from 1 to about 20; and the like; combinations of alkylene groups and alkyleneoxy or polyalkyleneoxy groups, including those of the general formulae

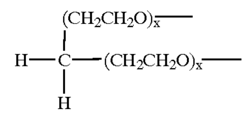

,

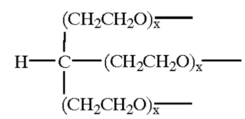

,

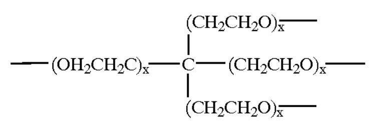

, wherein each x, independently of the others, is an integer representing the number of repeat ethylene oxide groups, and typically is from about 1 to about 20, and those of the general formulae

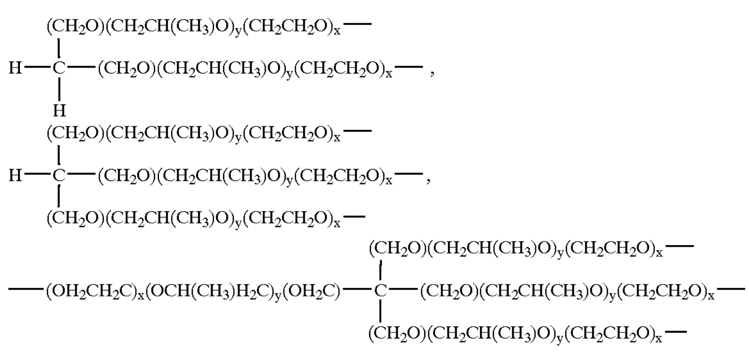

wherein each x, independently of the others, is an integer representing the number of repeat ethylene oxide groups, and typically is from about 1 to about 20, and wherein each y, independently of the others, is an integer representing the number of repeat isopropylene oxide groups, and typically is from about 1 to about 20, materials based on commercially available materials such as the VORANOL® series available from Dow Chemical Co, Midland, Mich; including polyol-initiated polyetherpolyols such as VORANOL® 370, including "X", "Y", and "Z" groups of the formulae

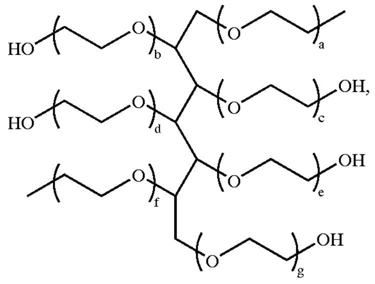

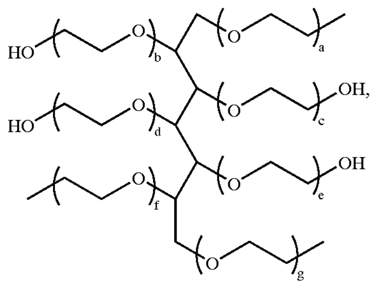

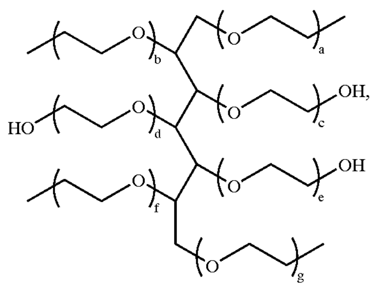

any other possible di-, tri-, and tetravalent groups based on this VORANOL® central group, wherein a, b, c, d, e, f, and g are each integers representing the number of ethylene oxide repeat units and the molecular weight of the starting material (wherein all end groups are terminated by hydroxy groups) is about 1,040, those based on sugars, such as sorbital, including those of the general formulae

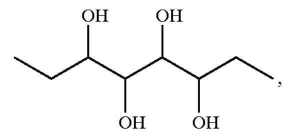

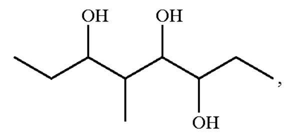

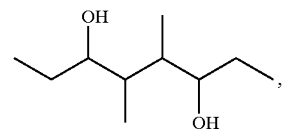

any other possible di-, tri-, and tetravalent groups based on this sorbital central group, those based on other sugars, such as mannitol, and the like. Also suitable are materials based on commercially available amine/alkylene oxide condensates such as VORANOL® 391, 770, and 800 and MULTRANOL® 9144, 9170, 9138, 9168, 8114, 4063, 4050, and 9181, available from Bayer, which generally are derived from the reaction of ethylene oxide or propylene oxide with an amine containing three or more active hydrogen atoms, wherein the reaction typically produce mixtures of compounds with varying degree of oxyalkylation; structures depicted are illustrative of average compositions which contain a range of alkylene oxide units, the amine initiators can be aliphatic or aromatic amines; exemplary amine initiators include but are not limited to ethylene diamine, diethylene triamine, triethyelene tetramine, 1,2-phenylene diamine, and melamine; an exemplary reaction is as follows:

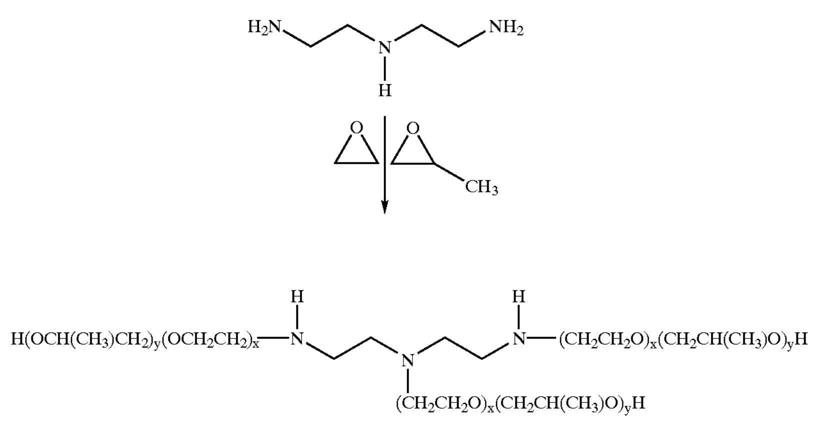

wherein each x, independently of the others, represents the number of repeat polyethylene oxide units and each y, independently of the others, represents the number of repeat polypropylene oxide units. Typical molecular weights are from about 200 to about 4,000, although the molecular weight can be outside of these ranges. Examples of suitable "X", "Y", and "Z" groups derived from these materials include, for example,

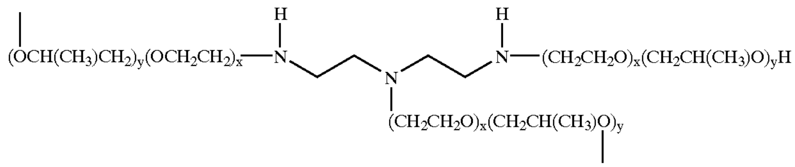

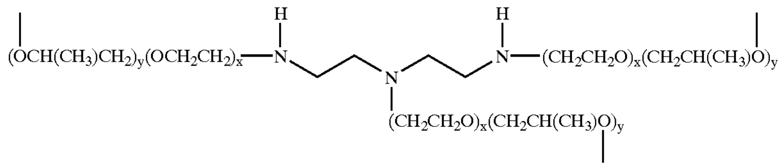

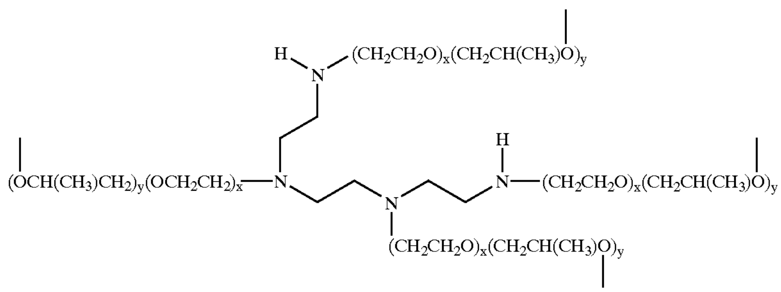

and the like. Also suitable are combinations of arylene groups and alkyleneoxy or polyalkyleneoxy groups, including those of the general formulae

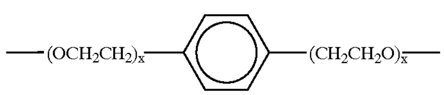

,

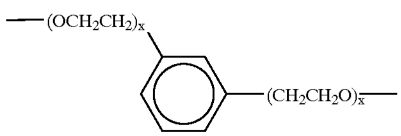

,

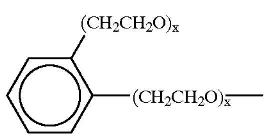

,

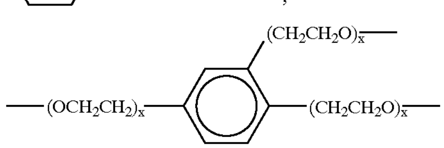

,

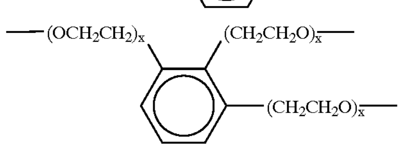

,

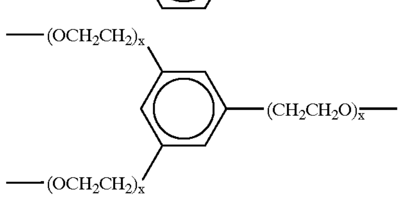

,

-continued

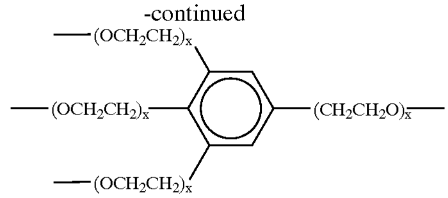

,

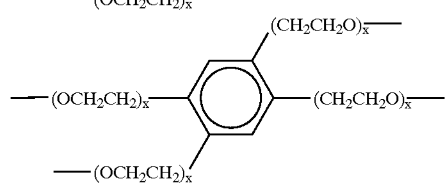

,

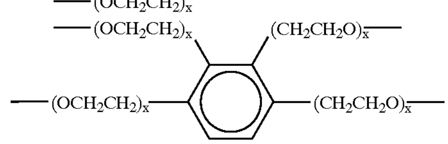

, wherein each x, independently of the others, is an integer representing the number of repeat ethylene oxide groups, and typically is from about 1 to about 20, silylene groups, including those of the general formulae

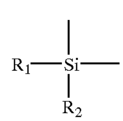

,

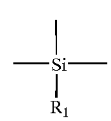

,

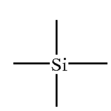

, wherein $R_1$ and $R_2$ each, independently of the other, are alkyl groups (including linear, branched, cyclic, saturated, unsaturated, and substituted alkylene groups, and wherein hetero atoms, such as oxygen, sulfur, nitrogen, silicon, or the like, can be placed between the carbon atoms in the alkylene group), typically with from 1 to about 6 carbon atoms, although the number of carbon atoms can be outside of this range, siloxane groups, including those of the general formulae

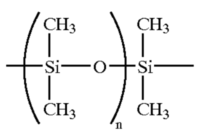

,

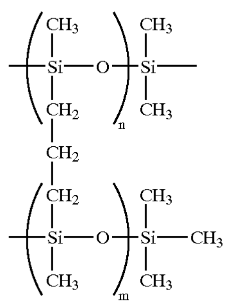

,

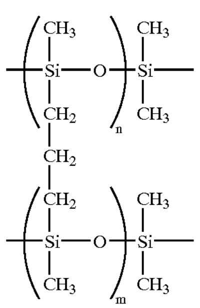

,

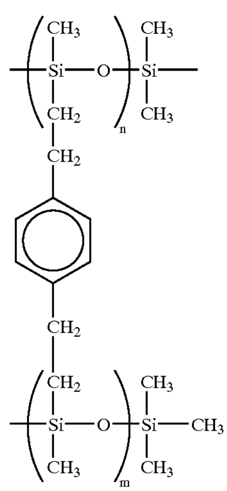

,

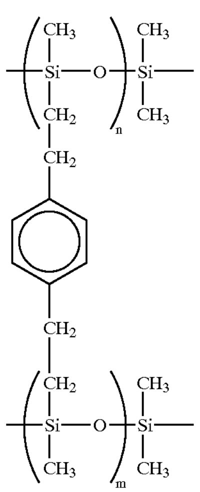

wherein m and n each, independently of the other, is an integer representing the number of repeat alkylsiloxane units, and typically is from about 3 to about 12, although the values of m and n can be outside of this range, combinations of alkylene groups and siloxane groups, including those of the general formulae

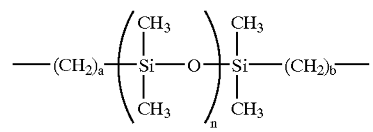

,

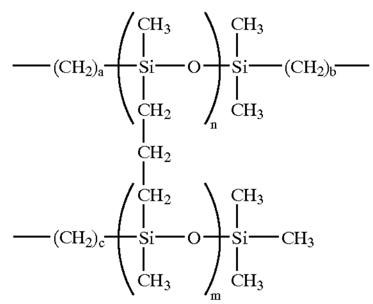

,

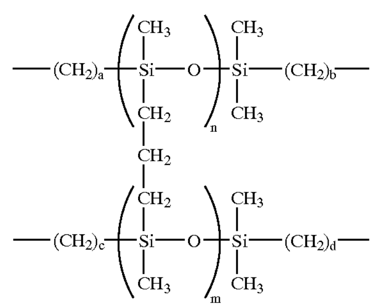

,

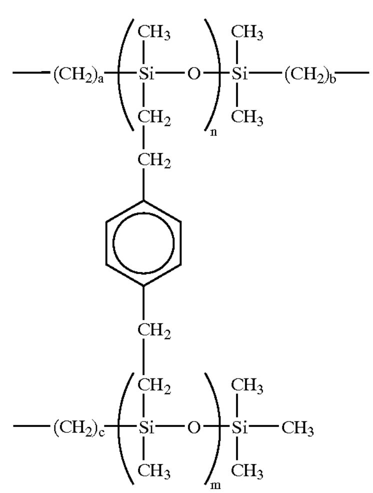

-continued

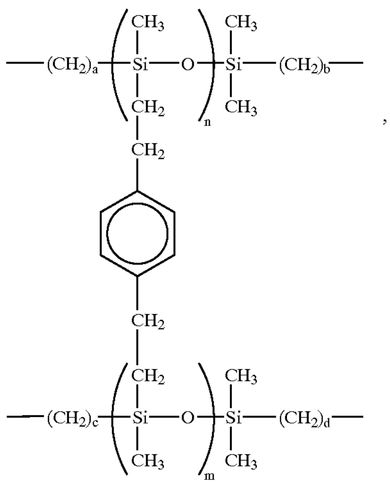

wherein m and n each, independently of the other, is an integer representing the number of repeat siloxane units, and typically is from about 3 to about 12, although the values of m and n can be outside of these ranges, and a, b, c, and d each, independently of the other, is an integer representing the number of repeat —$CH_2$— units, and typically is from 1 to about 6, and preferably from 1 to about 3, although the values of a, b, c, and d can be outside of these ranges, combinations of silylene groups and alkyleneoxy groups, including those of the general formulae

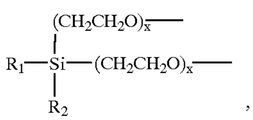

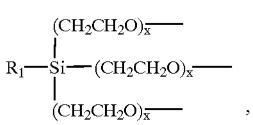

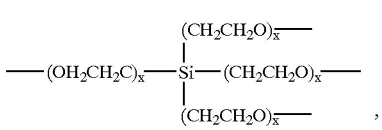

wherein $R_1$ and $R_2$ each, independently of the other, are alkyl groups (including linear, branched, cyclic, saturated, unsaturated, and substituted alkylene groups, and wherein hetero atoms, such as oxygen, sulfur, nitrogen, silicon, or the like, can be placed between the carbon atoms in the alkylene group), typically with from 1 to about 6 carbon atoms, although the number of carbon atoms can be outside of this range, and wherein each x, independently of the others, is an integer representing the number of repeat ethylene oxide groups, and typically is from about 3 to about 40, and preferably from about 9 to about 20, although the value of each x can be outside of these ranges, combinations of siloxane groups and alkyleneoxy groups, including those of the general formulae

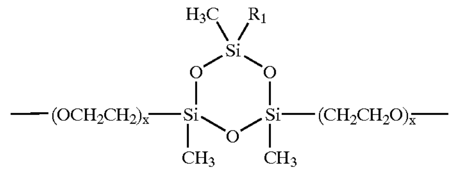

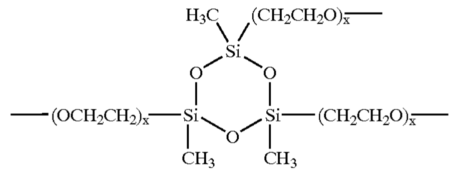

wherein $R_1$ is an alkyl group (including linear, branched, cyclic, saturated, unsaturated, and substituted alkylene groups, and wherein hetero atoms, such as oxygen, sulfur, nitrogen, silicon, or the like, can be placed between the carbon atoms in the alkylene group), typically with from 1 to about 6 carbon atoms, although the number of carbon atoms can be outside of this range, and wherein each x, independently of the others, is an integer representing the number of repeat ethylene oxide groups, and typically is from about 3 to about 40, and preferably from about 9 to about 20, although the value of each x can be outside of these ranges, other heterocyclic groups, such as those of the formulae

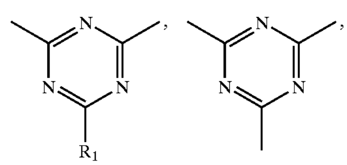

wherein $R_1$ is an alkyl group (including linear, branched, cyclic, saturated, unsaturated, and substituted alkylene groups, and wherein hetero atoms, such as oxygen, sulfur, nitrogen, silicon, or the like, can be placed between the carbon atoms in the alkylene group), typically with from 1 to about 6 carbon atoms, although the number of carbon atoms can be outside of this range, and the like.

A few specific examples of suitable additives for the inks of the present invention include (but are not limited to) the following:

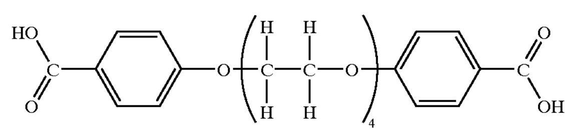

and

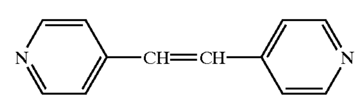

(a combination of a material of the formula A-$X_1$-A and a material of the formula B—$X_2$—B),

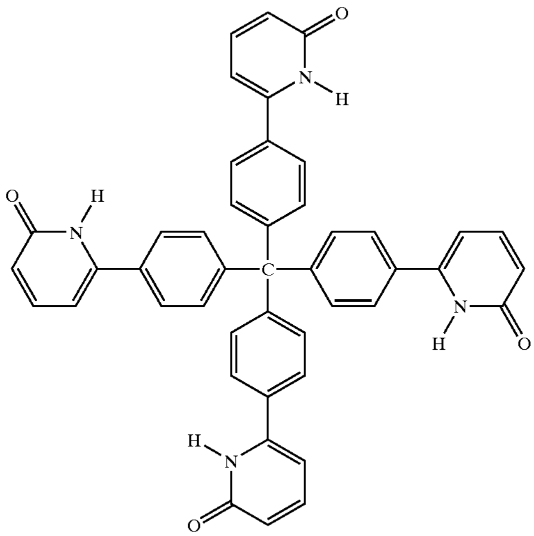
(a material of the formula
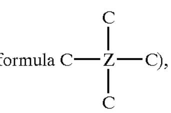
),
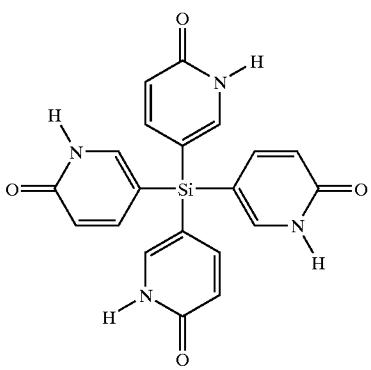
(a material of the formula
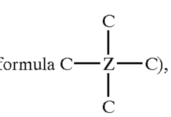
),
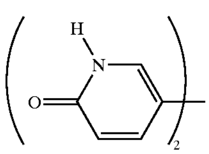
(VORANOL 370 minus two terminal hydroxy groups)
(a material of the formula C—X—C),
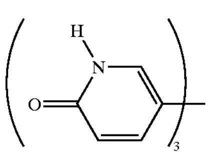
(VORANOL 370 minus three terminal hydroxy groups)
(a material of the formula
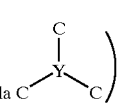
),
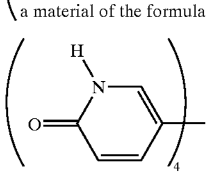
(VORANOL 370 minus four terminal hydroxy groups)

-continued
(a material of the formula 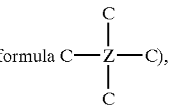),
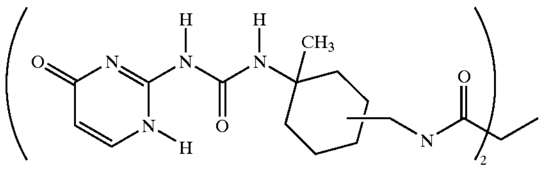
(VORANOL 370 minus two terminal hydroxy groups)
(a material of the formula C—X—C),
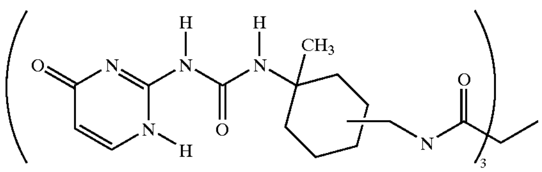
(VORANOL 370 minus three terminal hydroxy groups)
(a material of the formula 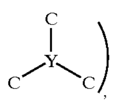),
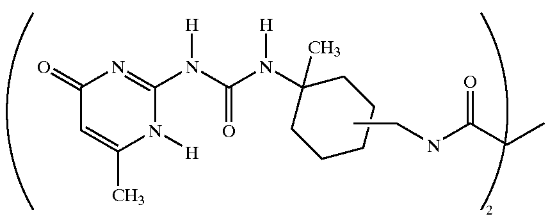
(VORANOL 370 minus two terminal hydroxy groups)
(a material of the formula C—X—C),
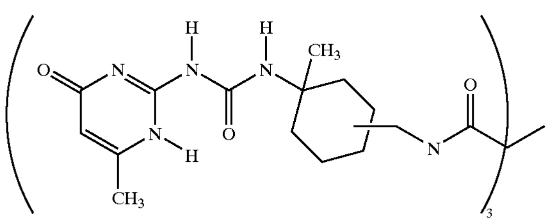
(VORANOL 370 minus three terminal hydroxy groups)
(a material of the formula 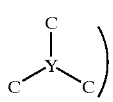),
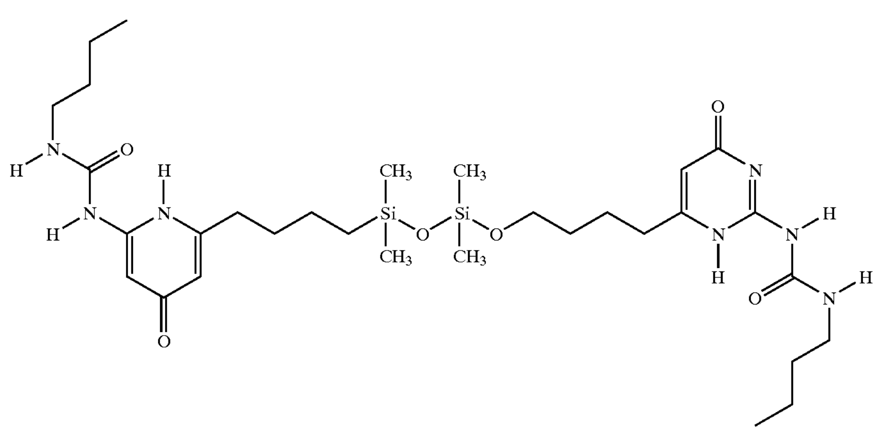
(a material of the formula C—X—C), -continued

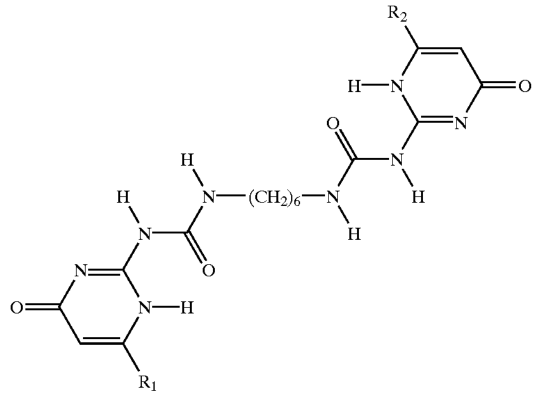

(a material of the formula C—X—C) wherein $R_1$ and $R_2$ each, independently of the other, is an alkyl group with from 1 to about 18 carbon atoms,

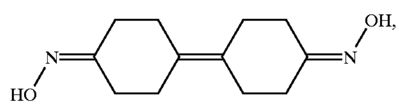

and the like.

In inks containing an additive which is a combination of one or more materials containing one or more "A" groups and one or more materials containing one or more "B" groups, the "A" and "B" groups are present relative to each other in any desired or effective amount. If it is desired to maximize the degree of hydrogen-bonded polymerization within the image on the recording substrate, the ratio of "A" groups to "B" groups is approximately 1:1.

In inks containing an additive which is a combination of one or more materials containing one or more "A" groups and one or more materials containing one or more "B" groups, the "A" groups are acidic and the "B" groups are basic. The combination of additives, the "X", "Y", and "Z" moieties, and the substituents, if any, on the "A" and "B" groups are selected so that the "A" groups form hydrogen bonds with the "B" groups without resulting in any substantial degree of deprotonation of the acidic hydrogen on the "A" groups, the "A" and "B" groups form a hydrogen bond, and not an ionic complex. For example, as illustrated in "Hydrogen-Bonded Liquid Crystals. A Novel Mesogen Incorporating Nonmesogenic 4,4'-Bipyridine through Selective Recognition between Hydrogen Bonding Donor and Acceptor," T. Kato et al., *Chemistry Letters*, p. 2003 (1990), the disclosure of which is totally incorporated herein by reference, there are five possibilities for interactions between an acid-containing group A–H and a base-containing group B, with one extreme being a complete covalent bond between A and H and the other extreme being complete deprotonation to form an ionic complex A–BH+, and with three intermediate stages of hydrogen bonding in between:

| A—H + B | A—H----B | A----H----B |
|---|---|---|
| covalent bond | type I hydrogen bond | type II hydrogen bond |

-continued

| A----H—B | $A^{\ominus}$ $BH^{\oplus}$ |
|---|---|
| type III hydrogen bond | ionic complex |

Provided that in the ink image on the recording substrate, after the aqueous liquid vehicle has either substantially evaporated or substantially penetrated into the recording substrate, the additive forms hydrogen-bonded oligomers or polymers, any of type I, type II, or type III hydrogen bonds are acceptable, but "A" and "B" are selected so that the ionic complex is not formed.

The additives of the inks of the present invention form reversible hydrogen bonds, resulting in the formation of aggregates (oligomers, polymers, or polymer networks) held together by hydrogen bonds instead of covalent bonds. While not being limited to any particular theory, it is believed that in the inks of the present invention, these hydrogen bonds are substantially solvated by the water and by the water-soluble or water-miscible organic materials present in the aqueous liquid vehicle. Accordingly, when in solution, these additive materials have little effect on the ink viscosity. When the ink is printed onto a recording substrate, the aqueous liquid vehicle either substantially evaporates or substantially penetrates into the recording substrate, allowing the hydrogen bonds between the additive molecules to form with the reduction of the water content (as well as any solvating organic component in the aqueous liquid vehicle) and resulting in the formation of polymer-like aggregates and a significant increase in the viscosity of the ink on the recording substrate. The hydrogen-bonded oligomers or polymers thus formed behave much like conventional covalently-bonded polymers to enhance image quality (line edge acuity, optical density, resistance to bleeding and feathering, and the like) and permanence. Unlike the case with conventional polymers, however, the viscosity of the ink containing the additive is relatively low, the viscosity of the ink increases only after jetting and deposition on the recording substrate.

When the additive in the ink is a combination of one or more materials having "A" groups and one or more "B" groups, hydrogen bonds can form, for example, as follows:

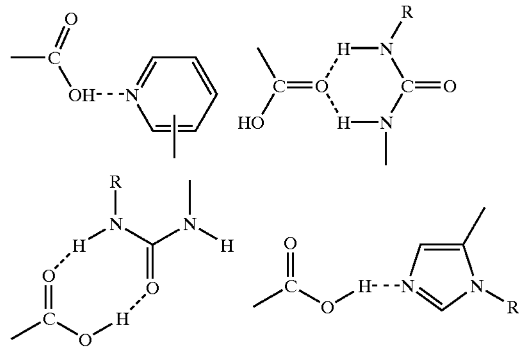

and the like. When the additive in the ink is one or more materials containing "C " groups, hydrogen bonds can form, for example, as follows:

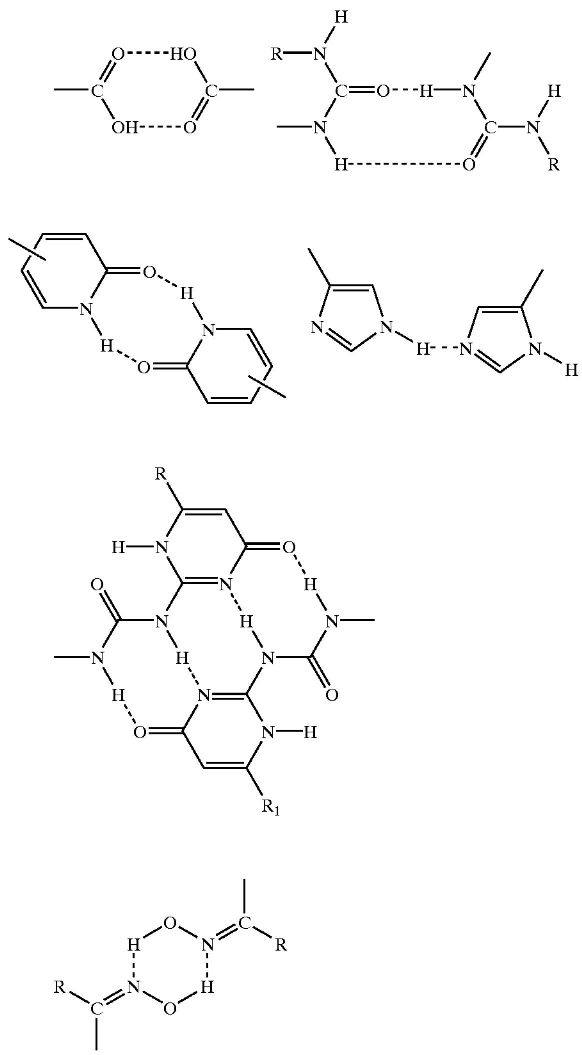

and the like. Generally, the more hydrogen bonds formed between an "A" group and a "B" group, or between two "C" groups, the more strongly bound are the moieties containing these groups, and the more energy is needed to break these hydrogen bonds. In addition, generally the greater the stability constant of the hydrogen-bonded complex, the greater the tendency for the "A" and "B" groups, or for the "C" groups, to associate both in solution and in the solid state.

The "A", "B", and "C" groups within an additive molecule or within a mixture of molecules comprising an additive can be either the same as each other or different from each other. For example, the compound

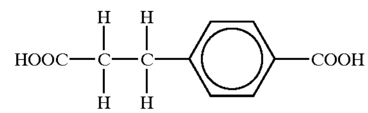

is an example of a material of the general formula $A_1$-X-$A_2$, wherein $A_1$ is

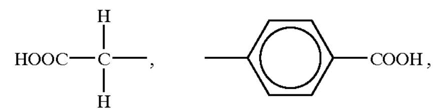

and X is

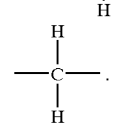

The different acidities of the carboxyl groups in $A_1$ and $A_2$ can affect the hydrogen bonding characteristics thereof.

Within the additive material, mixtures can be prepared of additives having the same "A", "B", and/or "C" groups but with some being bonded to a divalent "X" moiety and others to a trivalent "Y" moiety and/or a tetravalent "Z" moiety, or with some being bonded to a trivalent "Y" moiety and others to a tetravalent "Z" moiety. For example, an additive can comprise a mixture of molecules of the formula C—X—C and molecules of the formula $Y(C)_3$ and/or molecules of the formula $Z(C)_4$. By adjusting the relative amounts of "X", "Y", and "Z" bonded molecules in such a mixture, the degree of hydrogen-bonded oligomerization or polymerization and the structure of the resulting hydrogen-bonded oligomer or polymer chain or network can be controlled.

The various different "A", "B", and "C" groups can be placed on the "X", "Y", and "Z" groups by any desired or suitable method, For example, oxime groups can be placed by reacting the corresponding ketone group with $NH_2OH$, as follows:

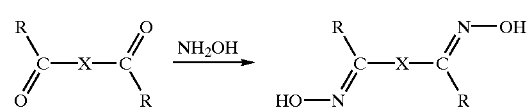

Hydroxy-substituted "X", "Y", or "Z" groups can be substituted by reacting the hydroxy-substituted compound with a diisocyanate to place an isocyanate-substituted group on the originally hydroxy-substituted compound, thereafter, the isocyanate group can be further reacted with an amine containing the desired group, as follows:

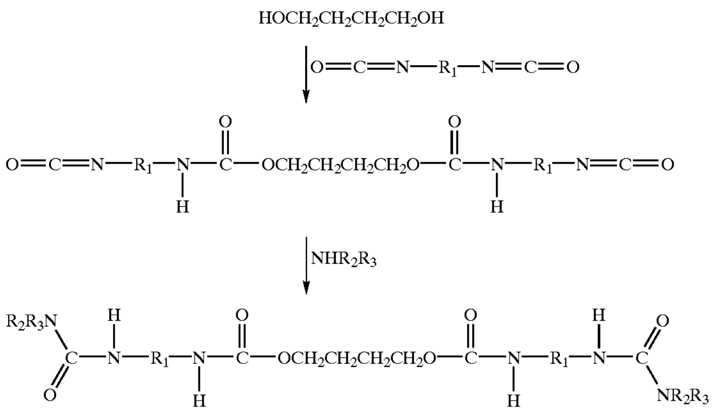

A specific embodiment of this method, used for placing ureidopyrimidone moieties onto central groups, is disclosed by Lange et al., *Journal of Polymer Science: Part A: Polymer Chemistry*, Vol. 37, p. 3657 (1999), the disclosure of which is totally incorporated herein by reference. Additives wherein the central moiety is a tetravalent silicon atom can be prepared from tetrakis(dimethylsiloxy)silane by reaction with allyl alcohol in the presence of a platinum catalyst, as follows:

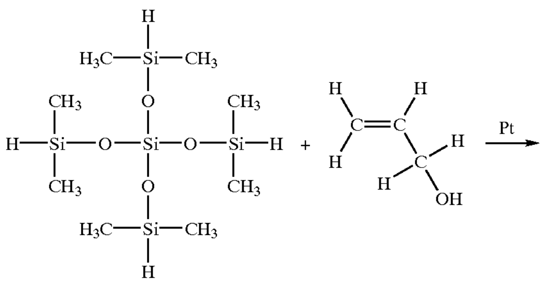

-continued

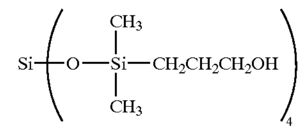

The hydroxy groups on the hydroxypropyl substituted silane can then be further reacted by known methods to place other desired groups thereon, such as polyalkylene oxide chains or the like. Additionally, substituents such as carboxylic acid containing moieties can be placed on a tetravalent silicon atom by reacting an ethylenically unsaturated carboxylic acid with tetrakis(dimethylsiloxy)silane in the presence of a platinum catalyst, as follows:

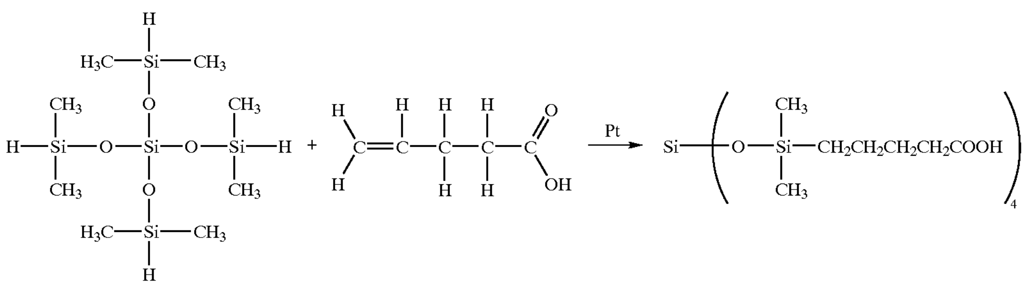

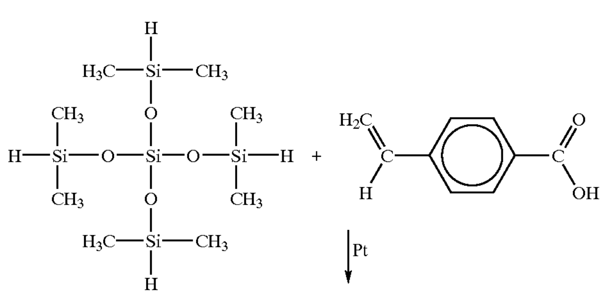

-continued

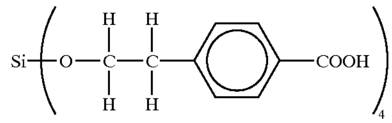

The various different "X", "Y", and "Z" groups upon which the "A", "B", and "C" groups are placed can be prepared by any desired or suitable method. For example, a branched tetravalent "Z" group comprising a silicon atom with four polyethylene oxide chains bonded thereto can be prepared from tetrakis(dimethylsiloxy)silane by reaction with an allyl-substituted polyethylene oxide chain of the desired length, of the formula $CH_2{=}CH{-}CH_2{-}O{-}(CH_2CH_2O)_nH$ (wherein n is an integer representing the number of repeat polyethylene oxide units), in the presence of a platinum catalyst. A branched trivalent "Y" group of the formula

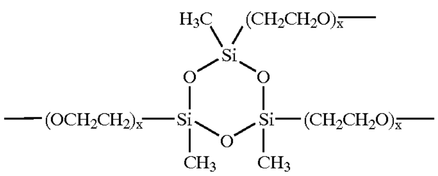

can be prepared by the reaction of the methyl hydrogen silane starting material, of the formula

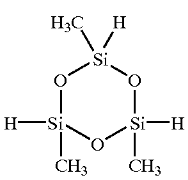

an allyl-substituted polyethylene oxide chain of the desired length, of the formula $CH_2{=}CH{-}CH_2{-}O{-}(CH_2CH_2O)_nH$ (wherein n is an integer representing the number of repeat polyethylene oxide units), in the presence of a platinum catalyst. Suitable "X", "Y", and "Z" polyethylene glycol/polypropylene glycol moieties are also commercially available as the polyol-initiated polyetherpolyol and the amine-initiated polyetherpolyol VORANOL® materials from Dow Chemical Co., Midland, Mich., including VORANOL® 270 (triol, average molecular weight 700), 280 (functionality=7, average molecular weight 1,380), 335 (functionality=3.8, average molecular weight 640), 360 (functionality=4.5, average molecular weight 728), 370 (functionality=7.0, average molecular weight 1,040), 415 (triol, average molecular weight 6,000), 446 (functionality=4.5, average molecular weight 566), 490 (functionality=4.3, average molecular weight 460), 520 (functionality=5.1, average molecular weight 550), 3010 (triol, average molecular weight 3,000), 391 (functionality=4, average molecular weight 575), 770 (functionality=4, average molecular weight 292), 800 (functionality=4, average molecular weight 278), and the like.

Methods for preparing suitable "X", "Y", and "Z" groups are also disclosed in, for example, "Novel Hyperbranched Resins for Coating Applications," R. A. T. M. van Benthem, DSM Research, Geleen, Neth. *Prog. Org. Coat.* (2000), 40(1–4), 203–214; "Synthesis of an Organosilicon Hyperbranched Oligomer containing Alkenyl and Silyl Hydride Groups," J. Yao et al., *J. Polym. Sci., Part A: Polym. Chem.* (1999), 37(20), 3778–3784; "A New Approach to Hyperbranched Polymers by Ring-Opening Polymerization of an AB Monomer: 4-(2-Hydroxyethyl)-ϵ-Caprolactone," M. Liu et al., *Macromolecules* (1999), 32(20), 6881–6884; "Architectural Control in Hyperbranched Macromolecules," C. J. Hawker et al., *Polym. Mater. Sci. Eng.* (1995), 73 171–2; "Preparation of Polymers with Controlled Architecture: Synthesis and Polymerization of Hyperbranched Macromonomers," C. J. Hawker et al., *Polym. Mater. Sci. Eng.* (1991), 64 73–4; and "Hyperbranched Poly (siloxysilanes)," L. J. Mathias et al., *J. Am. Chem. Soc.* (1991), 113(10), 4043–4; the disclosures of each of which are totally incorporated herein by reference.

Further information regarding the composition, synthesis, and characterization of suitable additive materials for the inks of the present invention is disclosed in, for example, "Reversible Polymers Formed from Self-Complementary Monomers Using Quadruple Hydrogen Bonding," R. P. Sijbesma et al., *Science,* Vol. 278, p. 1601 (1997); "Supramolecular Polymers," R. Dagani, *Chemical and Engineering News,* p. 4 (December 1997); "Supramolecular Polymers from Linear Telechelic Siloxanes with Quadruple-Hydrogen-Bonded Units," J. H. K. Hirschberg et al., *Macromolecules,* Vol. 32, no. 8, p. 2696 (1999); "Design and Synthesis of 'Smart' Supramolecular Liquid Crystalline Polymers via Hydrogen-Bond Associations," A. C. Griffin et al., *PMSE Proceedings,* Vol. 72, p. 172 (1995); "The Design of Organic Gelators: Solution and Solid State Properties of a Family of Bis-Ureas," Andrew J. Carr et al., *Tetrahedron Letters,* Vol. 39, p. 7447 (1998); "Hydrogen-Bonded Supramolecular Polymer Networks," Ronald F. M. Lange et al., *Journal of Polymer Science, Part A: Polymer Chemistry,* Vol, 37, p. 3657 (1999); "Combining Self-Assembly and Self-Association—Towards Columnar Supramolecular Structures in Solution and in Liquid-Crystalline Mesophase," Arno Kraft et al., *Polym. Mater. Sci. Eng.,* Vol. 80, p. 18 (1999); "Facile Synthesis of β-Keto Esters from Methyl Acetoacetate and Acid Chloride: The Barium Oxide/Methanol System," Y. Yuasa et al., *Organic Process Research and Development,* Vol. 2, p. 412 (1998); "Self-Complementary Hydrogen Bonding of 1,1'-Bicyclohexylidene-4,4'-dione Dioxime. Formation of a Non-Covalent Polymer," F. Hoogesteger et al., *Tetrahedron,* Vol. 52, No. 5, p. 1773 (1996); "Molecular Tectonics. Three-Dimensional Organic Networks with Zeolite Properties," X. Wang et al., *J. Am. Chem. Soc.,* Vol. 116, p. 12119 (1994); "Helical Self-Assembled Polymers from Cooperative Stacking of Hydrogen-Bonded Pairs," J. H. K. Ky Hirschberg et al., *Nature,* Vol. 407, p. 167 (2000); "New Supramolecular Arrays based on Interactions between Carboxylate and Urea Groups: Solid-State and Solution Behavior," Abdullah Zafar et al., *New J. Chem.,* 1998, 137–141, M. J. Brienne et al., *J. Chem. Soc. Chem. Commun.,* p. 1868 (1989); T. Kato et al., *J. Am. Chem. Soc.,* Vol. 111, p. 8533 (1989); C. Alexander et al., *Makromol. Chem. Makromol. Symp.,* Vol. 77, p. 283 (1994); T. Kato et al., *Macromolecules,* Vol. 22, p. 3818 (1989); J. M. Lehn et al, *J. Chem. Soc. Chem. Commun;,* p. 479 (1990); C. P.

Lillya, *Macromolecules,* Vol. 25, p. 2076 (1992); P. Brunet et al., *J. Am. Chem. Soc.,* Vol. 119, p. 2737 (1997); Y. Aoyama et al., *J. Am. Chem. Soc.,* Vol. 118, p. 5562 (1996); S. Kolotuchin et al., *Angew. Chem. Int. Ed. Eng.,* Vol. 34, p. 2654 (1996); A. Zafar et al., *Tetrahedron Lett.,* p. 2327 (1996); J. Yang et al., *Tetrahedron Lett.,* p. 3665 (1994); F. Garcia Tellado et al., *J. Am. Chem. Soc.,* Vol. 113, p. 9265 (1991); A. Zafar et al., *New Journal of Chemistry,* Vol. 22, p. 137 (1998); K. Hanabusa et al., *Chem. Lett.,* p. 885 (1996); K. Hanabusa et al., *Angew. Chem. Int. Ed. Engl.,* Vol 35, p. 1949 (1996); J. Esch et al., *Chem. Eur. J.,* Vol. 3, p. 1238 (1997); M. de Loos et al., *J. Am. Chem. Soc.,* Vol. 119, p. 12675 (1997); E. Fan et al., *J. Am. Chem. Soc.,* Vol. 115, p. 369 (1993); F. H. Beijer et al., *J. Am. Chem. Soc.,* Vol.120, p. 6761 (1998); B. J. B. Folmer et al., *Chem. Commun.,* p. 1629 (1998); B. J. B. Folmer et al., *Polymer Preprints,* Vol. 80, p. 20 (1999); F. Zeng et al., *Chem. Rev.,* Vol. 97, p. 1681 (1997); A. R. A. Palmans et al., *Chem. Eur. J.,* Vol. 3, p. 300 (1997); V. Percec et al., *Nature,* Vol 391, p. 161 (1998); A. Kraft et al., *J. Chem. Soc. Perkin Trans.* 1, p. 1019 (1998); A. Kraft et al., *Chem. Commun.,* p. 1085 (1998); G. Gottarelli et al., *J. Chem. Soc. Chem. Commun.,* p. 2555 (1995); G. Laughlan et al., *Science,* Vol. 265, p. 520 (1994), and B. J. B. Folmer et al., *Advanced Materials,* Vol. 12, p. 874 (2000); the disclosures of each of which are totally incorporated herein by reference.

The additive or mixture of additives is present in the ink in any desired or effective amount, typically at least about 1 percent by weight, and typically no more than about 50 percent by weight, preferably no more than about 20 percent by weight, and more preferably no more than about 10 percent by weight, although the amount can be outside of these ranges.

In some instances, while not required, the hydrogen bonds between either between the A groups and the B groups or between the C groups are relatively stronger at a first temperature and relatively weaker at a second temperature which is higher than the first temperature, so that upon heating, the hydrogen bonds become weaker or broken. In these embodiments, the ink viscosity can be lowered by heating, so that an ink that has a viscosity at room temperature (typically from about 20 to about 30° C.) which is undesirably high for thermal ink jet printing can have a viscosity at temperatures in the printhead (often from about 35 to about 60° C.) which is within desirable ranges for thermal ink jet printing.

The "X", "Y", and "Z" moieties, and/or the substituents, if any are present, on the "A", "B", and "C" groups are selected to enable the resulting additive to be soluble or dispersible in the selected ink vehicle. Depending on the contents of the aqueous liquid vehicle in addition to water, different "X", "Y", "Z" , and/or substituents on "A", "B", and "C" can be selected. The additive is sufficiently soluble or dispersible in the ink vehicle to form a homogeneous, monophase solution in the aqueous liquid vehicle of the ink.

Particularly preferred groups within "X", "Y", and "Z" , and particularly preferred substituents on "A", "B", and "C" include polyethylene oxide chains, polypropylene oxide chains, and the like, as well as mixtures thereof.

The hydrogen bonds form between the "A" groups and the "B" groups or between the "C" groups when the ink has been applied to a recording substrate in an image pattern and a substantial amount of the water in the aqueous liquid vehicle has evaporated from the ink image. By "substantial amount" is meant that the image on the recording substrate typically contains no more than about 5 percent by weight water. Hydrogen-bonded oligomers or polymers may, however, begin to appear well before this point, i.e., when, for example, the image contains about 10 percent by weight water or about 15 percent by weight water. Alternatively, by "substantial amount" is meant that sufficient water has evaporated from the image that the image on the recording sheet has a viscosity at least one order of magnitude greater than the viscosity of the ink prior to printing.

The formation of hydrogen-bonded oligomers or polymers from specific additive materials can be determined by any desired method. For example, an additive or combination of additives that form desirable hydrogen-bonded oligomers or polymers will, when dissolved or dispersed in the aqueous liquid vehicle of choice, exhibit relatively low viscosity, because the water and/or organic components in the aqueous liquid vehicle solvate and break the hydrogen bonds that otherwise would form between the additive materials. If, however, the same additive or combination of additives is dissolved or dispersed in another solvent that is not capable of solvating or breaking the hydrogen bonds, such as an aprotic solvent, the additive or combination of additives exhibits a relatively high viscosity compared to that exhibited in the ink aqueous liquid vehicle, because the hydrogen bonds either between the "A" groups and the "B" groups or between the "C" groups now cause the formation of hydrogen-bonded oligomers or polymers. Similarly, when the additive or combination of additives is dissolved or dispersed in the ink aqueous liquid vehicle and the aqueous liquid vehicle is subsequently reduced in amount by evaporation, concentration, or other methods, a relative increase in viscosity may be observed that indicates formation of hydrogen-bonded oligomers or polymers from the additive or combination of additives. Molecular weight determinations can be made in both the aqueous liquid vehicle and in another solvent that is not capable of solvating or breaking the hydrogen bonds, such as an aprotic solvent to detect the formation of hydrogen-bonded oligomers or polymers. The formation of hydrogen bonds and hydrogen-bonded oligomers or polymers can also be detected by IR spectroscopy. NMR spectroscopy may also help to detect the presence of hydrogen-bonded oligomers or polymers. In situations wherein the additive in the solid state is crystalline, X-ray crystallography can be used to detect the oligomeric or polymeric structure.

The inks of the present invention also contain an aqueous liquid vehicle. The liquid vehicle can consist solely of water, or it can comprise a mixture of water and a water soluble or water miscible organic component, such as ethylene glycol, propylene glycol, diethylene glycols, glycerine, dipropylene glycols, polyethylene glycols, polypropylene glycols, amides, ethers, urea, substituted ureas, ethers, carboxylic acids and their salts, esters, alcohols, organosulfides, organosulfoxides, sulfones (such as sulfolane), alcohol derivatives, carbitol, butyl carbitol, cellusolve, tripropylene glycol monomethyl ether (such as DOWANOL® TPM), ether derivatives, amino alcohols, ketones, N-methylpyrrolidinone, 2-pyrrolidinone, cyclohexylpyrrolidone, hydroxyethers, amides, sulfoxides, lactones, polyelectrolytes, methyl sulfonylethanol, imidazole, betaine, and other water soluble or water miscible materials, as well as mixtures thereof. Organic materials such as alcohols and amines are particularly good at solvating the additives of the present invention and breaking hydrogen bonds between the additive molecules prior to printing; subsequent to printing, these organic materials evaporate with the water in the aqueous liquid vehicle and enable formation of the hydrogen bonds between the additive materials. When mixtures of water and water soluble or miscible organic liquids are selected as the liquid vehicle, the water to organic ratio typically ranges from about 100:0 to about 30:70, and preferably from about 90:10 to about 40:60. The non-water component of the liquid vehicle generally serves as a humectant or cosolvent which has a boiling point higher than that of water (100° C.). In the ink compositions of the present invention, the liquid vehicle is typically present in an amount of from about 80 to about 99.9 percent by weight of the ink, and preferably from about 90 to about 99 percent by weight of the ink, although the amount can be outside these ranges.

The degree of association between the hydrogen-bonding additive molecules in inks of the present invention can be controlled substantially by the relative amount of water in the aqueous liquid vehicle. In some specific embodiments of the invention, the ink typically contains no more than about 60 percent by weight water and preferably no more than about 40 percent by weight water, although the amount of water can be outside of these ranges.

The inks of the present invention also contain a colorant. The colorant can be a dye, a pigment, or a mixture thereof. Examples of suitable dyes include anionic dyes, cationic dyes, nonionic dyes, zwitterionic dyes, and the like. Specific examples of suitable dyes include Food dyes such as Food Black No. 1, Food Black No. 2, Food Red No. 40, Food Blue No. 1, Food Yellow No. 7, and the like, FD & C dyes, Acid Black dyes (No. 1, 7, 9, 24, 26, 48, 52, 58, 60, 61, 63, 92, 107, 109, 118, 119, 131, 140, 155, 156, 172, 194, and the like), Acid Red dyes (No. 1, 8, 32, 35, 37, 52, 57, 92, 115, 119, 154, 249, 254, 256, and the like), Acid Blue dyes (No. 1, 7, 9, 25, 40, 45, 62, 78, 80, 92, 102, 104, 113, 117, 127, 158, 175, 183, 193, 209, and the like), Acid Yellow dyes (No. 3, 7, 17, 19, 23, 25, 29, 38, 42, 49, 59, 61, 72, 73, 114, 128, 151, and the like), Direct Black dyes (No. 4, 14, 17, 22, 27, 38, 51, 112, 117, 154, 168, and the like), Direct Blue dyes (No. 1, 6, 8, 14, 15, 25, 71, 76, 78, 80, 86, 90, 106, 108, 123, 163, 165, 199, 226, and the like), Direct Red dyes (No. 1, 2, 16, 23, 24, 28, 39, 62, 72, 236, and the like), Direct Yellow dyes (No. 4, 11, 12, 27, 28, 33, 34, 39, 50, 58, 86, 100, 106, 107, 118, 127, 132, 142, 157, and the like), anthraquinone dyes, monoazo dyes, disazo dyes, phthalocyanine derivatives, including various phthalocyanine sulfonate salts, aza(18)annulenes, formazan copper complexes, triphenodioxazines, Bernacid Red 2BMN; Pontamine Brilliant Bond Blue A; Pontamine; Caro direct Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical; Procion Red H8B (Reactive Red 31), available from ICI America; Pylam Certified D&C Red #28 (Acid Red 92), available from Pylam; Direct Brilliant Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon, Basacid Black X34, available from BASF, Carta Black 2GT, available from Sandoz, Inc.; Neozapon Red 492 (BASF); Savinyl Blue GLS (Sandoz); Luxol Blue MBSN (Morton-Thiokol); Basacid Blue 750 (BASF); Bernacid Red, available from Berncolors, Poughkeepsie, N.Y.; Pontamine Brilliant Bond Blue; Berncolor A. Y. 34; Telon Fast Yellow 4GL-175; BASF Basacid Black SE 0228; the Pro-Jet® series of dyes available from ICI, including Pro-Jet® Yellow I (Direct Yellow 86), Pro-Jet® Magenta I (Acid Red 249), Pro-Jet® Cyan I (Direct Blue 199), Pro-Jet® Black I (Direct Black 168), Pro-Jet® Yellow 1-G (Direct Yellow 132), Aminyl Brilliant Red F-B, available from Sumitomo Chemical Company (Japan), the Duasyn® line of "salt-free" dyes available from Clariant Corp., Charlotte, N.C,. such as Duasyn® Direct Black HEF-SF (Direct Black 168), Duasyn® Black RL-SF (Reactive Black 31), Duasyn® Direct Yellow 6G-SF VP216 (Direct Yellow 157), Duasyn® Brilliant Yellow GL-SF VP220 (Reactive Yellow 37), Duasyn® Acid Yellow XX-SF LP413 (Acid Yellow 23), Duasyn® Brilliant Red F3B-SF VP218 (Reactive Red 180), Duasyn® Rhodamine B-SF VP353 (Acid Red 52), Duasyn® Direct Turquoise Blue FRL-SF VP368 (Direct Blue 199), Duasyn® Acid Blue AE-SF VP344 (Acid Blue 9), Orasol Red G (Ciba-Geigy); Direct Brilliant Pink B (Crompton-Knolls); Aizen Spilon Red C-BH (Hodogaya Chemical Company); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G; Aizen Spilon Yellow C-GNH (Hodogaya Chemical Company); Sirius Supra Yellow GD 167; Cartasol Brilliant Yellow 4GF (Sandoz); Pergasol Yellow CGP (Ciba-Geigy); Orasol Black RL (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc A (Morton-Thiokol); Diazol Black RN Quad (ICI); Orasol Blue GN (Ciba-Geigy); Sevron Blue 5GMF (ICI); various Reactive dyes, including Reactive Black dyes, Reactive Blue dyes, Reactive Red dyes, Reactive Yellow dyes, and the like, as well as mixtures thereof. The dye is present in the ink composition in any desired or effective amount, typically from about 0.05 to about 15 percent by weight of the ink, preferably from about 0.1 to about 10 percent by weight of the ink, and more preferably from about 1 to about 5 percent by weight of the ink, although the amount can be outside of these ranges.

Examples of suitable pigments include various carbon blacks such as channel black, furnace black, lamp black, and the like. Colored pigments include red, green, blue, brown, magenta, cyan, and yellow particles, as well as mixtures thereof. Illustrative examples of magenta pigments include 2,9-dimethyl-substituted quinacridone and anthraquinone dye, identified in the Color Index as Cl 60710, Cl Dispersed Red 15, a diazo dye identified in the Color Index as Cl 26050, Cl Solvent Red 19, and the like. Illustrative examples of suitable cyan pigments include copper tetra-4-(octadecyl sulfonamido) phthalocyanine, X-copper phthalocyanine pigment, listed in the Color Index as Cl 74160, Cl Pigment Blue, and Anthradanthrene Blue, identified in the Color Index as Cl 69810, Special Blue X-2137, and the like. Illustrative examples of yellow pigments that can be selected include diarylide yellow 3,3-dichlorobenzidene acetoacetanilides, a monoazo pigment identified in the Color Index as Cl 12700, Cl Solvent Yellow 16, a nitrophenyl amine sulfonamide identified in the Color Index as Foron Yellow SE/GLN, Cl Dispersed Yellow 33, 2,5-dimethoxy-4-sulfonanilide phenylazo-4'-chloro-2,5-dimethoxy acetoacetanilide, Permanent Yellow FGL, and the like. Additional examples of pigments include Raven® 5250, Raven® 5750, Raven® 3500 and other similar carbon black products available from Columbia Company, Regal® 330, Black Pearl® L, Black Pearl® 1300, and other similar carbon black products available from Cabot Company, commercial carbon black dispersions such as Cabojet® 200, Cabojet® 300 (surface modified pigment), Cabojet® IJX 157, Cabojet® IJX 164, and the like, available from Cabot Chemical Co., the Bonjet® pigment dispersions from Orient Chemical Company of Japan, Degussa carbon blacks such as Color Black® series, Special Black® series, Printtex® series and Derussol® carbon black dispersions available from Degussa Company, Hostafine® series such as Hostafine® Yellow GR (Pigment 13), Hostafine® Yellow (Pigment 83), Hostafine® Red FRLL (Pigment Red 9), Hostafine® Rubine F6B (Pigment 184), Hostafine® Blue 2G (Pigment Blue 15:3), Hostafine® Black T (Pigment Black 7), and Hostafine® Black TS (Pigment Black 7), available from Clariant Corp., Charlotte, N.C., Normandy Magenta RD-2400 (Paul Uhlich), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900, L7020 (BASF), Heliogen Blue D6840, D7080 (BASF), Sudan Blue OS (BASF), PV Fast Blue B2G01 (Clariant Corp., Charlotte, N.C.), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange 6 (Aldrich), Sudan Orange G (Aldrich), Sudan Orange 220 (BASF), Paliogen Orange 3040 (BASF), Ortho Orange OR 2673 (Paul Uhlich), Pallogen Yellow 152, 1560 (BASF), Lithol Fast Yellow 0991 K (BASF), Paliotol Yellow 1840 (BASF), Novoperm Yellow F6 1 (Clariant Corp., Charlotte, N.C.), Novoperm Yellow FG1 (Clariant Corp., Charlotte, N.C.), Permanent Yellow YE 0305 (Paul Uhlich), Lumogen Yellow D0790 (BASF), Suco-Gelb L1250 (BASF), Suco-Yellow D1355 (BASF), Hostaperm Pink E (Clariant Corp., Charlotte, N.C.), Fanal Pink D4830 (BASF), Cinquasia Magenta (DuPont), Lithol Scarlet D3700 (BASF), Tolidine Red (Aldrich), Scarlet for Thermoplast NSD PS PA (Ugine Kuhlmann of Canada), E. D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), CAB-O-JET 200 hydrophilic carbon black (Cabot Corp.), CAB-O-JET 300 hydrophilic carbon black (Cabot Corp.), and the like. Additional suitable commercially available pigment dispersions include the Hostafines available from Clariant Corp., Charlotte, N.C., including Hostafine Yellow HR and Hostafine Blue B2G, as well as dispersions available from BASF, including Disperse Black 00-6607, Luconyl Yellow 1250, Basoflex Pink 4810, Luconyl Blue 7050, and the like. Other pigments can also be selected. Preferably, the pigment particle size is as small as possible to enable a stable colloidal suspension of the particles in the liquid vehicle and to prevent clogging of the ink channels when the ink is used in a thermal ink jet printer. Preferred particle average diameters are generally from about 0.001 to about 5 microns, and more preferably from about 0.1 to about 1 micron, although the particle size can be outside these ranges, Within the ink compositions of the present invention, the pigment is present in any effective amount to achieve the desired degree of coloration. Typically, the pigment is present in an amount of from about 0.1 to about 8 percent by weight of the ink, and preferably from about 2 to about 7 percent by weight of the ink, although the amount can be outside these ranges.

Other optional additives to the inks include biocides such as DOWICIL® 150, 200, and 75, benzoate salts, sorbate salts, PROXEL® GXL and BD20, available from Zeneca, PARADYME®, available from Zeneca, and the like, present in an amount of from about 0.0001 to about 4 percent by weight of the ink, and preferably from about 0.01 to about 2.0 percent by weight of the ink, pH controlling agents such as acids or, bases, phosphate salts, carboxylates salts, sulfite salts, amine salts, and the like, present in an amount of from 0 to about 1 percent by weight of the ink and preferably from about 0.01 to about 1 percent by weight of the ink, or the like.

The ink compositions are generally of a viscosity suitable for use in thermal ink jet printing processes. At room temperature (i.e., about 25° C.), typically, the ink viscosity is no more than about 10 centipoise, and preferably is from about 1 to about 7 centipoise, more preferably from about 1 to about 5 centipoise, although the viscosity can be outside this range.

Ink compositions of the present invention can be of any suitable or desired pH. For some embodiments, such as thermal ink jet printing processes, typical pH values are from about 2 to about 11, preferably from about 3 to about 10, and more preferably from about 3.5 to about 9, although the pH can be outside of these ranges.

Ink compositions suitable for ink jet printing can be prepared by any suitable process. Typically, the inks are prepared by simple mixing of the ingredients. One process entails mixing all of the ink ingredients together and filtering the mixture to obtain an ink. Inks can be prepared by mixing the ingredients, heating if desired, and filtering, followed by adding any desired additional additives to the mixture and mixing at room temperature with moderate shaking until a homogeneous mixture is obtained, typically from about 5 to about 10 minutes. Alternatively, the optional ink additives can be mixed with the other ink ingredients during the ink preparation process, which takes place according to any desired procedure, such as by mixing all the ingredients, heating if desired, and filtering.

The present invention is also directed to a process which entails incorporating an ink of the present invention into an ink jet printing apparatus and causing droplets of the inks to be ejected in an imagewise pattern onto a recording substrate, In one specific embodiment, the printing apparatus employs a thermal ink jet process wherein the ink in the nozzles is selectively heated in an imagewise pattern, thereby causing droplets of the ink to be ejected in imagewise pattern. In another specific embodiment, the printing apparatus employs an acoustic ink jet process, wherein droplets of the ink are caused to be ejected in imagewise pattern by acoustic beams. In yet another specific embodiment, the printing apparatus employs a piezoelectric ink jet printing process, wherein droplets of the ink are caused to be ejected in imagewise pattern by oscillations of piezoelectric vibrating elements. Any suitable substrate or recording sheet can be employed, including plain papers such as Xerox® 4024 papers, Xerox® Image Series papers, Courtland 4024 DP paper, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

Synthesis of Compound I. Tetraethylene Glycol Di-para-benzoic Acid

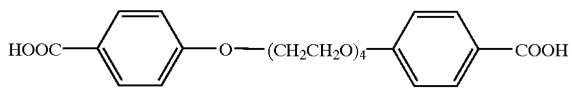

Tetraethylene glycol di-para-benzoic acid is prepared in accordance with a procedure published by Alexander et al. (*Polym. Prepr* (*Am. Chem. Soc., Div. Polym. Chem.*) 1993, 34(1), 168–169), the disclosure of which is totally incorporated herein by reference, by reaction of ethyl-para-hydroxybenzoate with tetraethylene glycol di-para-tosylate. Thus 10 grams (19.9 mmole) of tetraethyleneglycol di-p-tosylate, 6.61 grams (39.8 mmole) of ethyl-p-hydroxybenzoate, 1.74 grams (43.5 mmole) of sodium hydroxide, and 120 milliliters of 2-propanol are charged to a 250 milliliter round-bottomed flask equipped with a TEFLON® paddle stirrer and a reflux condenser. The mixture is refluxed for about 10 hours, during which time a white precipitate is formed. The precipitate (sodium tosylate) is removed by filtration and washed with 2-propanol. The filtrate is then collected and solvent is removed in vacuo to yield an oily liquid. 100 milliliters of 10 percent sodium hydroxide (w/v) in 95 percent ethanol is added to the oily product and the mixture is refluxed for 1 hour. Solvent is then removed and the solid residue is dissolved in 300 milliliters of water. The aqueous solution is acidified with hydrochloric acid, and the resulting precipitate is isolated by filtration and recrystallized from ethanol to give tetraethylene glycol di-para-benzoic acid in a yield of greater than 80 percent.

EXAMPLE II

Synthesis of Compound II, Tetrakis(4-pyridyloxymethylene)methane

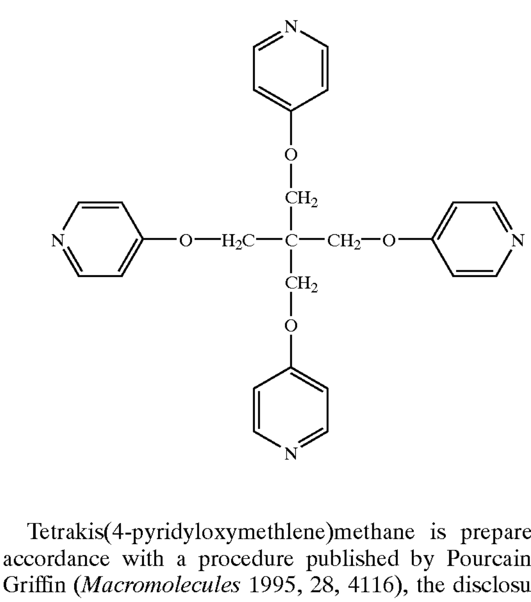

Tetrakis(4-pyridyloxymethlene)methane is prepared in accordance with a procedure published by Pourcain and Griffin (*Macromolecules* 1995, 28, 4116), the disclosure of which is totally incorporated herein by reference, by reaction of pentaerythritol tosylate with 4-hydroxypyridine. Thus, pentaerythritol is reacted stoichiometrically with tosyl chloride in pyridine to give pentaerythritol tosylate. Excess pyridine is removed in vacuo, the solution is diluted with cyclohexane, and pyridinium tosylate is removed by filtration. The filtrate is reacted with 4-hydroxypyridine in the presence of cesium carbonate to give the desired product, tetrakis(4-pyridyloxymethlene)methane.

EXAMPLE III

Synthesis of Compound III, Pentaethylene Glycol-α,ω-dipyridine

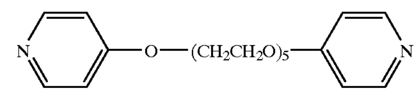

Pentaethylene glycol-α,ωdipyridine is prepared by an analogous procedure to the procedure published by Pourcain and Griffin (*Macromolecules* 1995, 28, 4116), the disclosure of which is totally incorporated herein by reference, for the reaction of pentaerythritol tosylate with 4-hydroxypyridine. Thus, pentaethylene glycol di-p-tosylate (Aldrich 30, 958-3) is reacted with 4-hydroxypyridine (Aldrich 12,061-8) in the presence of cesium carbonate to give the desired product dipyridine.

EXAMPLE IV

Synthesis of Compound IV, 2(6-Isocyanatohexylaminocarbonylamino)-6-methyl-4(1H) pyrimidinone

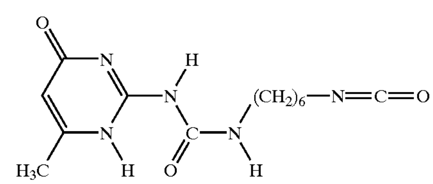

A solution of 0.70 mol 2-amino-4-hydroxy-6-methylpyrimidone in 4.75 mol 1,6-diisocyanatohexane (Aldrich D12,470-2) is heated at 100° C. for 16 hours. Pentane is then added and the resulting precipitate is filtered and washed with pentane. The white powder thus obtained is dried in vacuo at 50° C., This material is the basic synthon employed in the synthesis of the ureido-4(1H)-pyrimidone derivatives in Examples V to VIII.

EXAMPLE V

Synthesis of Compound V, VORANOL® 335 Difunctional Ureido-4(1H)-pyrimidone Derivative To a solution of 64 grams (380 meq) of VORANOL® 335 in chloroform, 253 milliequivalents of 2(6-isocyanatohexylaminocarbonylamino)-6-methyl-4(1H)-pyrimidinone is added. After addition of a few drops of dibutyltindilaurate, the reaction is held at reflux (60° C.) for 16 hours. Residual catalyst is then removed by passing the solution over a short silica gel column and solvent is removed in vacuo to yield a mixed product that $^1$H NMR shows to possess an average of 1.8 ureido-4(1H)-pyrimidone groups per molecule.

EXAMPLE VI

Synthesis of Compound VI, VORANOL® 335 Trifunctional Uureido-4(1H)-pyrimidone Derivative The trifunctional VORANOL® 335 derivative is prepared in an analogous fashion to that for the preparation of the difunctional derivative in Example V except that 380 milliequivalents of VORANOL® 335 are reacted with 380 milliequivalents of 2(6-isocyanato-hexylaminocarbonylamino)-6-methyl-4(1H)-pyrimidinone. $^1$H NMR indicates that the mixed product contains an average of 2.7 ureido-4(1H)-pyrimidone groups per molecule.

EXAMPLE VII

Synthesis of Compound VII, VORANOL® 370 Trifunctional Ureido-4(1H)-pyrimidone Derivative The trifunctional VORANOL® 370 derivative is prepared in an analogous fashion to that for the preparation of the difunctional derivative in Example V except that 104 grams (700 milliequivalents) of VORANOL® 370 are reacted with 300 milliequivalents of 2(6-isocyanato-hexylaminocarbonylamino)-6-methyl-4(1H)-pyrimidinone. $^1$H NMR indicates that the mixed product contains an average of 2.7 ureido-4(1H)-pyrimidone groups per molecule.

EXAMPLE VIII

Synthesis of Compound VIII, VORANOL® 370 Tetrafunctional Ureido-4(1H)-pyrimidone Derivative The tetrafunctional VORANOL® 370 derivative is prepared in an analogous fashion to that for the preparation of the difunctional derivative in Example V except that 700 milliequivalents of VORANOL® 370 are reacted with 400 milliequivalents of 2(6-isocyanato-hexylaminocarbonylamino)-6-methyl-4(1H)-pyrimidinone. $^1$H NMR indicates that the mixed product contains an average of 3.8 ureido-4(1H)-pyrimidone groups per molecule.

EXAMPLE IX

Synthesis of Compound IX, tetrapyridone-4-yl silane

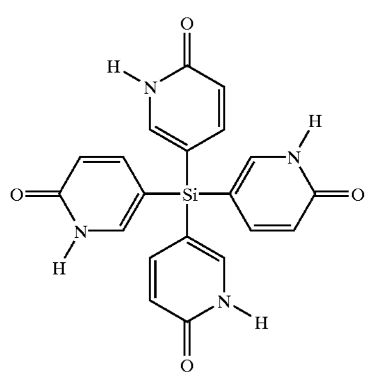

The tetrasubstituted silyl pyridone tecton is synthesized by the procedure described by Wang et al. (*J. Am. Chem. Soc.* 1994, 116, 12119–12120), the disclosure of which is totally incorporated herein by reference. Thus, 5-bromo-2-(phenylmethoxy)pyridine is lithiated by stoichiometric reaction with n-butyl lithium in cyclohexane. A solution of $SiCl_4$ in cyclohexane is then added dropwise to yield the benzyl ether-blocked pyridone. This material is deprotected by addition of a small amount of trifluoromethyl acetic acid. The reaction mixture is diluted with $CH_2Cl_2$ and washed with 5 percent aqueous bicarbonate to remove residual acid. Solvent is removed in vacuo to yield the desired tetrasubstituted silyl pyridone.

EXAMPLE X

Synthesis of Compound X, Pentaethylene Glycol α, ω-Dipyridone

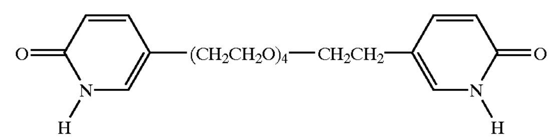

The di-pyridone tecton is synthesized by the procedure described in Example IX by reaction of 5-lithio-2-(phenylmethoxy)pyridine with pentaethylene glycol di-p-tosylate. Thus, 5-bromo-2-(phenylmethoxy)pyridine is lithiated by stoichiometric reaction with n-butyl lithium in cyclohexane. A solution of pentaethylene glycol di-p-tosylate in cyclohexane is added dropwise to yield the corresponding benzyl ether-blocked pyridone. This material is deprotected by addition of a small amount of trifluoromethyl acetic acid, The reaction mixture is diluted with $CH_2Cl_2$ and washed with 5 percent aqueous bicarbonate to remove residual acid. Solvent is removed in vacuo to yield the desired di-pyridone.

Examples 11 through 16 provide black and color ink formulations in tabular form. The general process for the preparation of these inks is to (1) dissolve the hydrogen bonding components in the nonaqueous solvents used in the ink formulation, (2) thereafter add the specified amount of water, and (3) thereafter add the carbon black dispersion or dye solution while gently agitating the mixture. The ink is then filtered through a 1 micron glass filter to remove extraneous particles.

EXAMPLE XI

Carbon Black Ink with Hydrogen Bonding through Interaction of a Difunctional Dicarboxylic Acid and Dipyridyl $A_1$-X-$A_2$/$B_1$-X-$B_2$ class

| Material Classification | Material | Grams |
|---|---|---|
| $A_1$-X-$A_2$ component | tetraethylene glycol di-para-benzoic acid | 4.34 |
| $B_1$-X-$B_2$ component | pentoethylene glycol-α, ω-dipyridine | 3.92 |
| Co-solvent | Sulfolane (5% $H_2O$) Phillips | 43.5 |
| Co-solvent | 2-pyrrolidone (5% $H_2O$) BASF | 7.0 |
| Penetrant | 1-octyl-2-pyrrolidone (Aldrich Chemical Co.) | 1.0 |
| Surfactant | SILWET ® L-7200, Witco Corp. (OSI Specialty Chemicals) | 0.5 |
| Carbon Black Dispersion | CAB-O-JET ® 200 (20% aqueous dispersion) Cabot Corporation | 17.5 |
| Water | Deionized water | 22.24 |

EXAMPLE XII

| Carbon Black Ink with Hydrogen Bonding through Interaction of a Difunctional Dicarboxylic Acid with Dipyridlyl and Tetrapyridyl Derivatives $A_1$-X-$A_2$/$B_1$-X-$B_2$/Z-$B_1B_2B_3B_4$ Class | | |
|---|---|---|
| Material Classification | Material | Grams |
| $A_1$-X-$A_2$ component | tetraethylene glycol di-para-benzoic acid | 4.34 |
| $B_1$-X-$B_2$ component | pentaethylene glycol-α,ω-dipyridine | 1.96 |
| $B_1B_2$-Z-$B_3B_4$ component | tetrakis(4-pyridyloxymethylene)methane | 1.04 |
| Co-solvent | Sulfolane (5% $H_2O$) Phillips | 43.5 |
| Co-solvent | 2-pyrrolidone (5% $H_2O$) BASF | 7.0 |
| Penetrant | 1-octyl-2-pyrrolidone (Aldrich Chemical Co.) | 1.0 |
| Surfactant | SILWET ® L-7200, Witco Corp. (OSI Specialty Chemicals) | 0.5 |
| Carbon Black Dispersion | CAB-O-JET ® 200 (20% aqueous dispersion) Cabot Corporation | 17.5 |
| Water | Deionized water | 23.16 |

EXAMPLE XIII

| Carbon Black Ink with Hydrogen Bonding through Association of a VORANOL ® 335 Difunctional Ureidopyrimdine/VORANOL ® 335 Trifunctional Ureidopyrimidone Mixture $C_1$-X-$C_2$/Y-$C_1C_2C_3$ Class | | |
|---|---|---|
| Material Classification | Material | Grams |
| $C_1$-X-$C_2$ component | Difunctional ureido-4(1H)-pyrimidone/VORANOL ® 335 derivative, Compound V | 3.0 |
| Y-$C_1C_2C_3$ component | Trifunctional ureido-4(1H)-pyrimidone/VORANOL ® 335 derivative, Compound VI | 2.0 |
| Co-solvent | γ-butyrolactone | 43.5 |
| Co-solvent | 2-pyrrolidone (5% $H_2O$) BASF | 7.0 |
| Penetrant | 1-octyl-2-pyrrolidone (Aldrich Chemical Co.) | 1.0 |
| Surfactant | SILWET ® L-7200, Witco Corp. (OSI Specialty Chemicals) | 0.5 |
| Carbon Black Dispersion (self-dispersing/carboxyl-functionalized) | IJX-157 (15% aqueous dispersion) Cabot Corporation | 25.0 |
| Water | Deionized water | 18.0 |
| Buffer | Tris-hydroxymethyl aminomethane | pH ~8 |

EXAMPLE XIV

| Yellow Ink with Hydrogen Bonding through Self-Association of VORANOL ® 370 Trifunctional Ureidopyrimidine Y-$C_1C_2C_3$ Class | | |
|---|---|---|
| Material Classification | Material | Grams |
| Y-$C_1C_2C_3$ component | VORANOL ® 370 trifunctional ureidopyrimdine | 5.0 |
| Co-solvent | Sulfolane (5% $H_2O$) Phillips | 30 |
| Co-solvent/penetrant | Tripropylene glycol monomethyl ether (Dowanol TPM) Dow Chemical | 10 |
| Co-solvent | 2-pyrrolidone (5% $H_2O$) BASF | 7.0 |
| Penetrant | 1-octyl-2-pyrrolidone (Aldrich Chemical Co,) | 0.5 |
| Surfactant | TRITON ® X-114 (Aldrich Chemical Co.) | 0.5 |
| Dye | ILFORD YELLOW Y-104 20% aqueous (Ilford) | 12.5 |
| Water | Deionized water | 34.5 |

EXAMPLE XV

| Magenta Ink with Hydrogen Bonding through Self-Association of VORANOL ® 370 Tetrafunctional Ureidopyrimidone Z-$C_1C_2C_3C_4$ Class | | |
|---|---|---|
| Material Classification | Material | Grams |
| $C_1C_2$-X-$C_3$ component | Voranol 370 tetrafunctional ureidopyrimidone | 3.0 |
| Co-solvent | Sulfolane (5% $H_2O$) Phillips | 30 |
| Co-solvent/penetrant | Tripropylene glycol monomethyl ether (Dowanol TPM) Dow Chemical | 10 |
| Co-solvent | 2-pyrrolidone (5% $H_2O$) BASF | 7.0 |
| Penetrant | 1-octyl-2-pyrrolidone, Aldrich Chemical Co. | 0.5 |
| Surfactant | Triton X-114, Aldrich Chemical Co. | 0.5 |
| Dye | Projet Red OAM (8.5% aqueous), Avecia | 5.6 |
| Dye | Ilford Magenta M-377 (xx % aqueous), Ilford | 12.6 |
| Co-solvent | Deionized water | 30.8 |

EXAMPLE XVI

| Carbon Black Ink with Hydrogen Bonding through Association in a Difunctional Pyridone/Tetrafunctional Pyridone System $C_1$-X-$C_2$/Z-$C_1C_2C_3C_4$ Class | | |
|---|---|---|
| Material Classification | Material | Grams |
| $C_1$-X-$C_2$ component | Difunctional pyridone derivative, Compound V | 3.0 |
| Z-$C_1C_2C_3C_4$ component | Tetrafunctional pyridone derivative, Compound VI | 2.0 |
| Co-solvent | γ-butyrolactone | 43.5 |
| Co-solvent | 2-pyrrolidone (5% $H_2O$) BASF | 7.0 |
| Penetrant | 1-octyl-2-pyrrolidone (Aldrich Chemical Co.) | 1.0 |
| Surfactant | SILWET ® L-7200, Witco Corp. OSI Specialty Chemicals) | 0.5 |
| Carbon Black Dispersion (self-dispersing/carboxyl-functionalized) | IJX-157 (15% aqueous dispersion) Cabot Corporation | 25.0 |
| Water | Deionized water | 18.0 |
| Buffer | Tris-hydroxymethyl aminomethane | pH ~8 |

Carbon black inks prepared as described in Examples XI, XII, XIII, and XVI are expected to exhibit Brookfield viscosity values, at a shear rate of 60 rpm, of from about 4 to about 6 centipoise. Control inks of identical composition except that they contain no hydrogen bonding additives are expected to exhibit Brookfield viscosity values, at a shear rate of 60 rpm, of from about 3 to about 5 centipoise. Images printed with the carbon black inks containing the hydrogen bonding additives are expected to exhibit better line edge acuity and higher solid area optical density compared to those printed with control inks containing no hydrogen bonding additive. The wet and dry smear resistance of images printed with carbon black inks containing hydrogen bonding additives is also expected to be much greater than that of control inks containing no hydrogen bonding additive, Color inks prepared as described in Examples XIV and XV are expected to exhibit Brookfield viscosity values, at a shear rate of 60 rpm, of from about 2.5 to about 4 centipoise. Control inks of identical composition except that they contain no hydrogen bonding additives are expected to exhibit Brookfield viscosities of from about 2 to about 3 centipoise. Color images printed with the inks prepared as described in Examples XIV and XV are expected to be brilliant and to exhibit excellent edge acuity.

Other embodiments and modifications of the present invention may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:

1. An aqueous ink composition comprising an aqueous liquid vehicle, a colorant, and an additive which is a material selected from (a) those of the formula $$C_1—X—C_2$$

(b) those of the formula

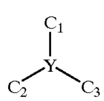

(c) those of the formula

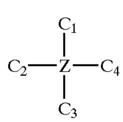

or (d) mixtures of two or more of (a), (b), and/or (c), wherein at least one "C" is a moiety containing a carboxylic acid group of the formulae

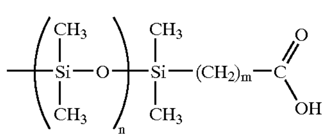

wherein n is an integer of from 1 to about 12 and m is an integer of from about 3 to about 12,

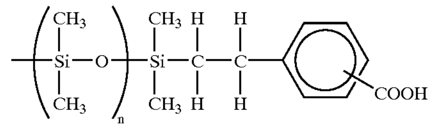

wherein n is an integer of from 1 to about 12, or combinations thereof, wherein each "C" is a moiety either capable of forming at least one hydrogen bond with a moiety identical to itself or capable of forming at least one hydrogen bond with another "C" moiety, each "X" is a divalent moiety, each "Y" is a trivalent moiety, and each "Z" is a tetravalent moiety, wherein, when the ink has been applied to a recording substrate in an image pattern and a substantial amount of the aqueous liquid vehicle has evaporated from the ink image, hydrogen bonds of sufficient strength exist between the "C" groups so that the additive forms hydrogen-bonded oligomers or polymers.

2. An aqueous ink composition comprising an aqueous liquid vehicle, a colorant, and an additive which is a material selected from (a) those of The formula $$C_1—X—C_2$$

(b) Those of the formula

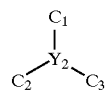

(c) those of the formula

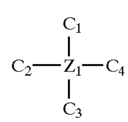

or (d) mixtures of two or more of (a), (b), and/or (c), wherein at least one "C" is a moiety containing a urea group, wherein each "C" is a moiety either capable of forming at least one hydrogen bond with a moiety identical to itself or capable of forming at least one hydrogen bond with another "C" moiety, each "X" is a divalent moiety, each "Y" is a trivalent moiety, and each "Z" is a tetravalent moiety, wherein, when the ink has been applied to a recording substrate in an image pattern and a substantial amount of the aqueous liquid vehicle has evaporated from the ink image, hydrogen bonds of sufficient strength exist between the "C" groups so that the additive forms hydrogen-bonded oligomers or polymers.

3. An ink composition according to claim 2 wherein the urea group is of the formulae

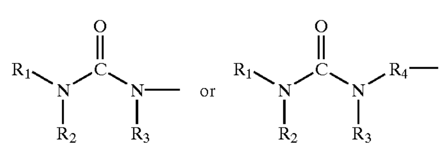

wherein, provided that at least one of $R_1$, $R_2$, and $R_3$ is a hydrogen atom, $R_1$ $R_2$ and $R_3$ each, independently of the others, is a hydrogen atom, an alkyl group, an aryl group, or a combination thereof, and $R_4$ is an alkylene group, an arylene group, an arylalkylene group, an alkylarylene group, a heterocyclic group, a silylene group, a siloxane group, a polysiloxane group, or a combination thereof.

4. An ink composition according to claim 2 wherein the urea group is of the formula

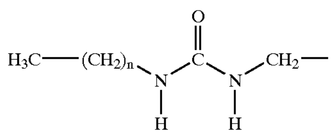

wherein n is an integer of from 0 to about 3.

5. An aqueous ink composition comprising an aqueous liquid vehicle, a colorant, and an additive which is a material selected from (a) those of the formula $C_1$—X—$C_2$ (b) those of the formula

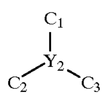

(c) those of the formula

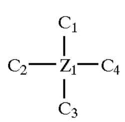

or (d) mixtures of two or more of (a), (b), and/or (c), wherein at least one "C" is a moiety containing a pyridone group, wherein each "C" is a moiety either capable of forming at least one hydrogen bond with a moiety identical to itself or capable of forming at least one hydrogen bond with another "C" moiety, each "X" is a divalent moiety, each "Y" is a trivalent moiety, and each "Z" is a tetravalent moiety, wherein, when the ink has been applied to a recording substrate in an image pattern and a substantial amount of the aqueous liquid vehicle has evaporated from the ink image, hydrogen bonds of sufficient strength exist between the "C" groups so that the additive forms hydrogen-bonded oligomers or polymers.

6. An ink composition according to claim 5 wherein the pyridone group is of the formulae

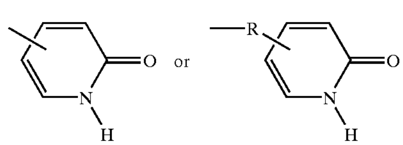

wherein R is an alkylene group, an arylene group, an arylalkylene group, an alkylarylene group, an alkyleneoxy group, a polyalkyleneoxy group, a heterocyclic group, a silylene group, a siloxane group, a polysiloxane group, or a combination thereof.

7. An ink composition according to claim 5 wherein the pyridone group is of the formulae

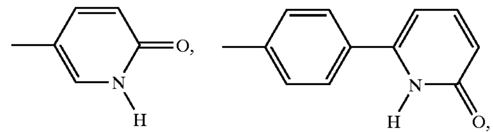

or combinations thereof.

8. An aqueous ink composition comprising an aqueous liquid vehicle, a colorant and an additive which is a material selected from (a) those of the formula $C_1$—X—$C_2$ (b) those of the formula

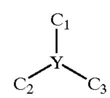

(c) those of the formula

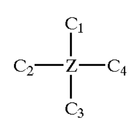

or (d) mixtures of two or more of (a), (b), and/or (c), wherein at least one "C" is a moiety containing a ureido-pyrimidone group, wherein each "C" is a moiety either capable of forming at least one hydrogen bond with a moiety identical to itself or capable of forming at least one hydrogen bond with another "C" moiety, each "X" is a divalent moiety, each "Y" is a trivalent moiety, and each "Z" is a tetravalent moiety, wherein, when the ink has been applied to a recording substrate in an image pattern and a substantial amount of the aqueous liquid vehicle has evaporated from the ink image, hydrogen bonds of sufficient strength exist between the "C" groups so that the additive forms hydrogen-bonded oligomers or polymers.

9. An ink composition according to claim 8 wherein the ureidopyrimidone group is of the formulae

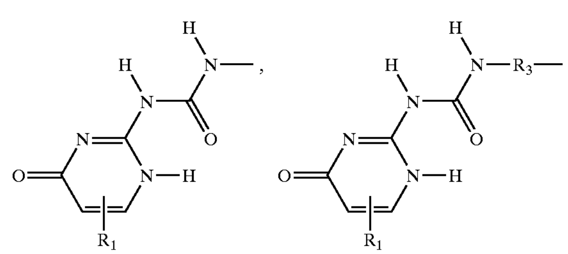

-continued

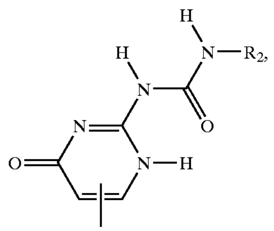

or

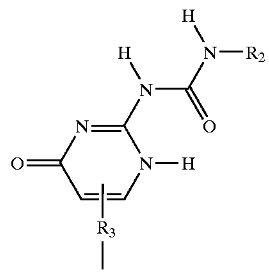

wherein $R_1$ and $R_2$ each, independently of the other, is a hydrogen atom, an alkyl group, an aryl group, or a combination thereof, and $R_3$ is an alkylene group, an arylene group, an arylalkylene group, an alkylarylene group, an alkyleneoxy group, a polyalkyleneoxy group, a heterocyclic group, a silylene group, a siloxane group, a polysiloxane group, or a combination thereof.

10. An ink composition according to claim 8 wherein the ureidopyrimidone group is of the formulae

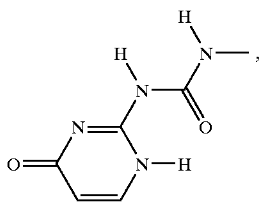

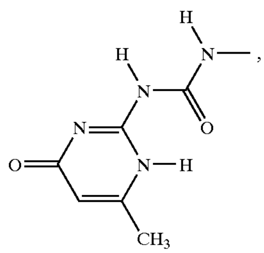

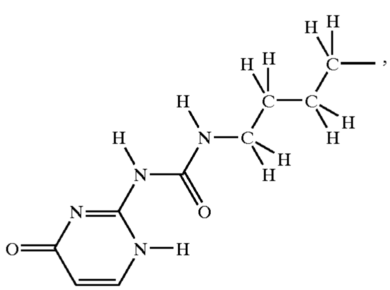

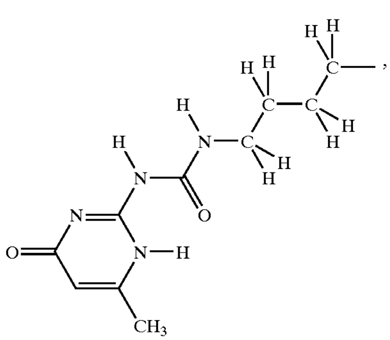

-continued

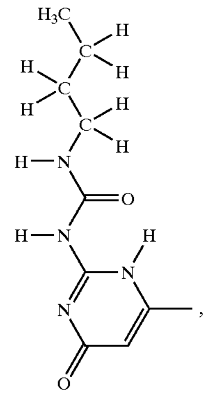

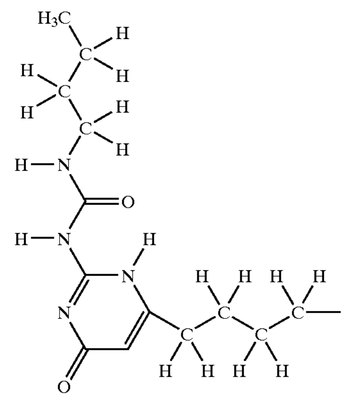

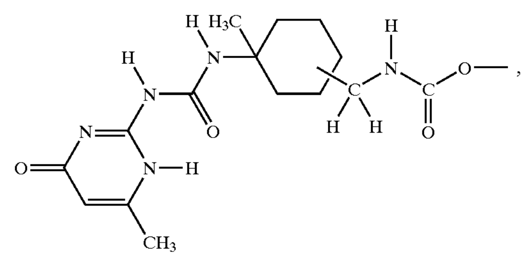

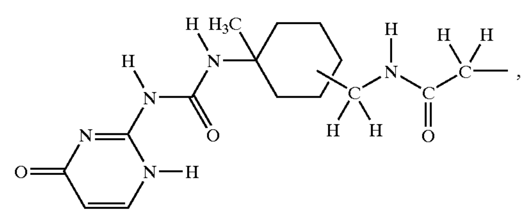

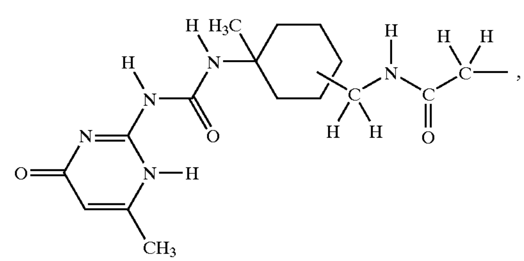

-continued

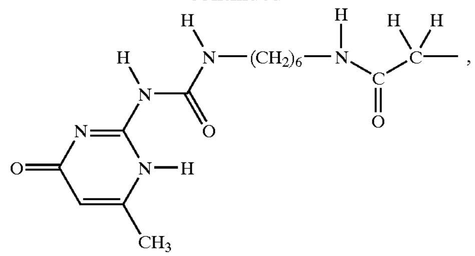

or combinations thereof.

11. An aqueous ink composition comprising an aqueous liquid vehicle, a colorant, and an additive which is a material selected from (a) those of the formula $$C_1—X—C_2$$

(b) those of the formula

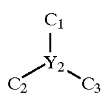

(c) those of the formula

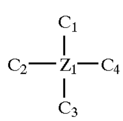

or (d) mixtures of two or more of (a), (b), and/or (c), wherein at least one "C" is a moiety containing an oxime group, wherein each "C" is a moiety either capable of forming at least one hydrogen bond with a moiety identical to itself or capable of forming at least one hydrogen bond with another "C" moiety, each "X" is a divalent moiety, each "Y" in is a trivalent moiety, and each "Z" is a tetravalent moiety, wherein, when the ink has been applied to a recording substrate in an image pattern and a substantial amount of the aqueous liquid vehicle has evaporated from the ink image, hydrogen bonds of sufficient strength exist between the "C" groups so that the additive forms hydrogen-bonded oligomers or polymers.

12. An ink composition according to claim 11 wherein the oxime group is of the formulae

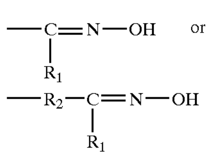

wherein $R_1$ is an alkyl group, an aryl group, an arylalkyl group, an alkylaryl group, or a combination thereof, and $R_2$ is an alkylene group, an arylene group, an arylalkylene group, an alkylarylene group, or a combination thereof.

13. An ink composition according to claim 11 wherein the oxime group is of the formula

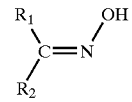

wherein $R_1$ and $R_2$ are alkyl groups with from 1 to about 10 carbon atoms, and wherein $R_1$ and $R_2$ can be joined together to form a ring.

14. An ink composition according to claim 11 wherein the oxime group is of the formulae

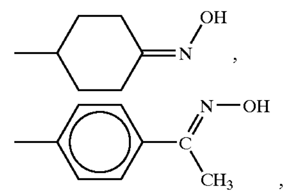

or combinations thereof.

15. An aqueous ink composition comprising an aqueous liquid vehicle, a colorant, and an additive which is a material selected from (a) those of the formula $$C_1—X—C_2$$

(b) those of the formula

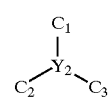

(c) those of the formula

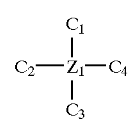

or (d) mixtures of two or more of (a), (b), and/or (c), wherein at least one "C" is a moiety containing an imidazole group, wherein each "C" is a moiety either capable of forming at least one hydrogen bond with a moiety identical to itself or capable of forming at least one hydrogen bond with another "C" moiety, each "X" is a divalent moiety, each "Y" is a trivalent moiety, and each "Z" is a tetravalent moiety, wherein, when the ink has been applied to a recording substrate in an image pattern and a substantial amount of the aqueous liquid vehicle has evaporated from the ink image, hydrogen bonds of sufficient strength exist between the "C" groups so that the additive forms hydrogen-bonded oligomers or polymers.

16. An ink composition according to claim 15 wherein the imidazole group is of the formulae

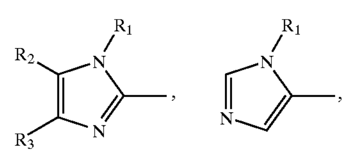

-continued

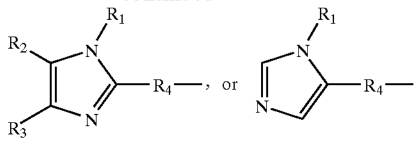

wherein $R_1$ is a hydrogen atom, an alkyl group, or a combination thereof, $R_2$ and $R_3$ each, independently of the other, is a hydrogen atom, an alkyl group, an alkoxy group, a polyalkyleneoxy group, a hydroxy group, an amine group, an imine group, an ammonium group, a cyano group, a pyridine group, a pyridinium group, an ether group, an aldehyde group, a ketone group, a carboxylic acid group, an ester group, an amide group, a carbonyl group, a thiocarbonyl group, a sulfonate group, a sulfoxide group, a nitrile group, a sulfone group, an acyl group, an acid anhydride group, an azide group, or a combination thereof, and $R_4$ is an alkylene group, an arylene group, an arylalkylene group, an alkylarylene group, an alkyleneoxy group, a polyalkyleneoxy group, a heterocyclic group, a silylene group, a siloxane group, a polysiloxane group, or a combination thereof.

17. An ink composition according to claim 15 wherein the imidazole group is of the formulae

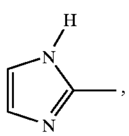

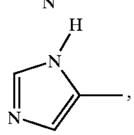

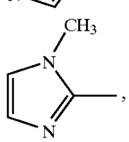

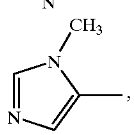

or combinations thereof.

18. An aqueous ink composition comprising an aqueous liquid vehicle, a colorant, and an additive of the formula

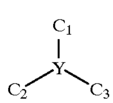

wherein Y is

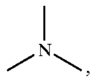

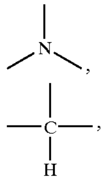

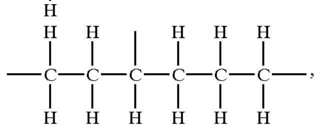

-continued

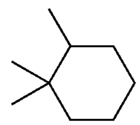

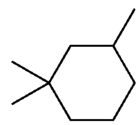

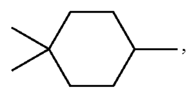

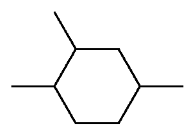

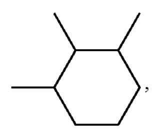

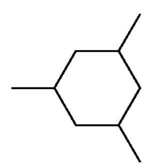

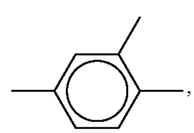

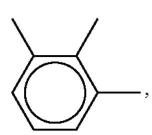

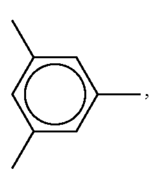

-continued

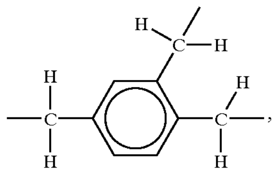

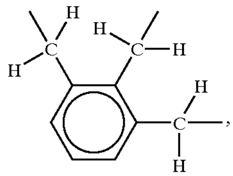

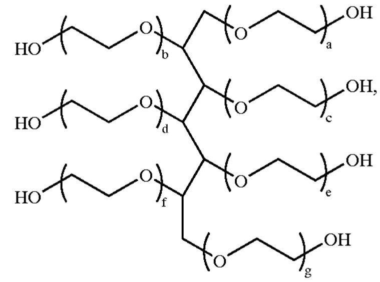

wherein a, b, c, d, e, f, and g are each integers representing the number of ethylene oxide repeat units, trivalent groups formed by removing three hydroxy groups from compounds of the formula

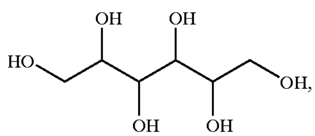

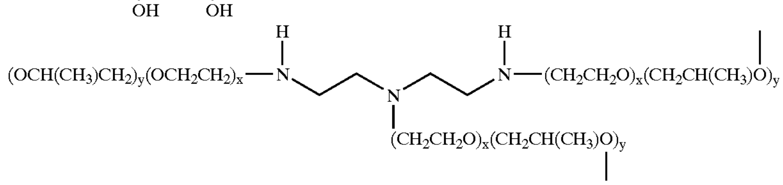

wherein each x, independently of the others, represents the number of repeat polyethylene oxide units and each y, independently of the others; represents the number of repeat polypropylene oxide units, -continued

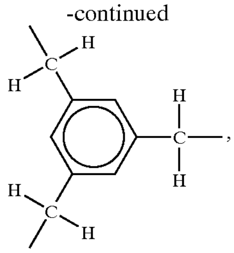

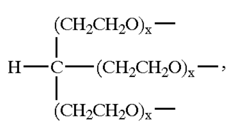

wherein each x, independently of the others, is an integer representing the number of repeat ethylene oxide groups,

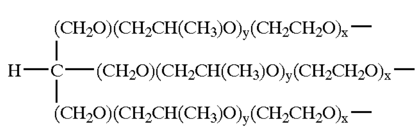

wherein each x, independently of the others, is an integer representing the number of repeat ethylene oxide groups, and wherein each y, independently of the others, is an integer representing the number of repeat isopropylene oxide groups, trivalent groups formed by removing three hydroxy groups from compounds of the formula

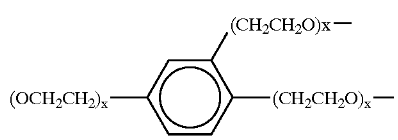

wherein each x, independently of the others, is an integer representing the number of repeat ethylene oxide groups,

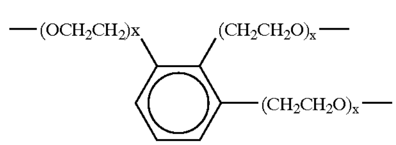

wherein each x, independently of the others, is an integer representing the number of repeat ethylene oxide groups,

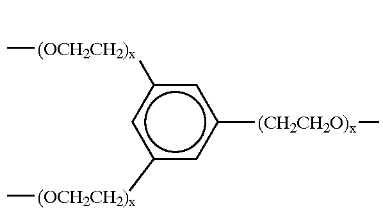

wherein each x, independently of the others, is an integer representing the number of repeat ethylene oxide groups,

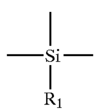

wherein $R_1$ is an alkyl group,

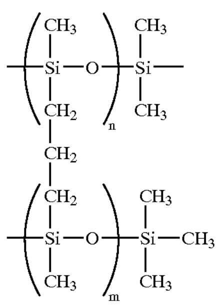

wherein m and n each, independently of the other, is an integer representing the number of repeat alkylsiloxane units,

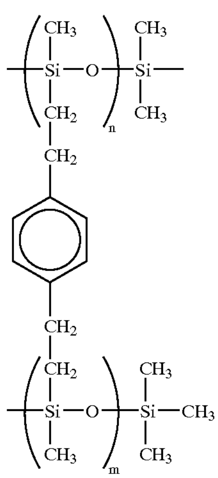

wherein m and n each, independently of the other, is an integer representing the number of repeat alkylsiloxane units,

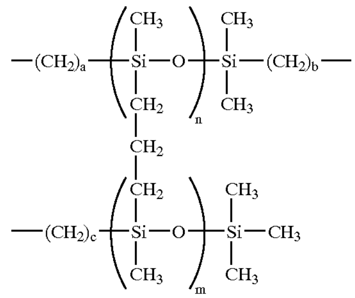

wherein m and n each, independently of the other, is an integer representing the number of repeat siloxane units, and a, b, and c each, independently of the other, are integers representing the number of repeat —$CH_2$— units,

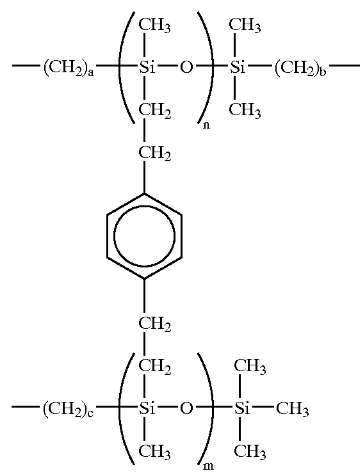

wherein m and n each, independently of the other, is an integer representing the number of repeat siloxane units, and a, b, and c each, independently of the other, are integers representing the number of repeat —$CH_2$— units,

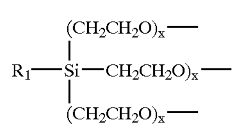

wherein $R_1$ is an alkyl group and wherein each x, independently of the others, is an integer representing the number of repeat ethylene oxide groups,

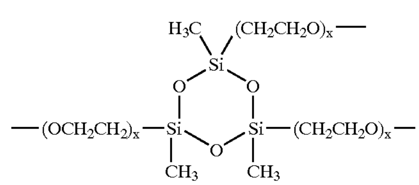

wherein each x, independently of the others, is an integer representing the number of repeat ethylene oxide groups,

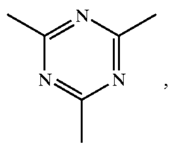

or combinations thereof, wherein each "C" is a moiety either capable of forming at least one hydrogen bond with a moiety identical to itself or capable of forming at least one hydrogen bond with another "C" moiety, when the ink has been applied to a recording substrate in an image pattern and a substantial amount of the aqueous liquid vehicle has evaporated from the ink image, hydrogen bonds of sufficient strength exist between the "C" groups so that the additive forms hydrogen-bonded oligomers or polymers.

19. An aqueous ink composition comprising an aqueous liquid vehicle, a colorant, and an additive of the formula

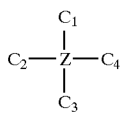

wherein Z is

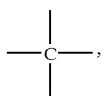

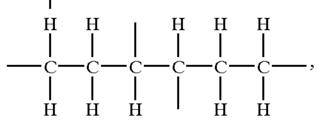

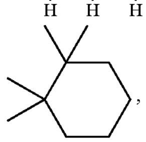

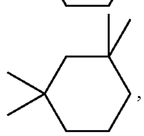

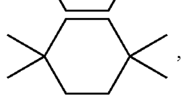

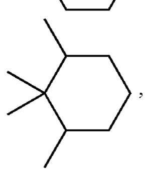

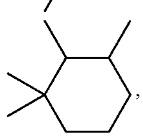

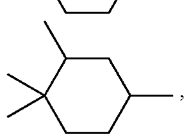

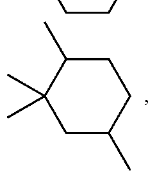

-continued

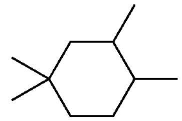

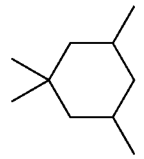

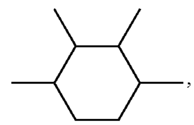

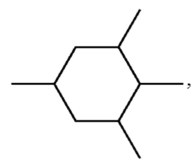

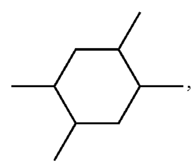

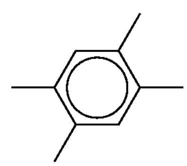

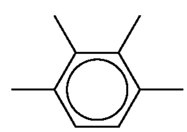

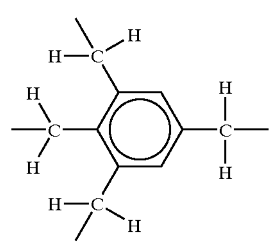

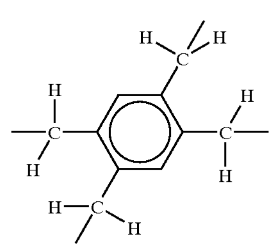

-continued

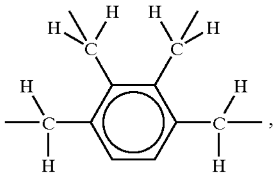

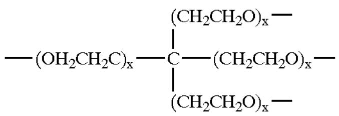

wherein each x, independently of the others, is an integer representing the number of repeat ethylene oxide groups, wherein each x, independently of the others, represents the number of repeat polyethylene oxide units and each y, independently of the others, represents the number of repeat polypropylene oxide units,

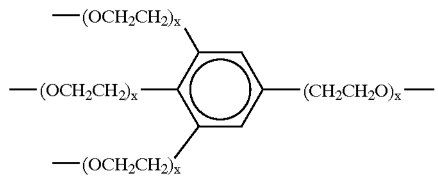

wherein each x, independently of the others, is an integer representing the number of repeat ethylene oxide groups,

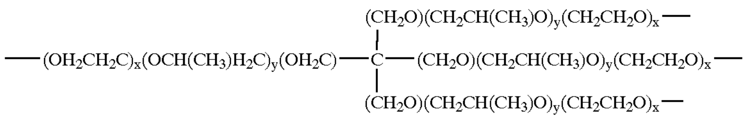

wherein each x, independently of the others, is an integer representing the number of repeat ethylene oxide groups, and wherein each y, independently of the others, is an integer representing the number of repeat isopropylene oxide groups, tetravalent groups formed by removing four hydroxy groups from compounds of the formula

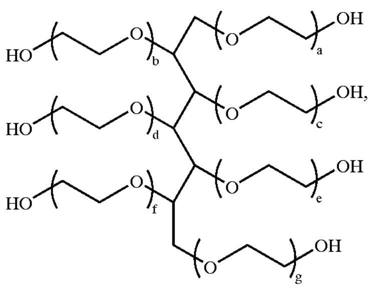

wherein a, b, c, d, e, f, and g are each integers representing the number of ethylene oxide repeat units, tetravalent groups formed by removing four hydroxy groups from compounds of the formula

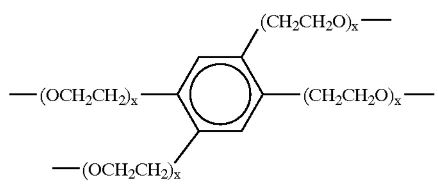

wherein each x, independently of the others, is an integer representing the number of repeat ethylene oxide groups,

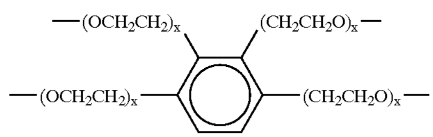

wherein each x, independently of the others, is an integer representing the number of repeat ethylene oxide groups,

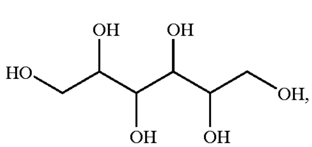

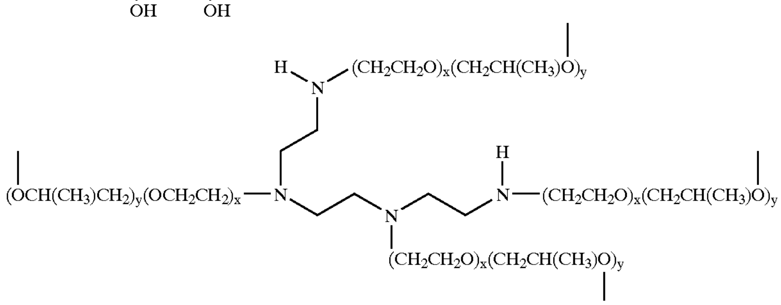

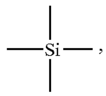

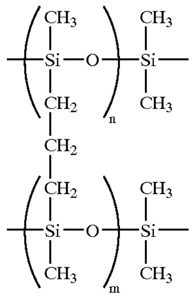

wherein m and n each, independently of the other, is an integer representing the number of repeat alkylsiloxane units,

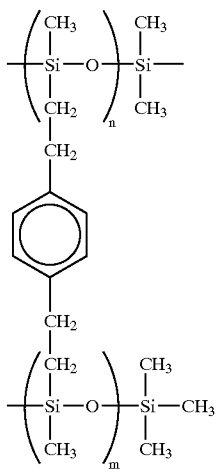

wherein m and n each, independently of the other, is an integer representing the number of repeat alkylsiloxane units,

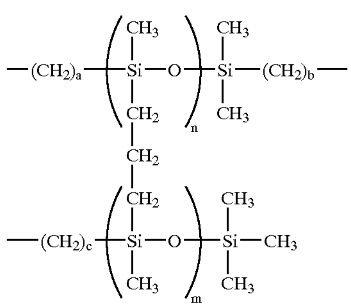

wherein m and n each, independently of the other, is an integer representing the number of repeat siloxane units, and a, b, c, and d each, independently of the other, are integers representing the number of repeat —$CH_2$— units,

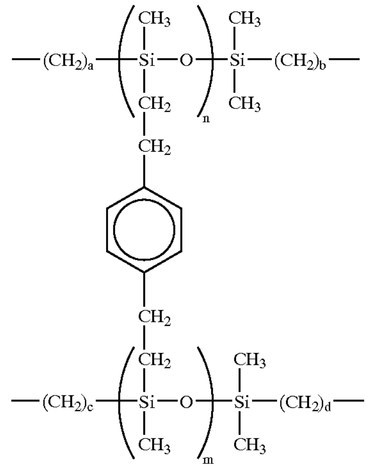

wherein m and n each, independently of the other, is an integer representing the number of repeat siloxane units, and a, b, c, and d each, independently of the other, are integers representing the number of repeat —$CH_2$— units,

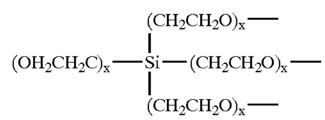

wherein each x, independently of the others, is an integer representing the number of repeat ethylene oxide groups, or combinations thereof, wherein each "C" is a moiety either capable of forming at least one hydrogen bond with a moiety identical to itself or capable of forming at least one hydrogen bond with another "C" moiety, wherein, when The ink has been applied to a recording substrate in an image pattern and a substantial amount of the aqueous liquid vehicle has evaporated from the ink image, hydrogen bonds of sufficient strength exist between the "C" groups so that the additive forms hydrogen-bonded oligomers or polymers.

20. An aqueous ink composition comprising an aqueous liquid vehicle, a colorant and an additive which is a material selected from (I) mixtures of (a) at least one member selected from (i) those of the formula $$A_1\text{-}X_1\text{-}A_2$$

(ii) those of the formula

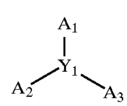

(iii) those of the formula

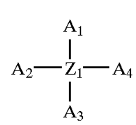

(iv) those of the formula $$A_1\text{-}X_1—B_1$$

(v) those of the formula

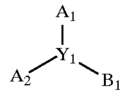

(vi) those of the formula

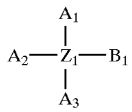

(vii) those of the formula

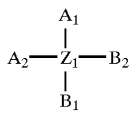

or (viii) mixtures of two or more of (i), (ii), (iii), (iv), (v), (vi), and/or (vii), and (b) at least one member selected from (i) those of the formula $B_1—X_2—B_2$ (ii) those of the formula

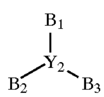

(iii) those of the formula

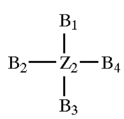

(iv) those of the formula $A_2\text{-}X_2—B_2$ (v) those of the formula

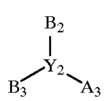

(vi) those of the formula

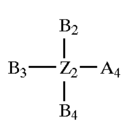

(vii) those of the formula

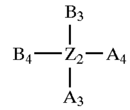

or (viii) mixtures of two or more of (i), (ii), (iii), (iv), (v), (vi), and/or (vii), wherein at least one "A" is a moiety containing a carboxylic acid group of the formulae

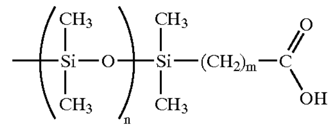

wherein n is an integer of from 1 to about 12 and m is an integer of from about 3 to about 12,

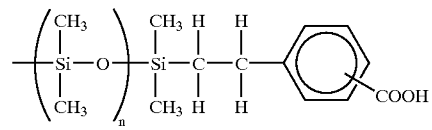

wherein n is an integer of from 1 to about 12, $A_1—X_1—A_2$ (ii) those of the formula

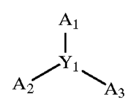

(iii) those of the formula

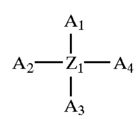

(iv) those of the formula $A_1\text{-}X_1—B_1$ (v) those of the formula

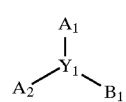

(vi) those of the formula

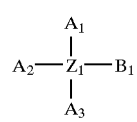

(vii) those of the formula

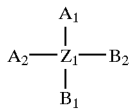

or (viii) mixtures of two or more of (i), (ii), (iii), (iv), (v), (vi), and/or (vii), and (b) at least one member selected from (i) those of the formula

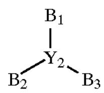

(ii) those of the formula

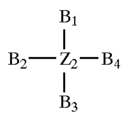

(iii) those of the formula $A_2$-$X_2$—$B_2$ (iv) those of the formula

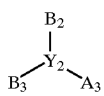

(v) those of the formula

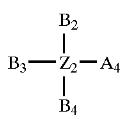

(vi) those of the formula

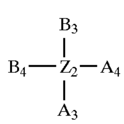

or (vii) mixtures of two or more of (i), (ii), (iii), (iv), (v), and or (vi), wherein at least one "A" is a moiety containing a carboxylic acid group of the formulae

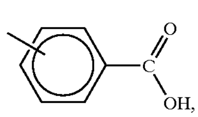

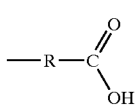

wherein R is an alkyl group with from 1 to about 12 carbon atoms,

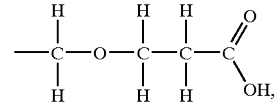

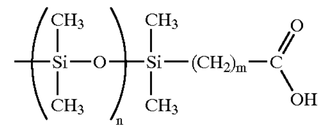

wherein n is an integer of from 1 to about 12 and m is an integer of from about 3 to about 12,

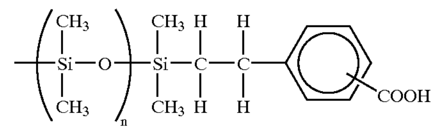

wherein n is an integer of from 1 to about 12,

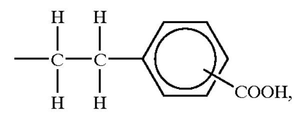

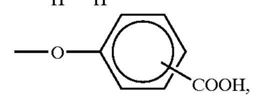

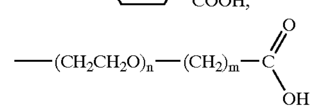

wherein n is an integer of from 1 to about 20 and m is an integer of from about 3 to about 12,

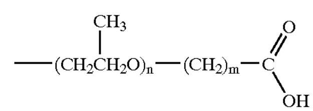

wherein n is an integer of from 1 to about 20 and m is an integer of from about 3 to about 12, or a combination thereof, wherein each "A" is an acidic moiety and each "B" is a basic moiety, wherein each "A" is capable of forming at least one hydrogen bond with at least one "B" and each "B" is capable of forming at least one hydrogen bond with at least one "A" , each "X" is a divalent moiety, each "Y" is a trivalent moiety, and each "Z" is a tetravalent moiety, wherein, when the ink has been applied to a recording substrate in an image pattern and a substantial amount of the aqueous liquid vehicle has evaporated from the ink image, hydrogen bonds of sufficient strength exist between the "A" groups and the "B" groups so that the additive forms hydrogen-bonded oligomers or polymers.

21. An aqueous ink composition comprising an aqueous liquid vehicle, a colorant, and an additive which is a material selected from mixtures of (a) at least one member selected from (i) those of the formula $A_1$-$X_1$-$A_2$ (ii) those of the formula

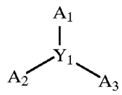

(iii) those of the formula

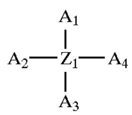

(iv) those of the formula $A_1$-$X_1$—$B_1$ (v) those of the formula

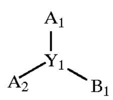

(vi) those of the formula

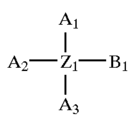

(vii) those of the formula

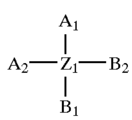

or (viii) mixtures of two or more of (i), (ii), (iii), (iv), (v), (vi), and/or (vii), and (b) at least one member selected from (i) those of the formula $B_1$—$X_2$—$B_2$ (ii) those of the formula

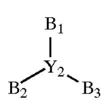

(iii) those of the formula

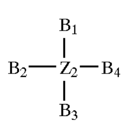

(iv) those of the formula $A_2$-$X_2$—$B_2$ (v) those of the formula

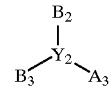

(vi) those of the formula

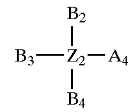

(vii) those of the formula

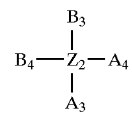

or (viii) mixtures of two or more of (i), (ii), (iii), (iv), (v), (vi), and/or (vii), wherein at least one "B" is a moiety containing a pyridine group of the formula

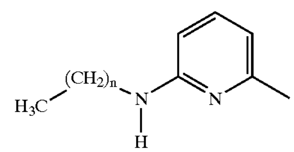

wherein n is an integer representing the number of repeat —$CH_2$— groups, wherein each "A" is an acidic moiety and each "B" is a basic moiety, wherein each "A" is capable of forming at least one hydrogen bond with at least one "B" and each "B" is capable of forming at least one hydrogen bond with at least one "A" , each "X" is a divalent moiety, each "Y" is a trivalent moiety, and each "Z" is a tetravalent moiety, wherein, when the ink has been applied to a recording substrate in an image pattern and a substantial amount of the aqueous liquid vehicle has evaporated from the ink image, hydrogen bonds of sufficient strength exist between the "A" groups and the "B" groups so that the additive forms hydrogen-bonded oligomers or polymers.

22. An ink composition according to claim 21 wherein n is an integer of from 0 to about 3.

23. An aqueous ink composition comprising an aqueous liquid vehicle, a colorant, and an additive which is a material selected from mixtures of (a) at least one member selected from (i) those of the formula $A_1$-$X_1$-$A_2$ (ii) those of the formula

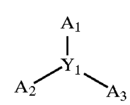

(iii) those of the formula

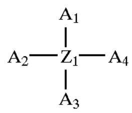

(iv) those of the formula $A_1\text{-}X_1\text{—}B_1$ (v) those of the formula

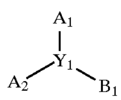

(vi) those of the formula

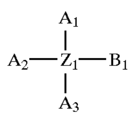

(vii) those of the formula

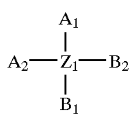

or (viii) mixtures of two or more of (i), (ii), (iii), (iv), (v), (vi), and/or (vii), and (b) at least one member selected from (i) those of the formula $B_1\text{—}X_2\text{—}B_2$ (ii) those of the formula

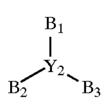

(iii) those of the formula

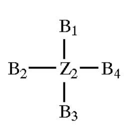

(iv) those of the formula $A_2\text{-}X_2\text{—}B_2$ (v) those of the formula

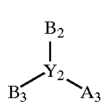

(vi) those of the formula

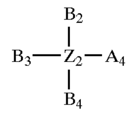

(vii) those of the formula

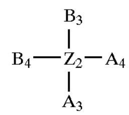

or (viii) mixtures of two or more of (i), (ii), (iii), (iv), (v), (vi), and/or (vii), wherein at least one "B" is a moiety containing a pyridine group of the formulae

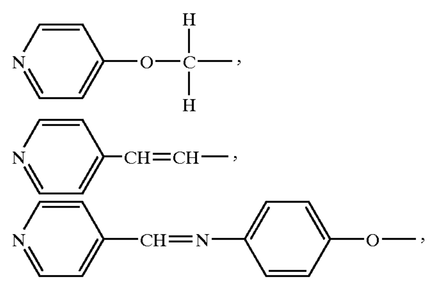

or a combination thereof, wherein each "A" is an acidic moiety and each "B" is a basic moiety, wherein each "A" is capable of forming at least one hydrogen bond with at least one "B" and each "B" is capable of forming at least one hydrogen bond with at least one "A", each "X" is a divalent moiety, each "Y" is a trivalent moiety, and each "Z" is a tetravalent moiety, wherein, when the ink has been applied to a recording substrate in an image pattern and a substantial amount of the aqueous liquid vehicle has evaporated from the ink image, hydrogen bonds of sufficient strength exist between the "A" groups and the "B" groups so that the additive forms hydrogen-bonded oligomers or polymers.

24. An aqueous ink composition comprising an aqueous liquid vehicle, a colorant, and an additive which is a material selected from mixtures of (a) at least one member selected from (i) those of the formula $A_1\text{-}X_1\text{-}A_2$ (ii) those of the formula

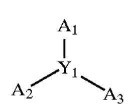

(iii) those of the formula

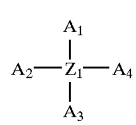

(iv) those of the formula $A_1\text{-}X_1\text{—}B_1$ (v) those of the formula

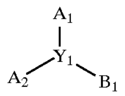

(vi) those of the formula

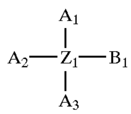

(vii) those of the formula

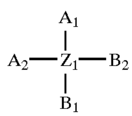

or (viii) mixtures of two or more of (i), (ii), (iii), (iv), (v), (vi), and/or (vii), and (b) at least one member selected from (i) those of the formula $B_1—X_2—B_2$ (ii) those of the formula

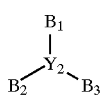

(iii) those of the formula

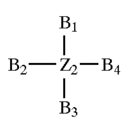

(iv) those of the formula $A_2$-$X_2—B_2$ (v) those of the formula

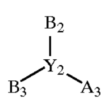

(vi) those of the formula

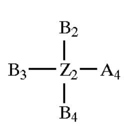

(vii) those of the formula

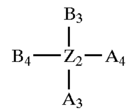

or (viii) mixtures of two or more of (i), (ii), (iii), (iv), (v), (vi), and/or (vii), wherein at least one "B" is a moiety containing a urea group, wherein each "A" is an acidic moiety and each "B" is a basic moiety, wherein each "A" is capable of forming at least one hydrogen bond with at least one "B" and each "B" is capable of forming at least one hydrogen bond with at least one "A" , each "X" is a divalent moiety, each "Y" is a trivalent moiety, and each "Z" is a tetravalent moiety, wherein, when the ink has been applied to a recording substrate in an image pattern and a substantial amount of the aqueous liquid vehicle has evaporated from the ink image, hydrogen bonds of sufficient strength exist between the "A" groups and the "B" groups so that the additive forms hydrogen-bonded oligomers or polymers.

25. An ink composition according to claim 24 wherein the urea group is of the formulae

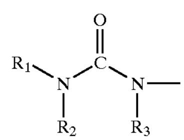

or

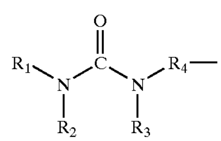

wherein, provided that at least one of $R_1$, $R_2$, and $R_3$ is a hydrogen atom, $R_1$ $R_2$ and $R_3$ each, independently of the others, is a hydrogen atom, an alkyl group, an aryl group, or a combination thereof, and $R_4$ is an alkylene group, an arylene group, an arylalkylene group, an alkylarylene group, a heterocyclic group, a silylene group, a siloxane group, a polysiloxane group, or a combination thereof.

26. An ink composition according to claim 24 wherein the urea group is of the formula

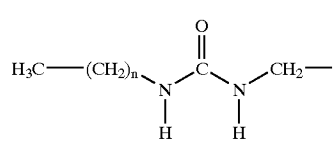

wherein n is an integer of from 0 to about 12.

27. An aqueous ink composition comprising an aqueous liquid vehicle, a colorant, and an additive which is a material selected from mixtures of (a) at least one member selected from (i) those of the formula $A_1$-$X_1$-$A_2$ (ii) those of the formula

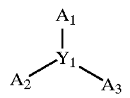

(iii) those of the formula

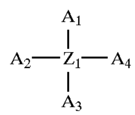

(iv) those of the formula $A_1$-$X_1$—$B_1$ (v) those of the formula

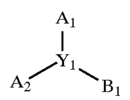

(vi) those of the formula

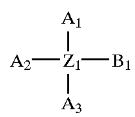

(vii) those of the formula

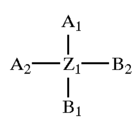

or (viii) mixtures of two or more of (i), (ii), (iii), (iv), (v), (vi), and/or (vii), and (b) at least one member selected from (i) those of the formula $B_1$—$X_2$—$B_2$ (ii) those of the formula

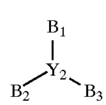

(iii) those of the formula

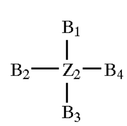

(iv) those of the formula $A_2$-$X_2$—$B_2$ (v) those of the formula

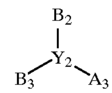

(vi) those of the formula

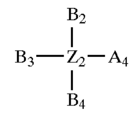

(vii) those of the formula

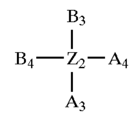

or (viii) mixtures of two or more of (i), (ii), (iii), (iv), (v), (vi), and/or (vii), wherein at least one "B" is a moiety containing an imidazole group, wherein each "A" is an acidic moiety and each "B" is a basic moiety, wherein each "A" is capable of forming at least one hydrogen bond with at least one "B" and each "B" is capable of forming at least one hydrogen bond with at least one "A", each "X" is a divalent moiety, each "Y" is a trivalent moiety, and each "Z" is a tetravalent moiety, wherein, when the ink has been applied to a recording substrate in an image pattern and a substantial amount of the aqueous liquid vehicle has evaporated from the ink image, hydrogen bonds of sufficient strength exist between the "A" groups and the "B" groups so that the additive forms hydrogen-bonded oligomers or polymers.

28. An ink composition according to claim 27 wherein the imidazole group is of the formulae

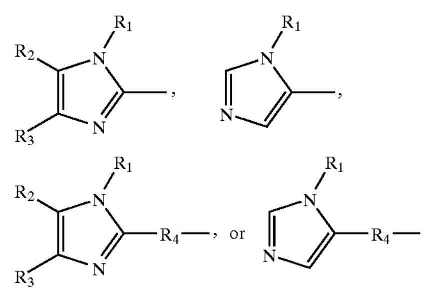

wherein $R_1$ is a hydrogen atom, an alkyl group, or a combination thereof, $R_2$ and $R_3$ each, independently of the other, is a hydrogen atom, an alkyl group, an alkoxy group, a polyalkyleneoxy group, a hydroxy group, an amine group, an imine group, an ammonium group, a cyano group, a pyridine group, a pyridinium group, an ether group, an aldehyde group, a ketone group, a carboxylic acid group, an ester group, an amide group, a carbonyl group, a thiocarbonyl group, a sulfonate group, a sulfoxide group, a nitrile group, a sulfone group, an acyl group, an acid anhydride group, an azide group, or a combination thereof, and $R_4$ is an alkylene group, an arylene group, an arylalkylene group, an alkylarylene group, an alkyleneoxy group, a polyalkyleneoxy group, a heterocyclic group, a silylene group, a siloxane group, a polysiloxane group, or a combination thereof.

29. An ink composition according to claim 27 wherein the imidazole group is of the formulae

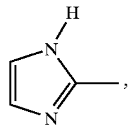

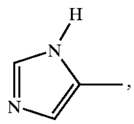

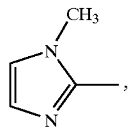

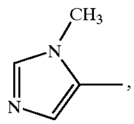

or combinations thereof.

30. An aqueous ink composition comprising an aqueous liquid vehicle, a colorant, and an additive which is a material selected from mixtures of (a) at least one member selected from (i) those of the formula $A_1$-$X_1$-$A_2$ (ii) those of the formula

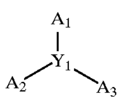

(iii) those of the formula

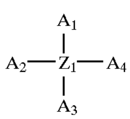

(iv) those of the formula $A_1$-$X_1$—$B_1$ (v) those of the formula

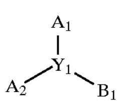

(vi) those of the formula

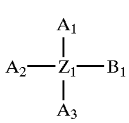

(vii) those of the formula

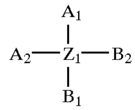

or (viii) mixtures of two or more of (i), (ii), (iii), (iv), (v), (vi), and/or (vii), and (b) at least one member selected from (i) those of the formula $B_1$—$X_2$—$B_2$ (ii) those of the formula

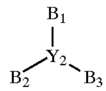

(iii) those of the formula

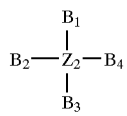

(iv) those of the formula $A_2$-$X_2$—$B_2$ (v) those of the formula

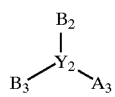

(vi) those of the formula

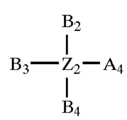

(vii) those of the formula

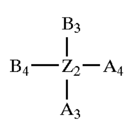

or (viii) mixtures of two or more of (i), (ii), (iii), (iv), (v), (vi), and/or (vii), wherein the ink comprises at least one additive of the formula

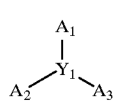

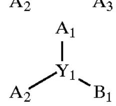

-continued

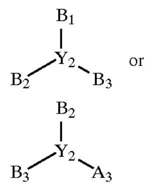

wherein $Y_1$ and/or $Y_2$ is

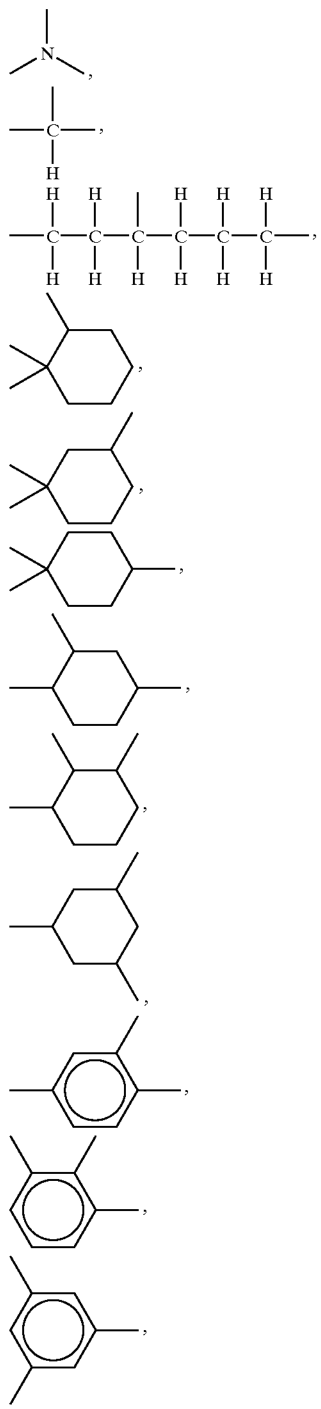

-continued

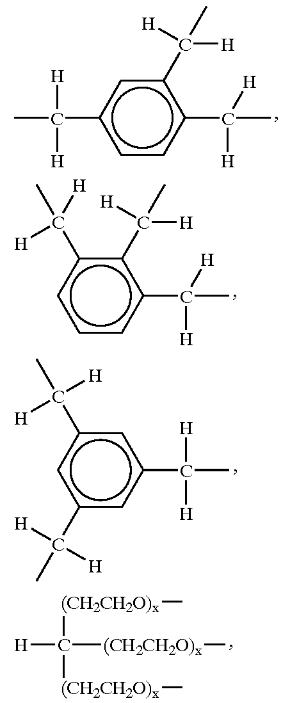

wherein each x, independently of the others, is an integer representing the number of repeat ethylene oxide groups,

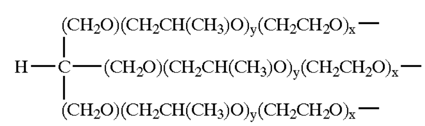

wherein each x, independently of the others, is an integer representing the number of repeat ethylene oxide groups, and wherein each y, independently of the others, is an integer representing the number of repeat isopropylene oxide groups, trivalent groups formed by removing three hydroxy groups from compounds of the formula

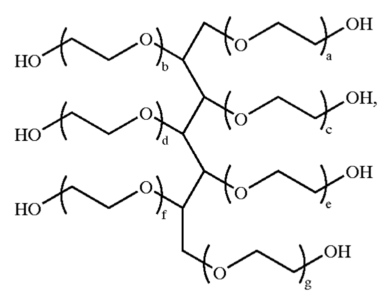

wherein a, b, c, d, e, f, and g are each integers representing the number of ethylene oxide repeat units, trivalent groups formed by removing three hydroxy groups from compounds of the formula

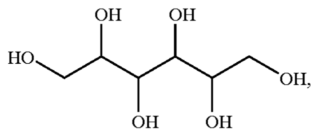

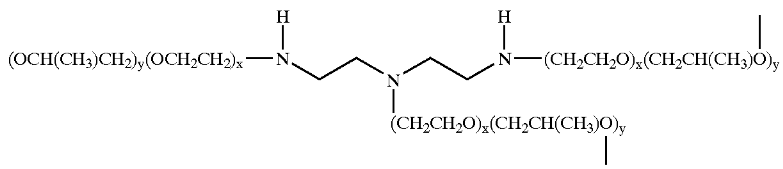

wherein each x, independently of the others, represents the number of repeat polyethylene oxide units and each y, independently of the others, represents the number of repeat polypropylene oxide units,

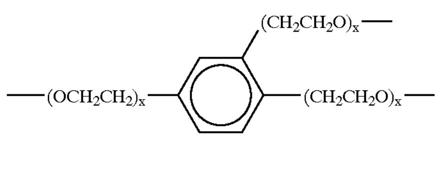

wherein each x, independently of the others, is an integer representing the number of repeat ethylene oxide groups.

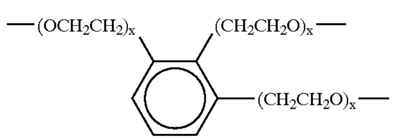

wherein each x, independently of the others, is an integer representing the number of repeat ethylene oxide groups,

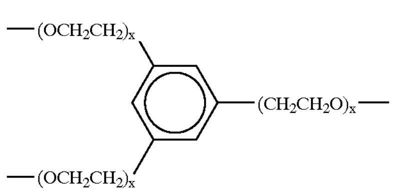

wherein each x, independently of the others, is an integer representing the number of repeat ethylene oxide groups,

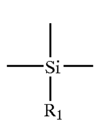

wherein $R_1$ is an alkyl group,

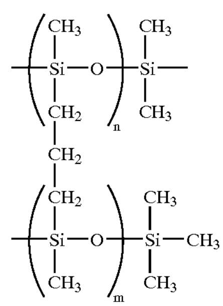

wherein m and n each, independently of the other, is an integer representing the number of repeat alkylsiloxane units,

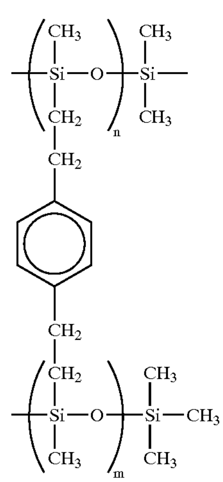

wherein m and n each, independently of the other, is an integer representing the number of repeat alkylsiloxane units,

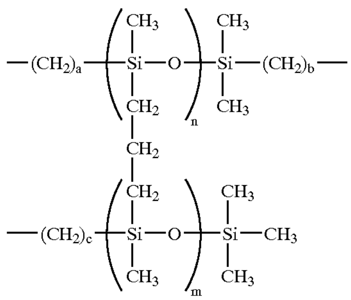

wherein m and n each, independently of the other, is an integer representing the number of repeat siloxane units, and a, b, and c each, independently of the other, are integers representing the number of repeat —$CH_2$— units,

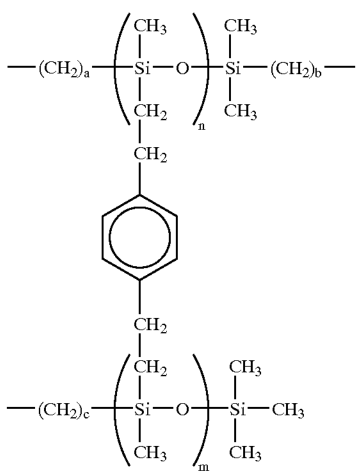

wherein m and n each, independently of the other, is an integer representing the number of repeat siloxane units, and a, b, and c each, independently of the other, are integers representing the number of repeat —$CH_2$— units,

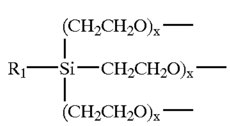

wherein $R_1$ is an alkyl group and wherein each x, independently of the others, is an integer representing the number of repeat ethylene oxide groups,

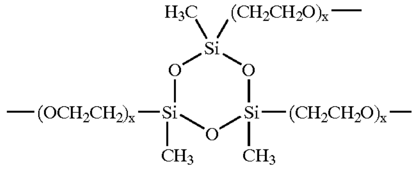

wherein each x, independently of the others, is an integer representing the number of repeat ethylene oxide groups,

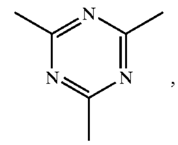

or combinations thereof, wherein each "A" is an acidic moiety and each "B" is a basic moiety, wherein each "A" is capable of forming at least one hydrogen bond with at least one "B" and each "B" is capable of forming at least one hydrogen bond with at least one "A", each "X" is a divalent moiety, each "Y" is a trivalent moiety, and each "Z" is a tetravalent moiety, wherein, when The ink has been applied to a recording substrate in an image pattern and a substantial amount of the aqueous liquid vehicle has evaporated from the ink image, hydrogen bonds of sufficient strength exist between the "A" groups and the "B" groups so That the additive forms hydrogen-bonded oligomers or polymers.

31. An aqueous ink composition comprising an aqueous liquid vehicle, a colorant, and an additive which is material selected from mixtures of (a) at least one member selected from (i) those of the formula $$A_1\text{-}X_1\text{-}A_2$$

(ii) those of the formula

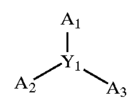

(iii) those of the formula

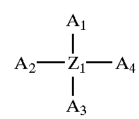

(iv) those of the formula $$A_1\text{-}X_1\text{—}B_1$$

(v) those of the formula

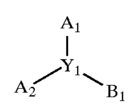

(vi) those of the formula

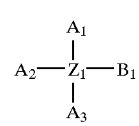

(vii) those of the formula

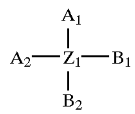

or (viii) mixtures of two or more of (i), (ii), (iii), (iv), (v), (vi), and/or (vii), and (b) at least one member selected from (i) those of the formula $B_1—X_2—B_2$ (ii) those of the formula

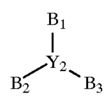

(iii) those of the formula

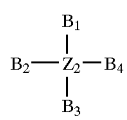

(iv) those of the formula $A_2$-$X_2—B_2$ (v) those of the formula

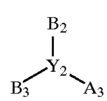

(vi) those of the formula

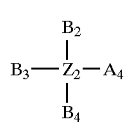

(vii) those of the formula

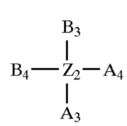

or (viii) mixtures of two or more of (i), (ii), (iii), (iv), (v), (vi), and/or (vii), wherein the ink comprises at least one additive of the formula

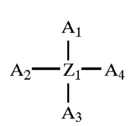

-continued

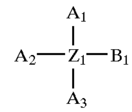

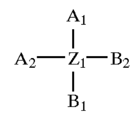

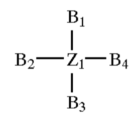

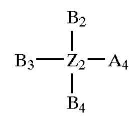

or

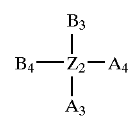

wherein $Z_1$ and/or $Z_2$ is

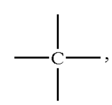

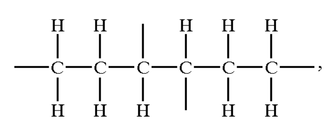

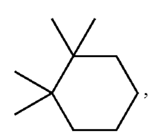

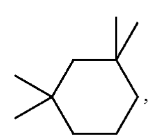

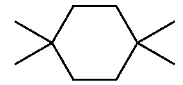

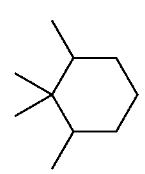

-continued
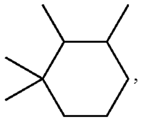
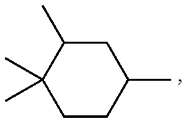
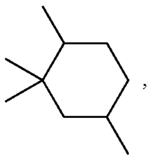
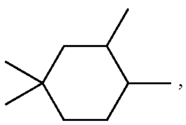
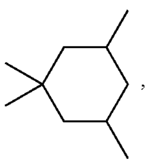
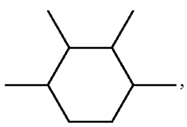
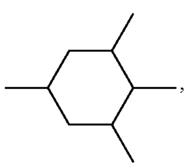
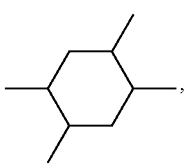
-continued
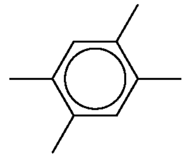
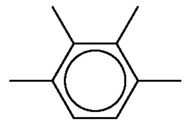
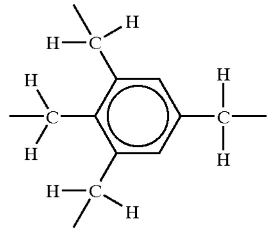
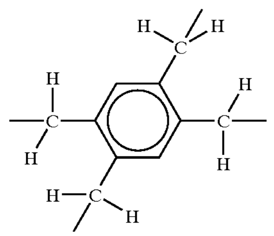
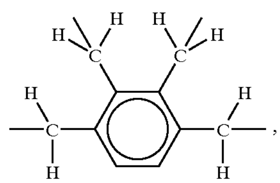
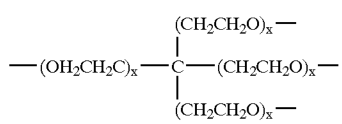
wherein each x, independently of the others, is an integer representing the number of repeat ethylene oxide groups,
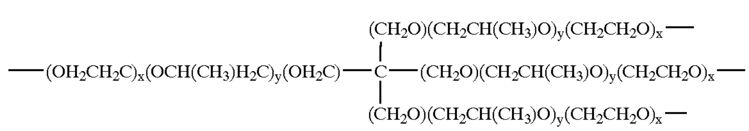

wherein each x, independently of the others, is an integer representing the number of repeat ethylene oxide groups, and wherein each y, independently of the others, is an integer representing the number of repeat isopropylene oxide groups, tetravalent groups formed by removing four hydroxy groups from compounds of the formula

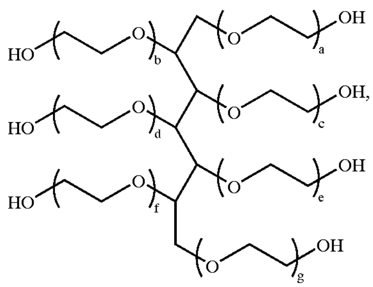

wherein a, b, c, d, e, f, and g are each integers representing the number of ethylene oxide repeat units, tetravalent groups formed by removing four hydroxy groups from compounds of the formula

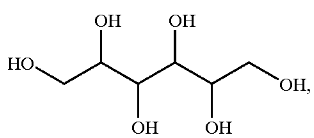

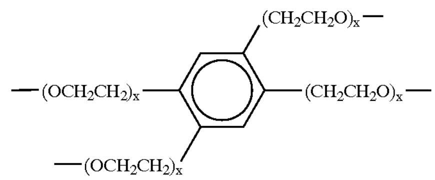

wherein each x, independently of the others, is an integer representing the number of repeat ethylene oxide groups,

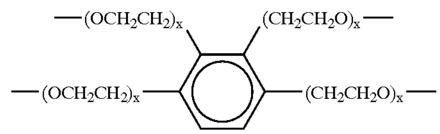

wherein each x, independently of the others, is an integer representing the number of repeat ethylene oxide groups,

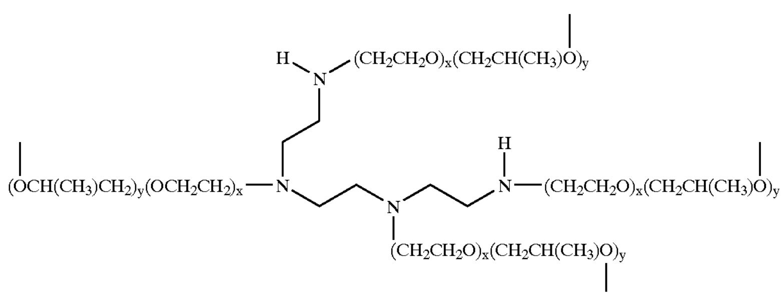

wherein each x, independently of the others, represents the number of repeat polyethylene oxide units and each y, independently of the others, represents the number of repeat polypropylene oxide units,

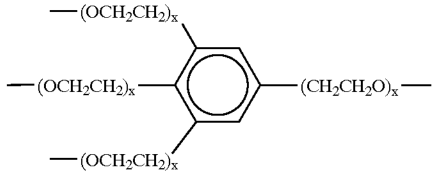

wherein each x, independently of the others, is an integer representing the number of repeat ethylene oxide groups,

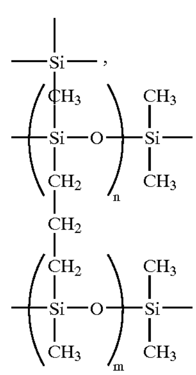

wherein m and n each, independently of the other, is an integer representing the number of repeat alkylsiloxane units,

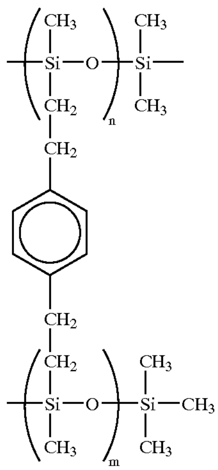

wherein m and n each, independently of the other, is an integer representing the number of repeat alkylsiloxane units,

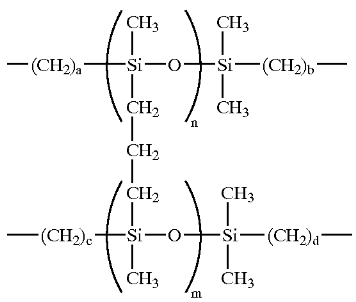

wherein m and n each, independently of the other, is an integer representing the number of repeat siloxane units, and a, b, c, and d each, independently of the other, are integers representing the number of repeat —$OH_2$— units,

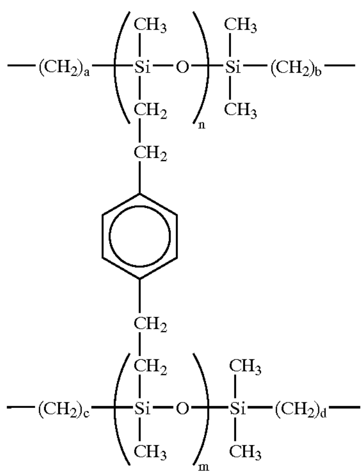

wherein m and n each, independently of the other, is an integer representing the number of repeat siloxane units, and a, b, c, and d each, independently of the other, are integers representing the number of repeat —$CH_2$— units,

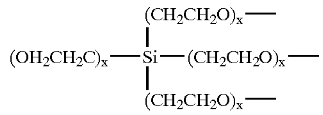

wherein each x, independently of the others, is an integer representing the number of repeat ethylene oxide groups, or combinations thereof, wherein each "A" is an acidic moiety and each "B" is a basic moiety, wherein each "A" is capable of forming at least one hydrogen bond with at least one "B" and each "B" is capable of forming at least one hydrogen bond with at least one "A", each "X" is a divalent moiety, each "Y" is a trivalent moiety, and each "Z" is a tetravalent moiety, wherein, when the ink has been applied to a recording substrate in an image pattern and a substantial amount of the aqueous liquid vehicle has evaporated from the ink image, hydrogen bonds of sufficient strength exist between the "A" groups and the "B" groups so that the additive forms hydrogen-bonded oligomers or polymers.

32. An aqueous ink composition comprising an aqueous liquid vehicle, a colorant, and an additive which is either (1) a material selected from (a) those of the formula $C_1$—X—$C_2$ (b) those of the formula

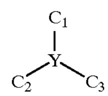

(c) those of the formula

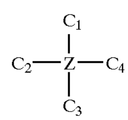

or (d) mixtures of two or more of (a), (b), and/or (c); or (2) a material selected from mixtures of (a) at least one member selected from (i) those of the formula $A_1$-$X_1$-$A_2$ (ii) those of the formula

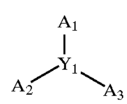

(iii) those of the formula

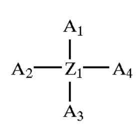

(iv) those of the formula $A_1$-$X_1$—$B_1$ (v) those of the formula

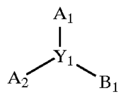

(vi) those of the formula

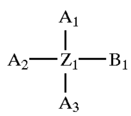

(vii) those of the formula

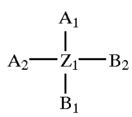

or (viii) mixtures of two or more of (i), (ii), (iii), (iv), (v), (vi), and/or (vii), and (b) at least one member selected from (i) those of the formula $$B_1—X_2—B_2$$

(ii) those of the formula

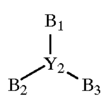

(iii) those of the formula

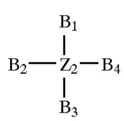

(iv) those of the formula $$A_2\text{-}X_2—B_2$$

(v) those of the formula

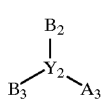

(vi) those of the formula

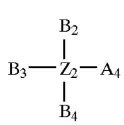

(vii) those of the formula

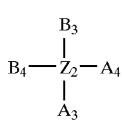

or (viii) mixtures of two or more of (i), (ii), (iii), (iv), (v), (vi), and/or (vii), wherein each "A" is an acidic moiety and each "B" is a basic moiety, wherein each "A" is capable of forming at least one hydrogen bond with at least one "B" and each "B" is capable of forming at least one hydrogen bond with at least one "A", each "C" is a moiety either capable of forming at least one hydrogen bond with a moiety identical to itself or capable of forming at least one hydrogen bond with another "C" moiety, each "X" is a divalent moiety, each "Y" is a trivalent moiety, and each "Z" is a tetravalent moiety, wherein, when the ink has been applied to a recording substrate in an image pattern and a substantial amount of the aqueous liquid vehicle has evaporated from the ink image, hydrogen bonds of sufficient strength exist either between the "A" groups and the "B" groups or between the "C" groups so that the additive forms hydrogen-bonded oligomers or polymers, wherein the additive comprises (1) a compound of the formula

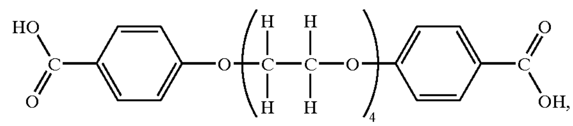

(2) a compound of the formula

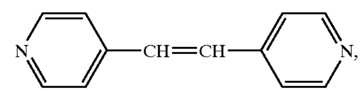

(3) a mixture of

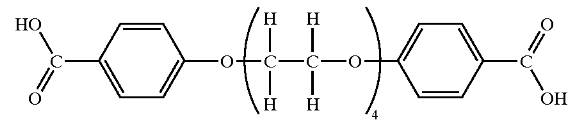

and

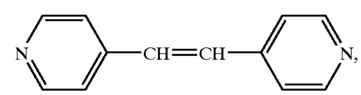

(4) a compound of the formula

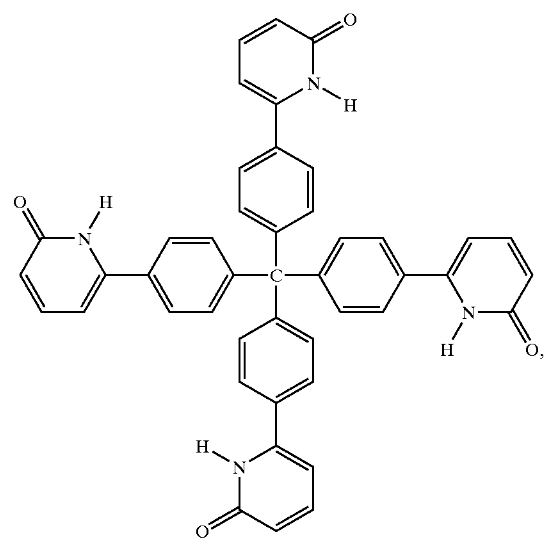

(5) a compound of the formula

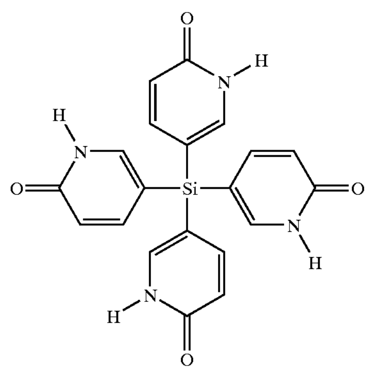

(6) a compound of the formula

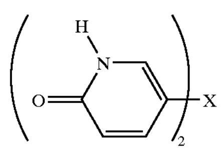

wherein X is a divalent group formed by removing two hydroxy groups from a compound of the formula

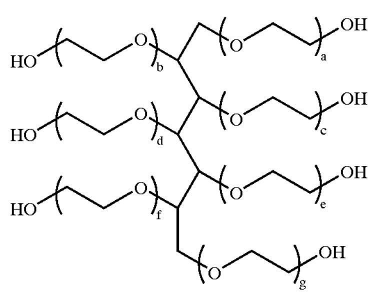

wherein a, b, c, d, e, f, and g are each integers representing the number of ethylene oxide repeat units, and wherein the molecular weight of the compound of the formula

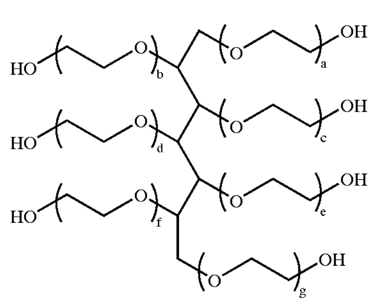

is about 1,040, (7) a compound of the formula

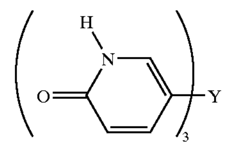

wherein Y is a trivalent group formed by removing three hydroxy groups from a compound of the formula

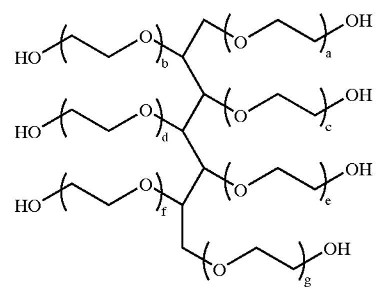

wherein a, b, c, d, e, f, and g are each integers representing the number of ethylene oxide repeat units, and wherein the molecular weight of the compound of the formula

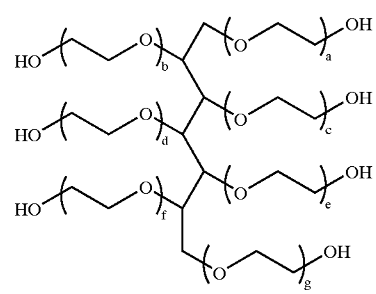

is about 1,040, (8) a compound of the formula

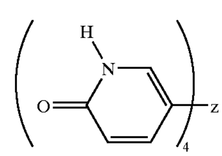

wherein Z is a tetravalent group formed by removing four hydroxy groups from a compound of the formula

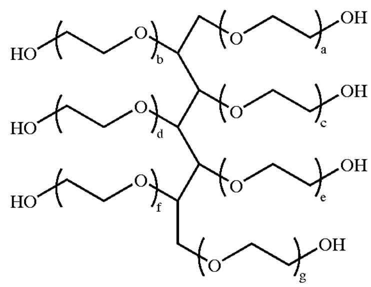

wherein a, b, c, d, e, f, and g are each integers representing the number of ethylene oxide repeat units, and wherein the molecular weight of the compound of the formula

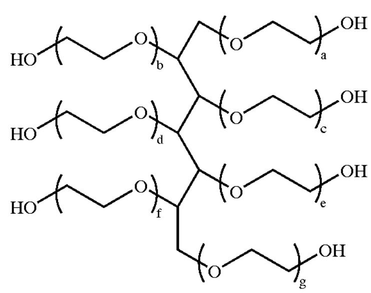

is about 1,040, (9) a compound of the formula

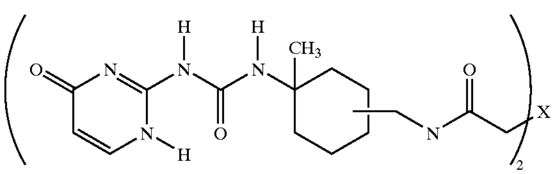

wherein X is a divalent group formed by removing two hydroxy groups from a compound of the formula

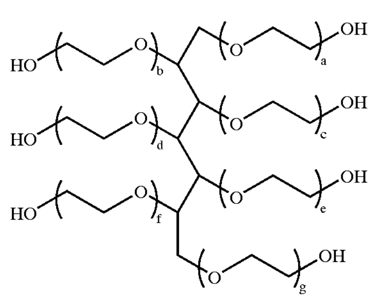

wherein a, b, c, d, e, f, and g are each integers representing the number of ethylene oxide repeat units, and wherein the molecular weight of the compound of the formula

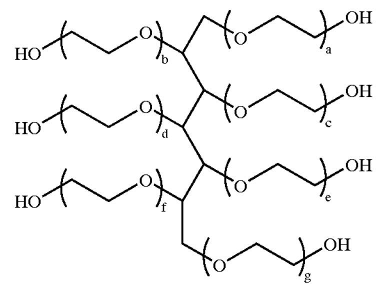

is about 1,040, (10) a compound of the formula

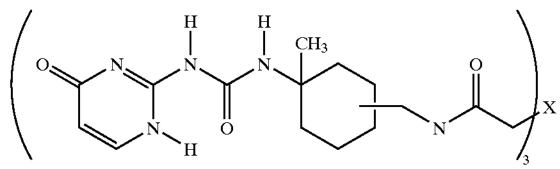

wherein Y is a trivalent group formed by removing three hydroxy groups from a compound of the formula

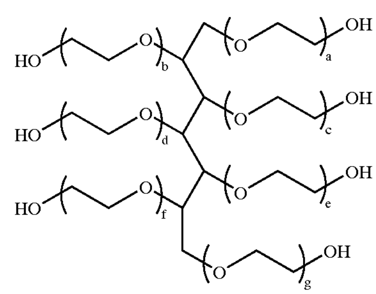

wherein a, b, c, d, e, f, and g are each integers representing the number of ethylene oxide repeat units, and wherein the molecular weight of the compound of the formula

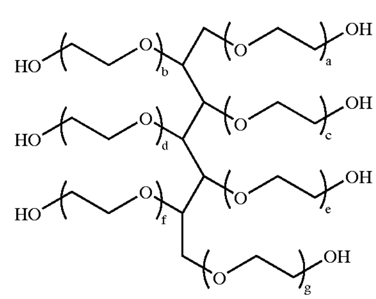

is about 1,040, (11) a compound of the formula

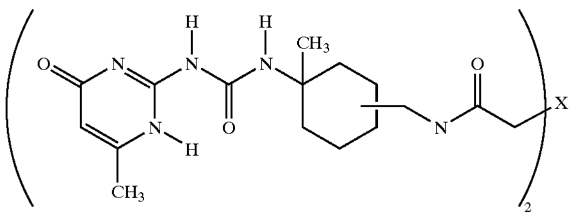

wherein X is a divalent group formed by removing two hydroxy groups from a compound of the formula

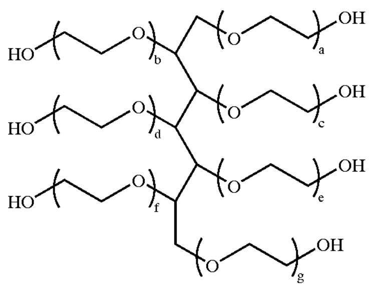

wherein a, b, c, d, e, f, and g are each integers representing the number of ethylene oxide repeat units, and wherein the molecular weight of the compound of the formula

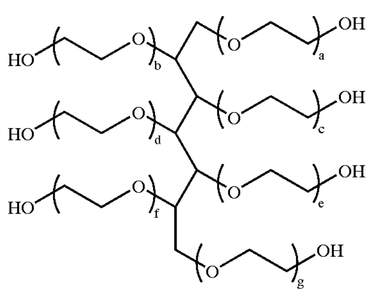

is about 1,040, (12) a compound of the formula

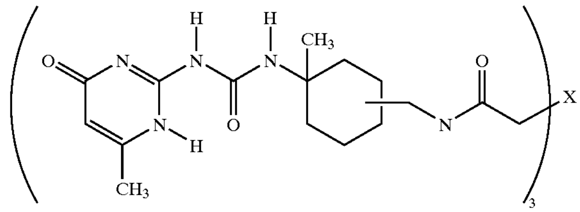

wherein Y is a trivalent group formed by removing three hydroxy groups from a compound of the formula

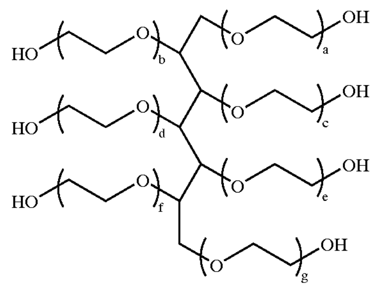

wherein a, b, C, d, e, f, and g are each integers representing the number of ethylene oxide repeat units, and wherein the molecular weight of the compound of the formula

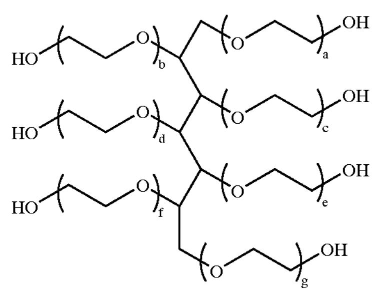

is about 1,040, (13) a compound of the formula

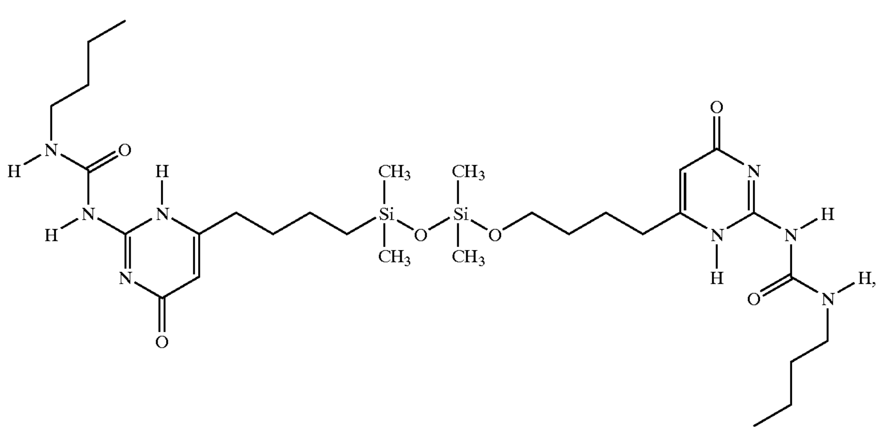

(14) a compound of the formula

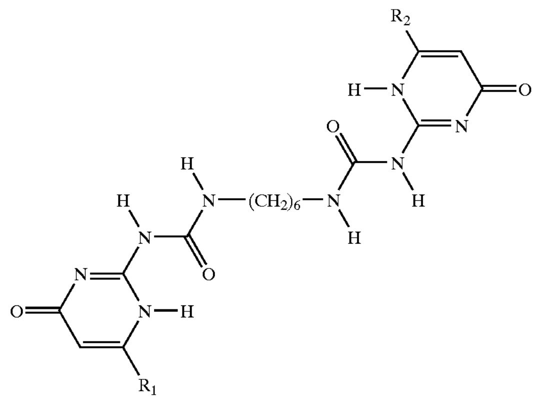

wherein $R_1$ and $R_2$ each, independently of the other, is an alkyl group with from 1 to about 18 carbon atoms, (15) a compound of the formula

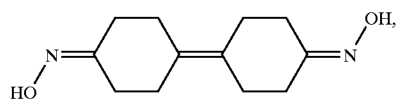

(16) a compound of the formula

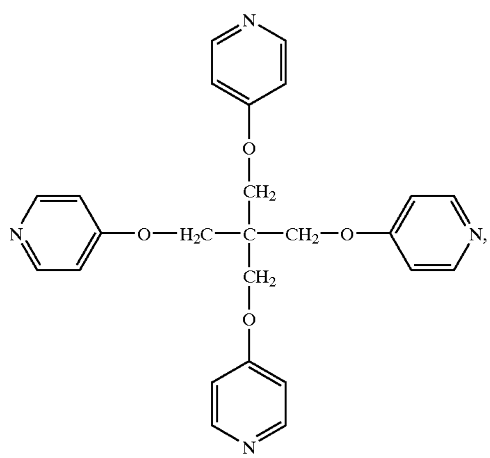

(17) a compound of the formula

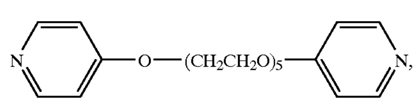

(18) a compound of the formula

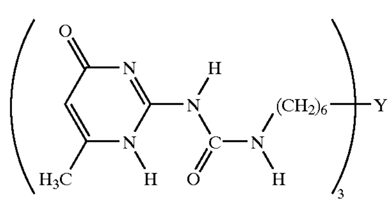

wherein Y is a trivalent group formed by removing three hydroxy groups from a compound of the formula

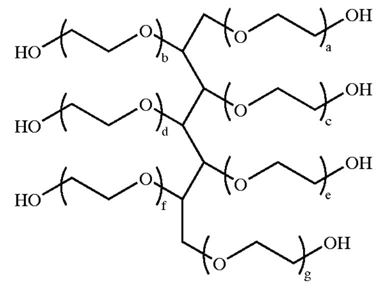

wherein a, b, c, d, e, f, and g are each integers representing the number of ethylene oxide repeat units, and wherein the molecular weight of the compound of the formula

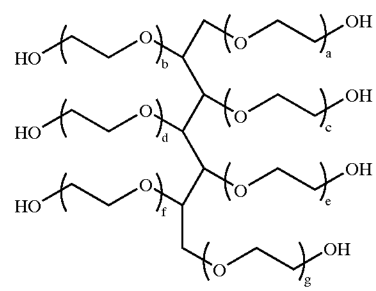

is about 1,040, (19) a compound of the formula

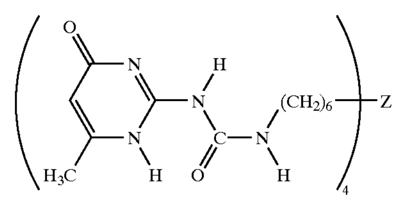

wherein Z is a tetravalent group formed by removing four hydroxy groups from a compound of the formula

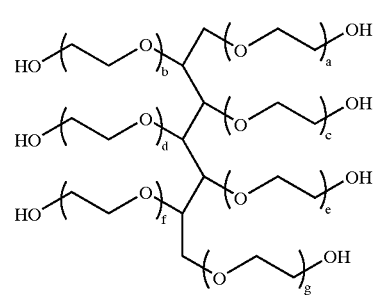

wherein a, b, c, d, e, f, and g are each integers representing the number of ethylene oxide repeat units, and wherein the molecular weight of the compound of the formula

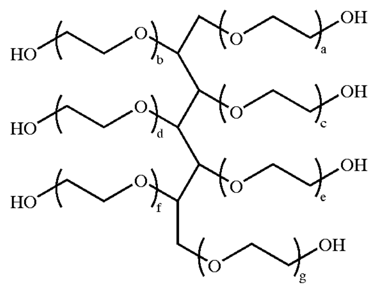

is about 1,040, (20) a compound of the formula

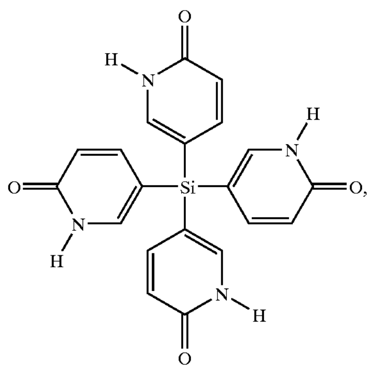

(21) a compound of the formula

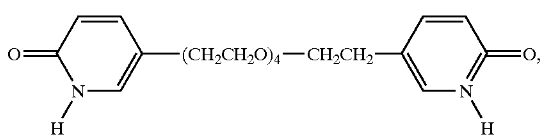

(22) a mixture of

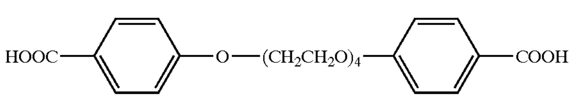

and

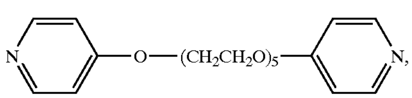

(23) a mixture of

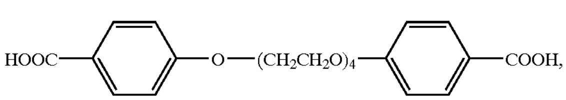

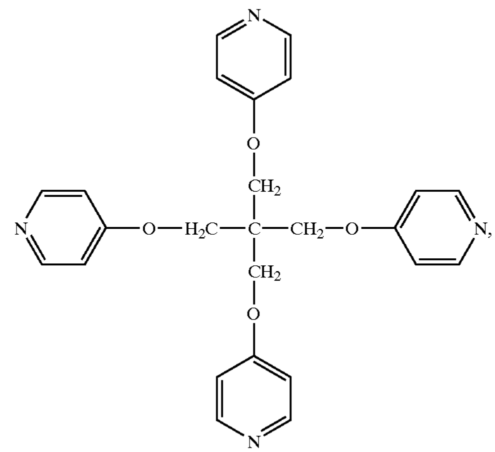

and

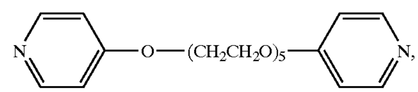

or (24) mixtures thereof.

33. An ink composition according to claim 32 wherein the ink comprises an additive of the formula

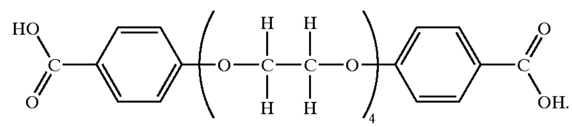

34. An ink composition according to claim 32 wherein the ink comprises an additive of the formula

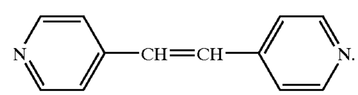

35. An ink composition according to claim 32 wherein the ink comprises a mixture of

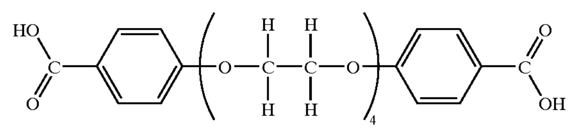

and

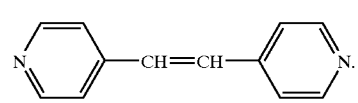

36. An ink composition according to claim 32 wherein the ink comprises an additive of the formula

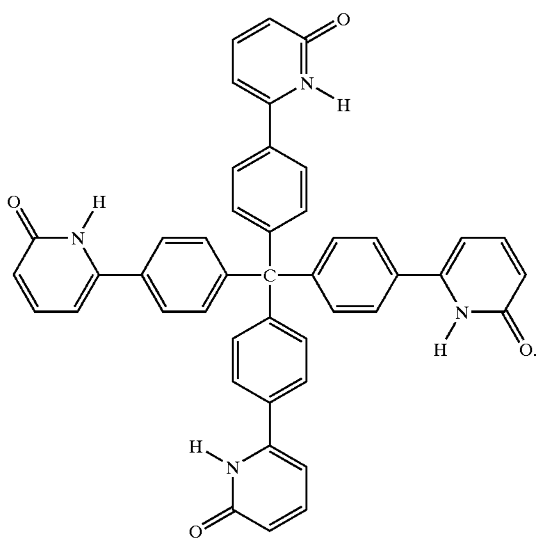

37. An ink composition according to claim 32 wherein the ink comprises an additive of the formula

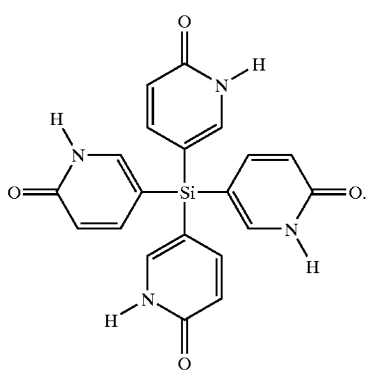

38. An ink composition according to claim 32 wherein the ink comprises an additive of the formula

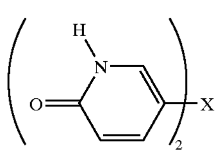

wherein X is a divalent group formed by removing two hydroxy groups from a compound of the formula

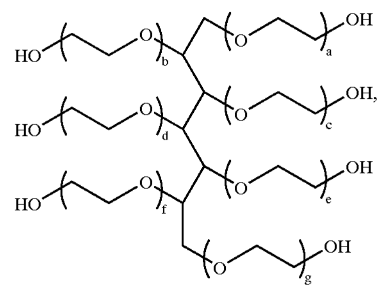

wherein a, b, c, d, e, f, and g are each integers representing the number of ethylene oxide repeat units, and wherein the molecular weight of the compound of the formula

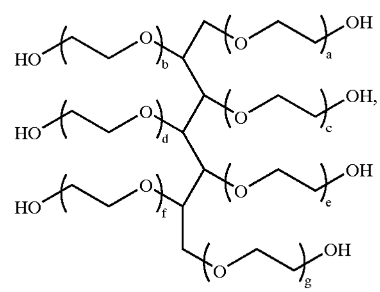

is about 1,040.

39. An ink composition according to claim 32 wherein the ink comprises an additive of the formula

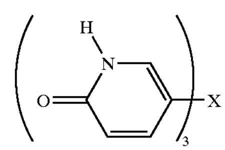

wherein Y is a trivalent group formed by removing three hydroxy groups from a compound of the formula

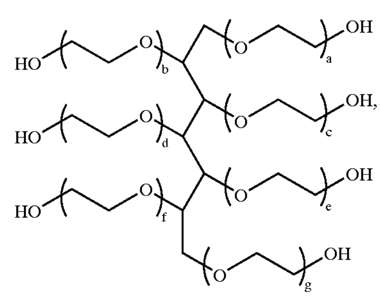

wherein a, b, c, d, e, f, and g are each integers representing the number of ethylene oxide repeat units, and wherein the molecular weight of the compound of the formula

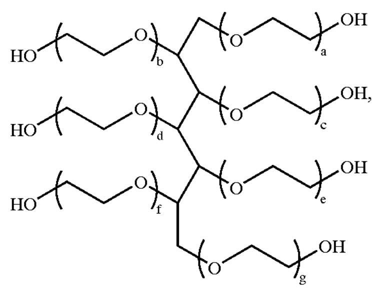

is about 1,040.

40. An ink composition according to claim 32 wherein the ink comprises an additive of the formula

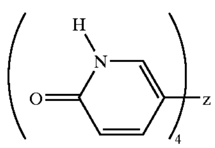

wherein Z is a tetravalent group formed by removing four hydroxy groups from a compound of the formula

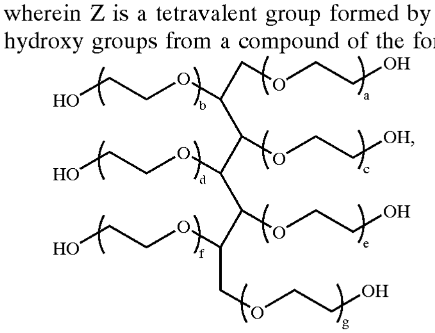

wherein a, b, c, d, e, f and g are each integers representing the number of ethylene oxide repeat units, and wherein the molecular weight of the compound of the formula

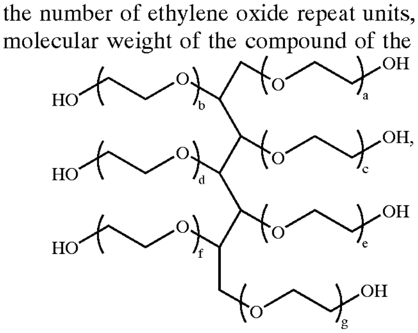

is about 1,040.

41. An ink composition according to claim 32 wherein the ink comprises an additive of the formula

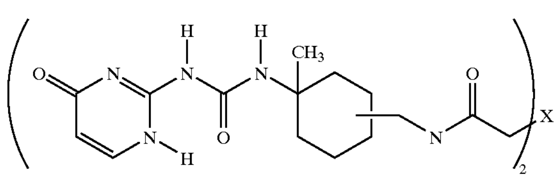

wherein X is a divalent group formed by removing two hydroxy groups from a compound of the formula

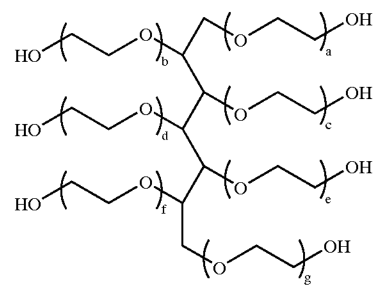

wherein a, b, c, d, e, f, and g are each integers representing the number of ethylene oxide repeat units, and wherein the molecular weight of the compound of the formula

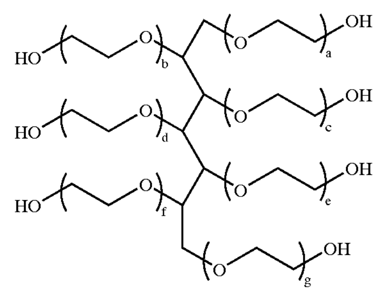

is about 1,040.

42. An ink composition according to claim 32 wherein the ink comprises an additive of the formula

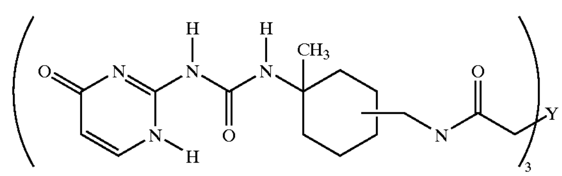

wherein Y is a trivalent group formed by removing three hydroxy groups from a compound of the formula

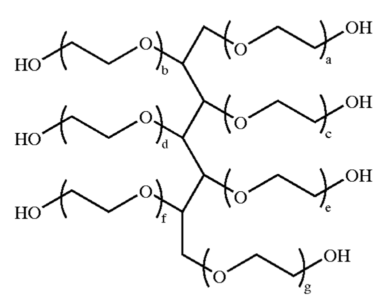

wherein a, b, c, d, e, f, and g are each integers representing the number of ethylene oxide repeat units, and wherein the molecular weight of the compound of the formula

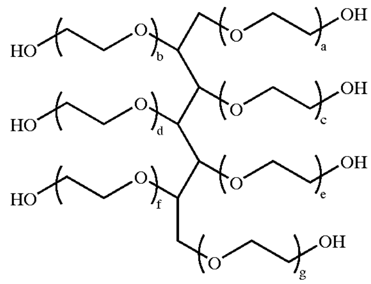

is about 1,040.

43. An ink composition according to claim 32 wherein the ink comprises an additive of the formula

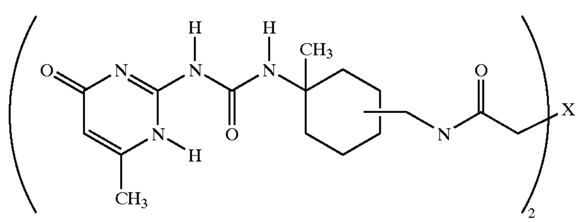

wherein X is a divalent group formed by removing two hydroxy groups from a compound of the formula

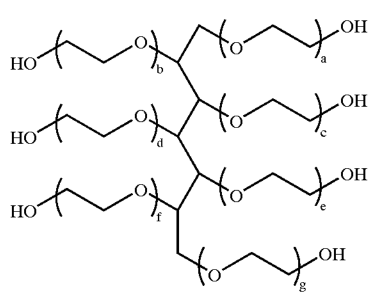

wherein a, b, c, d, e, f, and g are each integers representing the number of ethylene oxide repeat units, and wherein the molecular weight of the compound of the formula

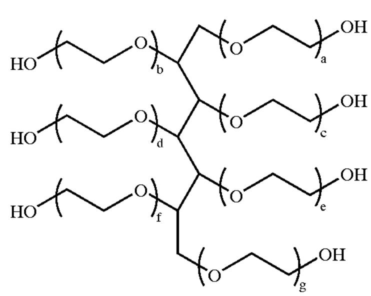

is about 1,040.

44. An ink composition according to claim 32 wherein the ink comprises an additive of the formula

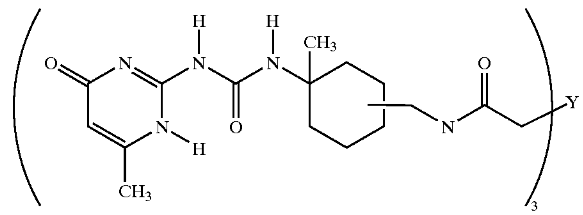

wherein Y is a trivalent group formed by removing three hydroxy groups from a compound of the formula

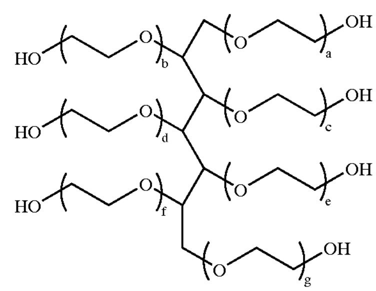

wherein a, b, c, d, e, f, and g are each integers representing the number of ethylene oxide repeat units, and wherein the molecular weight of the compound of the formula

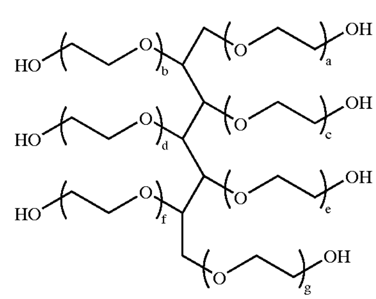

is about 1,040.

45. An ink composition according to claim 32 wherein the ink comprises an additive of the formula

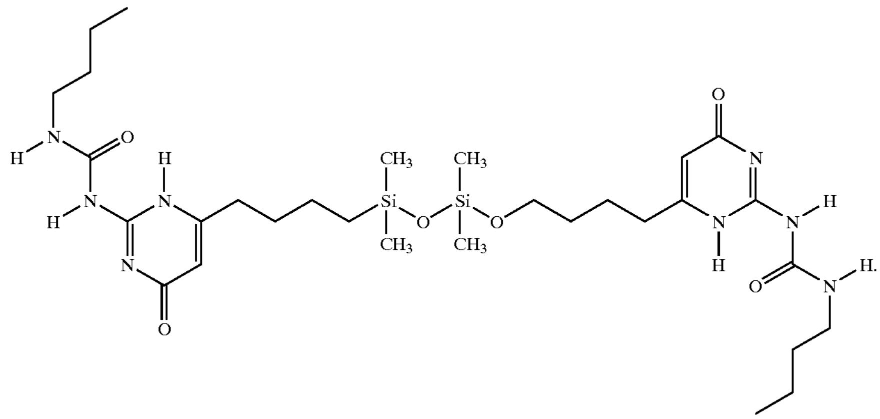

46. An ink composition according to claim 32 wherein the ink comprises an additive of the formula

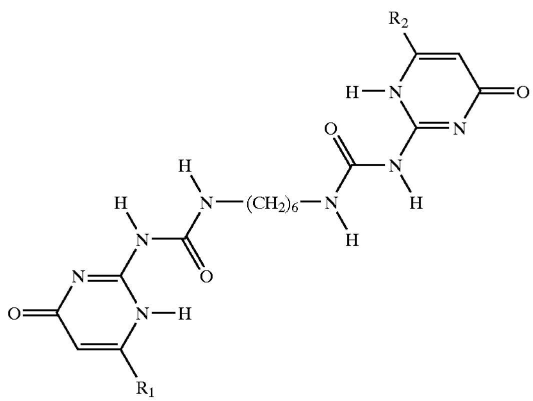

wherein $R_1$ and $R_2$ each, independently of the other, is an alkyl group with from 1 to about 18 carbon atoms.

47. An ink composition according to claim 32 wherein the ink comprises an additive of the formula

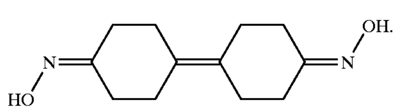

48. An ink composition according to claim 32 wherein the ink comprises an additive of the formula

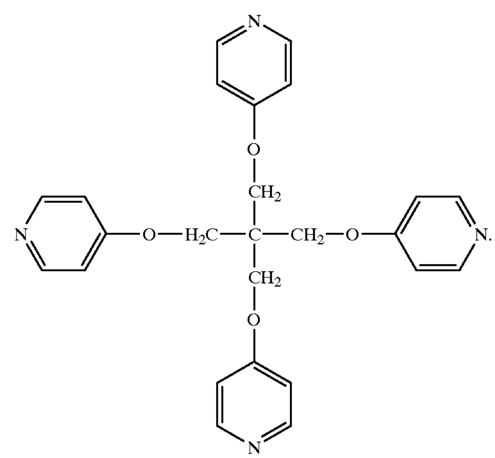

49. An ink composition according to claim 32 wherein the ink comprises an additive of the formula

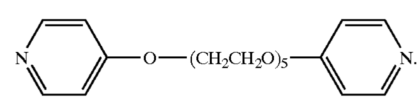

50. An ink composition according to claim 32 wherein the ink comprises an additive of the formula

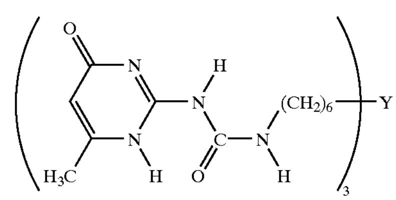

wherein Y is a trivalent group formed by removing three hydroxy groups from a compound of the formula

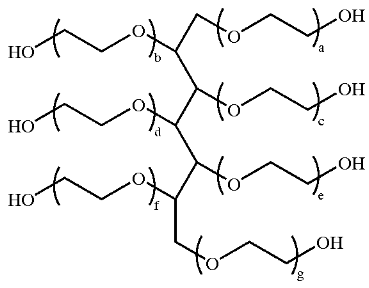

wherein a, b, c, d, e, f, and g are each integers representing the number of ethylene oxide repeat units, and wherein the molecular weight of the compound of the formula

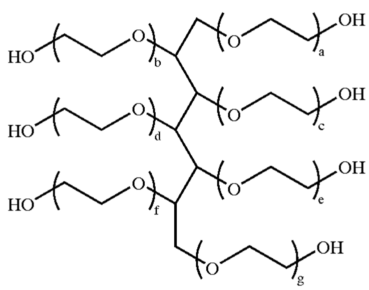

is about 1,040.

51. An ink composition according to claim 32 wherein the ink comprises an additive of the formula

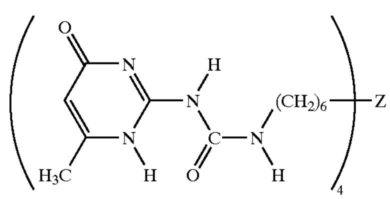

wherein Z is a tetravalent group formed by removing four hydroxy groups from a compound of the formula

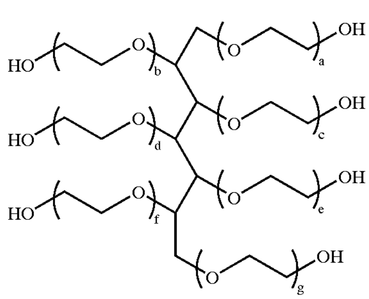

wherein a, b, c, d, e, f, and g are each integers representing the number of ethylene oxide repeat units, and wherein the molecular weight of the compound of the formula

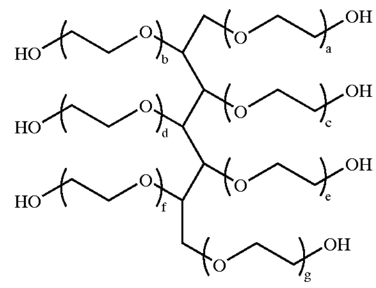

is about 1,040.

52. An ink composition according to claim 32 wherein the ink comprises an additive of the formula

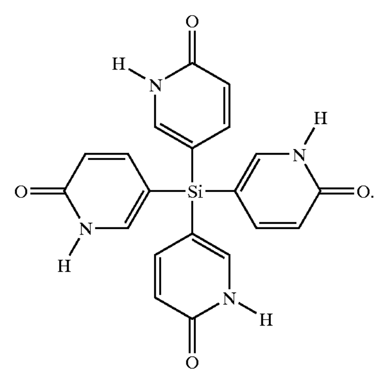

53. An ink composition according to claim 32 wherein the ink comprises an additive of the formula

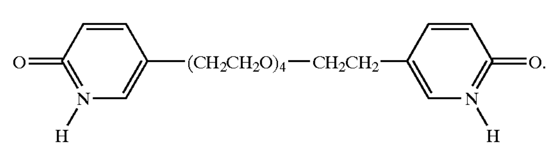

54. An ink composition according to claim 32 wherein the ink comprises a mixture of

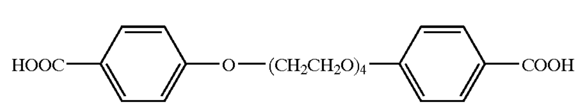

-continued
and
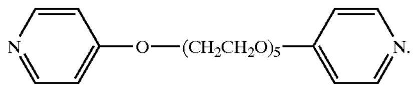
55. An ink composition according to claim 32 wherein the ink comprises a mixture of
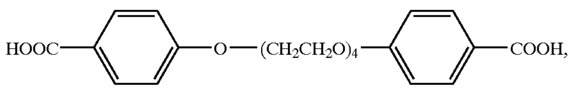
-continued
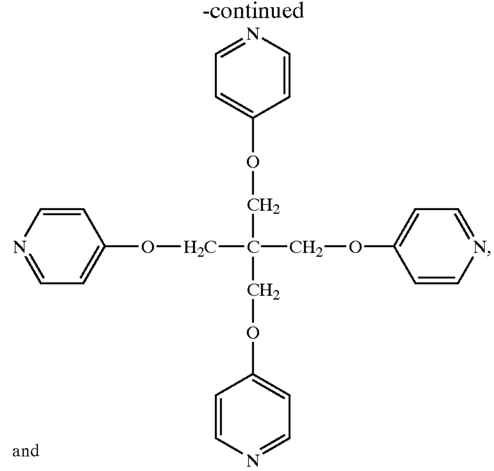
and
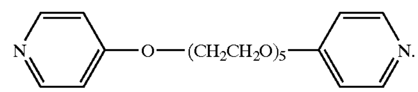
* * * * *